(12) United States Patent
Matsusaka et al.

(10) Patent No.: US 8,654,242 B2
(45) Date of Patent: Feb. 18, 2014

(54) SINGLE-FOCUS OPTICAL SYSTEM, IMAGE PICKUP DEVICE, AND DIGITAL APPARATUS

(75) Inventors: Keiji Matsusaka, Osaka (JP); Taizo Wakimura, Kishiwada (JP); Masashi Isono, Yao (JP); Eigo Sano, Hino (JP); Keiko Yamada, Sakai (JP); Hiroaki Tanaka, Sakai (JP)

(73) Assignee: Konica Minolta Opto, Inc., Tokyo (JP)

( * ) Notice: Subject to any disclaimer, the term of this patent is extended or adjusted under 35 U.S.C. 154(b) by 248 days.

(21) Appl. No.: 13/145,338

(22) PCT Filed: Aug. 25, 2010

(86) PCT No.: PCT/JP2010/064358
§ 371 (c)(1),
(2), (4) Date: Jul. 19, 2011

(87) PCT Pub. No.: WO2011/027690
PCT Pub. Date: Mar. 10, 2011

(65) Prior Publication Data
US 2011/0273611 A1    Nov. 10, 2011

(30) Foreign Application Priority Data
Sep. 2, 2009  (JP) .................................. 2009-203047

(51) Int. Cl.
*H04N 5/232* (2006.01)
(52) U.S. Cl.
USPC ............................ 348/345; 348/294; 348/340
(58) Field of Classification Search
USPC .......................................... 348/345, 294, 340
See application file for complete search history.

(56) References Cited

U.S. PATENT DOCUMENTS

| | | | | |
|---|---|---|---|---|
| 2005/0231817 A1* | 10/2005 | Matsusaka et al. | ........... | 359/680 |
| 2007/0014033 A1* | 1/2007 | Shinohara | ..................... | 359/692 |
| 2007/0188890 A1* | 8/2007 | Jo et al. | ........................ | 359/773 |
| 2007/0229984 A1* | 10/2007 | Shinohara | ..................... | 359/763 |
| 2008/0074760 A1* | 3/2008 | Sato | ............................... | 359/784 |
| 2009/0009889 A1* | 1/2009 | Teraoka et al. | ................ | 359/773 |
| 2009/0207507 A1* | 8/2009 | Shinohara | ..................... | 359/773 |
| 2011/0134305 A1* | 6/2011 | Sano et al. | .................... | 348/340 |
| 2011/0249171 A1* | 10/2011 | Shigemitsu et al. | .......... | 348/340 |

FOREIGN PATENT DOCUMENTS

| | | |
|---|---|---|
| JP | 59-026715 | 2/1984 |
| JP | 59-044016 | 3/1984 |
| JP | 6-222260 | 8/1994 |
| JP | 2001-228391 | 8/2001 |

(Continued)

*Primary Examiner* — Nicholas Giles
*Assistant Examiner* — Abdelaaziz Tissire
(74) *Attorney, Agent, or Firm* — Cozen O'Connor

(57) ABSTRACT

Provided is a single-focus optical system which is configured, in order from the object side to the image side, of a first to third lens groups and in which the first lens group and the third lens group are fixed with respect to a predetermined imaging surface, and the second lens group is moved in the optical axis direction to focus, wherein the first lens group comprises at least one positive lens and at least one negative lens, the second lens group comprises at least one positive lens, the third lens group comprises at least one lens having at least one aspheric surface and having a positive optical power at a peripheral portion thereof and $5<|\Delta v1|<70$ is satisfied where $\Delta v1$ is a maximum value of the Abbe number difference between the positive lens and the negative lens in the first lens group.

18 Claims, 25 Drawing Sheets

(56) References Cited

FOREIGN PATENT DOCUMENTS

| | | |
|---|---|---|
| JP | 2002-228922 | 8/2002 |
| JP | 2002-365529 | 12/2002 |
| JP | 2002-365530 | 12/2002 |
| JP | 2002-365531 | 12/2002 |
| JP | 2005-208236 | 8/2005 |
| JP | 2005-292559 | 10/2005 |
| JP | 2006-119368 | 5/2006 |
| JP | 2007-011237 | 1/2007 |
| JP | 2008-033327 | 2/2008 |
| JP | 2009-014899 | 1/2009 |
| JP | 2009-069195 | 4/2009 |
| JP | 2009-069196 | 4/2009 |
| JP | 2009-124569 | 6/2009 |
| JP | 2009-162810 | 7/2009 |

\* cited by examiner

DEFINITION OF
INCIDENT ANGLE
INTO IMAGE PLANE

SINGLE-FOCUS OPTICAL SYSTEM, IMAGE PICKUP DEVICE, AND DIGITAL APPARATUS

PRIORITY CLAIM

This application is a U.S. National Phase Application under 35 USC 371 of International Application PCT/JP2010/064358 filed Aug. 25, 2010.

This application claims the priority of Japanese application No. 2009-203047 filed Sep. 2, 2009, the entire content of which is hereby incorporated by reference.

TECHNICAL FIELD

The present invention relates to a single-focus optical system, and specifically to a single-focus optical system preferably applied to a solid-state imaging element such as a CCD image sensor or a CMOS image sensor. In addition, the present invention relates to an image pickup device provided with the single-focus optical system, and to a digital apparatus mounted with the image pickup device.

BACKGROUND

Over recent years, with advance of higher performance and further downsizing of imaging elements using solid-state imaging elements such as CCD (Charge Coupled Device)-image sensors or CMOS (Complementary Metal Oxide Semiconductor) image sensors, mobile phones and portable information terminals provided with an image pickup device using such an imaging element are prevailing. Further, in imaging lenses (imaging optical systems) installed in these image pickup devices, there is an increasing demand for further downsizing and higher performances. For an imaging lens for such usage, a five-lens optical system has been recently proposed, in addition to a three-lens or four-lens optical system.

In general, a highly-performance image pickup device is mounted with a function referred to as so-called auto focusing. However, since in the conventional configuration, whole three to five lenses are extended altogether, the following problems have become obvious: the size of a drive device is increased, whereby the size of the entire lens unit cannot be reduced; dust generated in a portion having a drive section causes an adverse effect on image quality, and an eccentric error of the drive device decreased the image quality. Basically, since there is a trade-off between performance enhancement and size reduction, these issues are technically difficult to be compatible. Therefore, to overcome this problem, it is necessary to conduct a fundamental review of the focusing system base on the conventional whole lens focusing method.

As one example of such efforts, Patent Document 1 and Patent Document 2 are cited. In the optical system disclosed in Patent Document 1, mainly by extending only the first lens, the size of a drive device is reduced. Further, as another example, in the optical system disclosed in Patent Document 2, of four lenses constituting a lens, only the second lens is extended to focus.

PRIOR ART DOCUMENTS

Patent Documents

Patent Document 1: Unexamined Japanese Patent Application Publication No. 2007-108534

Patent Document 2: Unexamined Japanese Patent Application Publication No. 2008-076953

BRIEF DESCRIPTION OF THE INVENTION

Problems to be Solved by the Invention

However, in any of the optical systems disclosed in Patent Document 1 and Patent Document 2, although advantages were obtained by changing the focusing system, the burden on the optical system was increased, and disadvantages more than the obtained advantages are thus caused, for example: the optical performance is decreased the total optical length is increased; the configuration is extremely sensitive to errors; F-number is decreased; and the closest focusing distance is longer than that of the conventional lenses.

In view of the above situation, the present invention has been conceived. An object of the present invention is to provide a single-focus optical system in which while the size smaller than ever and performances higher than ever are obtained, any other specifications and productivity are not adversely affected, and dust attachment, which is a recent problem in the mass production process, is successfully dealt with.

Means to Solve the Problems

To solve the above technical problems, the present invention provides a single-focus optical system having a configuration described later, an image pickup device, and a digital apparatus. Herein, terms referred to in the following description are defined as follows in the present specification.

(a) Refractive index refers to the refractive index with respect to the wavelength of the d-line (587.56 nm).

(b) Abbe number refers to Abbe number vd determined by the following expression:

$$vd = (nd-1)(nF-nC)$$

where refractive indexes with respect to the d-line, F-line (wavelength: 486.13 nm), and C-line (wavelength: 656.28 nm) are defined to be nd, nF, and nC, respectively, and Abbe number is defined to be vd.

(c) the term "concave," "convex," or "meniscus" is used, for a lens, to represent a lens shape in the vicinity of the optical axis (the vicinity of the lens center).

(d) The "optical power (reciprocal of focal length)" of each single lens constituting a cemented lens represents a power of each single lens in the case where air exists on both sides of each single lens.

(e) Since resin material used for a complex aspherical lens has only one function that it is added to a substrate glass material, it is not considered as an individual optical member, and the complex aspherical lens is considered to have an aspherical surface formed by the substrate glass material; thus the lens number for the complex aspherical lens is one aspherical. Then, the refractive index of the lens is represented by the refractive index of the glass material of a substrate. The complex aspherical lens refers to a lens having an aspherical shape formed by applying a thin resin material layer to a substrate made of glass material.

According to one aspect of the present invention, a single-focus optical system comprised of, from an object side to an image side, a first lens group, a second lens group, and a third lens group, wherein the first lens group and the third lens group are fixed with respect to a predetermined image plane, and the second lens group is moved in an optical axis direction to focus, wherein:

the first lens group includes at least a positive lens and at least a negative lens;

the second lens group includes at least a positive lens; and the third lens group includes at least a lens having at least an aspherical surface and having a positive optical power in a peripheral area thereof, wherein the following conditional expression (1) is satisfied, $$5 < \Delta v1 < 70 \quad (1)$$

wherein $\Delta v1$ is the maximum value of a difference between an Abbe number of the positive lens of the first lens group and an Abbe number of the negative lens of the first lens group.

According to another aspect of the present invention, a single-focus optical system comprised of, from an object side to an image side, a first lens group, a second lens group, and a third lens group, wherein the first lens group and the third lens group are fixed with respect to a predetermined image plane, and the second lens group is moved in an optical axis direction to focus, wherein:

the first lens group includes at least a positive lens and at least a negative lens;

the second lens group includes at least a positive lens; and the third lens group includes at least a lens having an aspherical shape which has an inflection point at a position other than a position where the aspherical shape intersects an optical axis, wherein the above-described conditional expression (1) is satisfied.

In the single-focus optical systems of these configurations, the first lens group and the third lens group are fixed, and only the second lens group is driven. Thus, initially, in a single-focus optical system of such a configuration, focusing is performed without degradation of characteristics such as spherical aberration and chromatic aberration, and curvature of field. Further, in the single-focus optical system of such a configuration, an amount of focusing movement is reduced, whereby space actuator is saved, and due to no change in the total length, a super-compact optical unit is realized Still further, in the single-focus optical system of such a configuration, dust is prevented from penetrating the lens unit, and cost reduction resulting from the removal of a process and the reduction of environmental loads resulting from the reduction of defective products is also realized.

And, in a single-focus optical system of such a configuration, since the first lens group has at least one positive lens and at least one negative lens, spherical aberration and axial chromatic aberration are effectively corrected, and the second lens group has at least one positive lens, whereby curvature of field is favorably corrected. Further, the third lens group contains at least one lens having at least one aspherical surface with positive optical power in the periphery or at least one lens having an aspherical shape having an inflection point at a position except the intersection between the surface and the optical axis, whereby the angle of a light beam which has a wide angle of view and enters the image plane is controlled, resulting in prevention of color shading and decrease in rim intensity. Further, when above conditional expression (1) is satisfied, axial chromatic aberration is favorably corrected and the contrast of the entire screen is enhanced.

Herein, the periphery refers to an outer circumferential portion which is in the outside of radius/3 in the diameter direction.

According to another aspect, in the above-described single-focus optical systems, when the lenses constituting the first lens group to the third lens group is named an i-th lens (i=1, 2, 3, . . . ) from the object side to the image side, the optical system is comprised of a first lens having a positive optical power, a second lens having a negative optical power, a third lens having a positive optical power, and a fourth lens having a positive or negative optical power.

According to another aspect, in the above-described single-focus optical systems, when the lenses constituting the first lens group to the third lens group is named a i-th lens (i=1, 2, 3, . . . ) from the object side to the image side, the optical system is comprised of a first lens having a positive optical power, a second lens having a negative optical power, a third lens having a positive optical power, a fourth lens having a positive or negative optical power, and a fifth lens having a positive or negative optical power.

According to this configuration, since the lens are arranged in a so-called triplet type, which has a positive-negative-positive arrangement, axial chromatic aberration, spherical aberration, and curvature of field is favorably corrected. And, according to the above configuration, when the fourth lens or the fourth and fifth lenses are further arranged, peripheral optical performance associated with profile reduction and widening of angle, specifically curvature of field and distortion is favorably corrected and sensor incidence angle is controlled.

According to another aspect, in the above-described single-focus optical systems, when the lenses constituting the first lens group to the third lens group is named a i-th lens (i=1, 2, 3, . . . ) from the object side to the image side, the following conditional expressions (2) and (3) are satisfied, $$0.1 < f1/f < 1.1 \quad (2)$$

$$0.1 < fs/f < 2 \quad (3)$$

wherein f1 is a focal length of the first lens, f is a combined focal length of a whole optical system, and fs is a combined focal length of the second lens group.

According to this configuration, f1/f satisfies the above conditional expression (2) and fs/f satisfies the above conditional expression (3). When the upper limit of the conditional expression (2) is exceeded, it becomes difficult to allow the total lens length to be kept compact, which is unfavorable. On the other hand, when the lower limit of the conditional expression (2) is exceeded, the power of the first lens is excessively enhanced and then chromatic aberration and astigmatism cannot be sufficiently corrected, which is unfavorable. And, when the upper limit of conditional the expression (3) is exceeded, an amount of focusing movement is increased and then the total lens length is increased, which is unfavorable. On the other hand, when the lower limit of the conditional expression (3) is exceeded, performance degradation with respect to the error of the actuator to drive the second lens group becomes extremely sensitive and then specifically, image quality degradation referred to as asymmetric blur, in which an image is asymmetrically blurred in the periphery of the screen, occurs, which is unfavorable.

According to another aspect, in the above-described single-focus optical systems, the second lens group includes only one lens.

In a single-focus optical system of this configuration, the second lens group is constituted of one lens. Thus, in a single-focus optical system of such a configuration, an amount of focusing movement is small, and the load of a lens weight on a drive device is lowered According to another aspect, in the above-described single-focus optical systems, the most object-side lens is a positive lens having a convex object-side surface, and the following conditional expression (4) is satisfied, $$0.01 < bf/TL < 0.24 \quad (4)$$

wherein bf is an axial distance from a surface apex of the most image-side lens surface to the image plane, and TL is an axial distance from a surface apex of the most object-side lens surface to the image plane (each is an air equivalent length when a parallel plate is included).

In a single-focus optical system of such a configuration, since the most object side lens is formed into the above shape, the optical power of the lens is enhanced and eccentric error sensitivity is reduced. In addition, in the single-focus optical system of such a configuration, when the above conditional expression (4) is satisfied, the optical power of the first lens is made large and the total optical length is short.

According to another aspect, in the above-described single-focus optical systems, when the lenses constituting the first lens group to the third lens group is named an i-th lens (i=1, 2, 3, . . . ) from the object side to the image side, the optical system comprises an aperture stop on an object side of an object-side surface of the first lens or between an image-side surface of the first lens and an object-side surface of the second lens, and the following conditional expression (5) is satisfied, $$0.15 < D1/Y' < 0.5 \quad (5)$$

wherein D1 is a maximum effective diameter of the first lens, and Y' is a maximum image height.

In a single-focus optical system of such a configuration, since an aperture stop is arranged in the above position, the angle of a light beam having a wide angle of view and entering the image plane is controlled and the effective diameter of the object side lens, for which high accuracy is required due to a large optical power, is decreased, resulting in increased productivity. And, in the single-focus optical system of such a configuration, the above conditional expression (5) specifies a preferable range of the arrangement position of the aperture stop. When the upper limit of the conditional expression (5) is exceeded, it becomes difficult to arrange a mechanical shutter, a variable stop mechanism, or an ND filter on the object side of the lens unit, which is unfavorable. On the other hand, when the lower limit of the conditional expression (5) is exceeded, the light intensity is decreased, which is unfavorable.

According to another aspect, in the above-described single-focus optical systems, the following conditional expressions (6), (7), and (8) are satisfied, $$0.001 < T12/TL < 0.033 \quad (6)$$

$$0.05 < T23/TL < 0.4 \quad (7)$$

$$0.04 < T34/TL < 0.4 \quad (8)$$

wherein T12 is an axial distance between the first lens and the second lens, T23 is an axial distance between the second lens and the third lens (when T23 is variable for focusing, T23 for focusing at infinity is adopted), and T34 is an axial distance between the third lens and the fourth lens (when T34 is variable for focusing, T34 for focusing at infinity is adopted).

According to this configuration, T12/TL satisfies the above conditional expression (6); T23/TL satisfies the above conditional expression (7); and T34/TL satisfies above the conditional expression (8). In a single-focus optical system of such a configuration, when the upper limit of conditional expression (6) is exceeded, axial chromatic aberration is inadequately corrected, which is unfavorable. On the other hand, when the lower limit is exceeded, it becomes difficult to arrange a light shielding member for preventing harmful light, resulting in image quality degradation, which is unfavorable. When the upper limit of conditional expression (7) is exceeded, it becomes difficult to correct astigmatism, which is unfavorable. On the other hand, when the lower limit is exceeded, the optical power of the second lens is excessively enhanced and then the angle of light beam emitted from the image-side surface of the second lens becomes excessively steep, resulting in a decrease in rim intensity, which is unfavorable. And, when the upper limit of conditional expression (8) is exceeded, the total optical length is increased, which is unfavorable. When the lower limit is exceeded, focusing adjustment allowance is inadequately ensured and thereby the tolerance of each lens is required to be strictly set, resulting in decreased productivity, which is unfavorable.

According to another aspect, in the above-described single-focus optical systems, the following conditional expression (9) is satisfied, $$-0.15 < T2/f2 < -0.01 \quad (9)$$

wherein T2 is an axial thickness of the second lens; and f2 is a focal length of the second lens.

According to this configuration, T2/f2 satisfies above conditional expression (9). When the upper limit of conditional expression (9) is exceeded, lens strength becomes insufficient and thereby during lens holding breakage and surface shape change occur, which is unfavorable. On the other hand, when the lower limit is exceeded, Petzval sum is increased and thereby astigmatic difference is increased and axial chromatic aberration is increased, which is unfavorable.

According to another aspect, in the above-described single-focus optical systems, the most object-side lens of the third lens group is a positive meniscus lens having a convex surface toward the image plane.

In a single-focus optical system of such a configuration, since the most object side lens in the third lens group is formed into the above shape, an exit pupil position is arranged on the object side and the incident angle of a light beam, having a wide angle of view, with respect to the image plane is controlled.

According to another aspect, in the above-described single-focus optical systems,
the first lens group includes:
  a first lens having a convex object-side surface and a positive optical power, and
  a second lens having a strong curvature toward the image side and a negative optical power,
the second lens group includes:
  a third lens having a strong curvature toward the image side and a positive optical power, and
the third lens group includes:
a fourth lens having at least an aspherical surface and having a negative meniscus shape convex toward the object side.

According to another aspect, in the above-described single-focus optical systems,
the first lens group includes:
  a first lens having a convex object-side surface and a positive optical power, and
  a second lens having a strong curvature toward the image side and a negative optical power,
the second lens group includes:
  a third lens having a strong curvature toward the image side and a positive optical power, and
the third lens group includes:
  a fourth lens having a positive meniscus shape convex toward the image side; and
a fifth lens having at least an aspherical surface and having a negative optical power.

In a single-focus optical system of such a configuration, since the first lens group is made to have the above configuration, spherical aberration and axial chromatic aberration are favorably corrected. Further, in the single-focus optical system of such a configuration, when the second lens group is made to have the above configuration, curvature of field is favorably corrected; and an amount of focusing movement is reduced and the lens weight load on a drive device is reduced. Further, in the single-focus optical system of such a configuration, when the third lens group is made to have the above configuration to be a so-called telephoto type lens downsizing is achieved and the incident angle of a light beam, having a wide angle of view, with respect to the image plane is controlled.

Herein, a strong concave curvature toward the image side means that the image-side surface has a concave shape toward the image side and the absolute values of the radius of curvature of the image-side surfaces smaller than that of the object-side surface. In the same manner, strong convex curvature toward to the image side means that the image-side surface has a convex shape toward the image side and the absolute values of the radius of curvature of the image-side surface is smaller than that of the object-side surface.

According to another aspect, in the above-described single-focus optical systems, the following conditional expression (10) is satisfied, $$0.3 < Y'/TL < 0.9 \quad (10)$$

wherein Y' is a maximum image height; and TL is an axial distance from a surface apex of the most object-side surface to the image plane (each is an air equivalent length when a parallel plate is included).

According to this configuration, Y'/TL satisfies the above conditional expression (10). When the upper limit of conditional expression (10) is exceeded, eccentric error sensitivity is remarkably enhanced and then productivity is markedly decreased, which is unfavorable. On the other hand, when the lower limit of the conditional expression (10) is exceeded, the size of a module is increased, which is unfavorable.

According to another aspect, in the above-described single-focus optical systems, the following conditional expression (11) is satisfied, $$28 < w < 50 \quad (11)$$

wherein w is a maximum half angle of view (degree).

In a single-focus optical system of such a configuration, the above conditional expression (11) is satisfied, an amount of focusing movement for a closest focusing distance is reduced, and the optical system is downsized.

According to another aspect, in the above-described single-focus optical systems, the following conditional expressions (11) and (12) are satisfied, $$Fn < 3.2 \quad (12)$$

$$0.15 < Tgs/TL < 0.8 \quad (13)$$

wherein Fn is a F number with respect to light from infinity, Tgs is an axial distance from a surface apex of the most object-side surface of the third lens group to the image plane, and TL is an axial distance from a surface apex of the most object-side lens surface to the image plane (each is an air equivalent length when a parallel plate is included).

According to this configuration, Fn satisfies the above conditional expression (12) and Tgs/TL satisfies the above conditional expression (13). Since a single-focus optical system of such a configuration satisfies the conditional expression (12), the ratio of the size of dust having adhered on the lens surface to the entire light flux is drastically reduced. Further, when the upper limit of conditional expression (13) is exceeded, distortion is inadequately corrected and the total optical length is increased, which is unfavorable. On the other hand, when the lower limit of conditional expression (13) is exceeded, the possibility that the size of dust having adhered on the lens surface taken into an image is markedly increased, resulting in decreased productivity, which is unfavorable.

An image pickup device according to another aspect of the present invention comprises:

the single-focus optical system of any one of claims 1 to 16; and an imaging element configured to convert an optical image into an electrical signal, wherein the single-focus optical system is adapted to form an optical image of an object on a light receiving surface of the imaging element According to this configuration, an image pickup device is provided in which with further downsizing and higher performance compared with the conventional optical system, any other specifications and productivity are not adversely affected and adhering dust, which is recently problematic in the mass production process, is successfully dealt with.

According to another aspect, in the image pickup device, the following conditional expression (14) is satisfied, $$1 < PX/h3 < 5 \quad (14)$$

wherein PX is a pixel size (µm) of the imaging element, and h3 is a radius (mm) of an axial light beam on the most object-side surface of the third lens group.

In an image pickup device of such a configuration, since the above conditional expression (14) is satisfied, even in the case of use of an high resolution imaging element or a narrow pixel pitch imaging element, the size of dust having adhered on the lens surface taken into an image can be drastically reduced and then a decrease in productivity due to dust is prevented.

According to another aspect, in the image pickup devices comprise:

a structure body configured to seal a space between the third lens group and an imaging surface of the imaging element In an image pickup device of such a configuration, since the above structure body is provided, dust adhesion to the vicinity of the imaging surface in which light beam is extremely narrow is prevented and then a decrease in productivity is prevented.

A digital apparatus according to another aspect of the present invention comprises:

a controller configured to cause the image pickup device to take at least one of a still image and a moving image of a subject, wherein the single-focus optical system of the image pickup device is mounted so as to form an optical image of the subject on an imaging surface of the imaging element. In addition, the digital apparatus is preferably constituted of a mobile terminal including the following cases.

According to this configuration, a digital apparatus and a mobile terminal are provided which are smaller and have higher performances than the conventional optical system, without adversely affecting any other specifications or productivity, and which successfully deal with adhering dust which is recently problematic in the mass production process.

According to another aspect, the digital apparatuses comprise:

an image processing section configured to perform a predetermined image process on an output of the imaging element. In addition, the predetermined image process preferably includes a distortion correction process in which distortion of the image of the subject formed on the imaging surface of the imaging element is corrected. In addition, the predetermined image process preferably includes a depth-of-focus increasing process in which a depth of focus is increased.

According to this configuration, a digital apparatus to perform a predetermined image processing is provided. For example, aberration, which cannot be sufficiently corrected optically, can be corrected by image processing, and further, for example, a decrease in rim intensity can be corrected by image processing. Further, for example, focal depth can be increased by image processing. When image distortion is corrected, the aberration load of a lens close to the image plane is specifically reduced, whereby exit pupil position is easily controlled and then lens shape can be formed to be highly workable. Alternatively, when focal depth increases, variation of components is allowed, resulting in increased productivity. Further, when a drive device is used, the position error and the eccentric error of the drive device are absorbed.

Effects of the Invention

The single-focus optical system according to the present invention is smaller and has higher performances than the conventional optical system does not adversely affect any other specifications (for example, specifications on F-number and the closest focusing distance) and productivity, and successfully deals with adhering dust, which is recently problematic in the mass production process. And, the present invention makes it possible to provide an image pickup device and a digital apparatus using such a single-focus optical system.

PREFERRED EMBODIMENT OF THE INVENTION

One embodiment according to the present invention will now be described with reference to the drawings. Herein, in each drawing an element with the same symbol represents the same element and description thereof will be omitted as appropriate. Further, the number of lenses in a cemented lens does not represent one lens as the entire cemented lens but represents the number of single lenses constituting the cemented lens.

<Description of a Single-Focus Optical System of One Embodiment>

Figure 1:
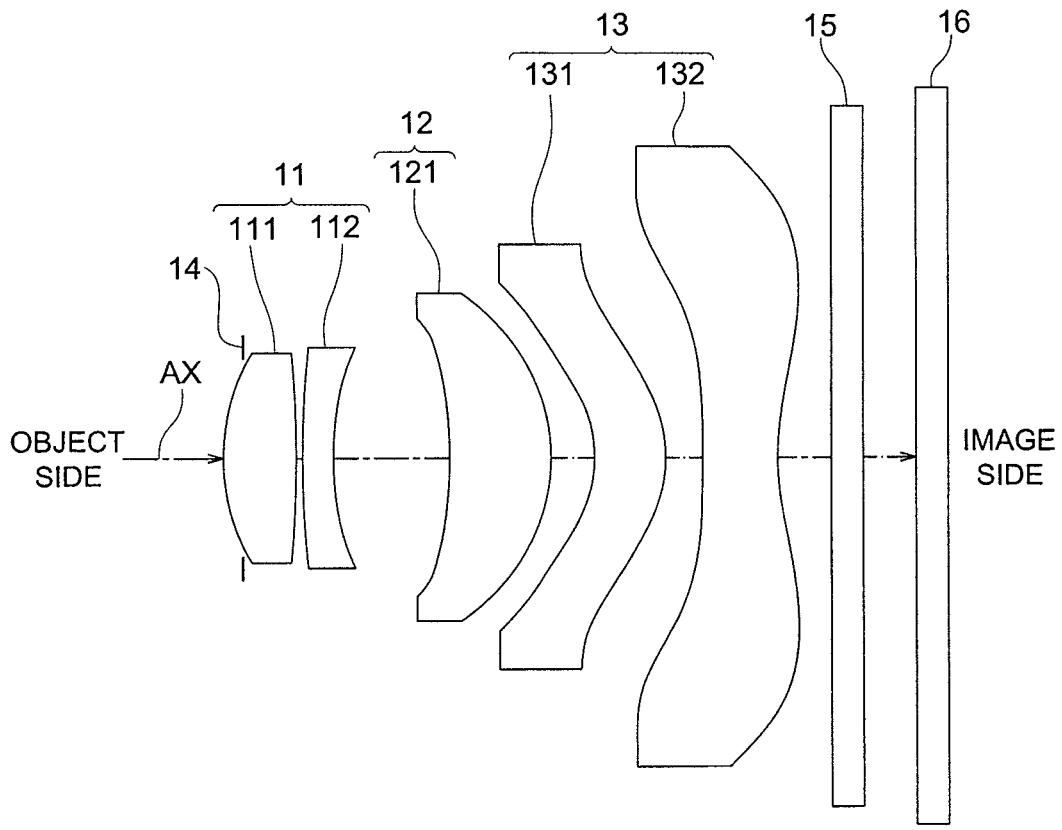
FIG. 1 is across-sectional view of a lens, used for describing a single-focus optical system of an embodiment, showing a schematic configuration of the optical system.
Figure 2:
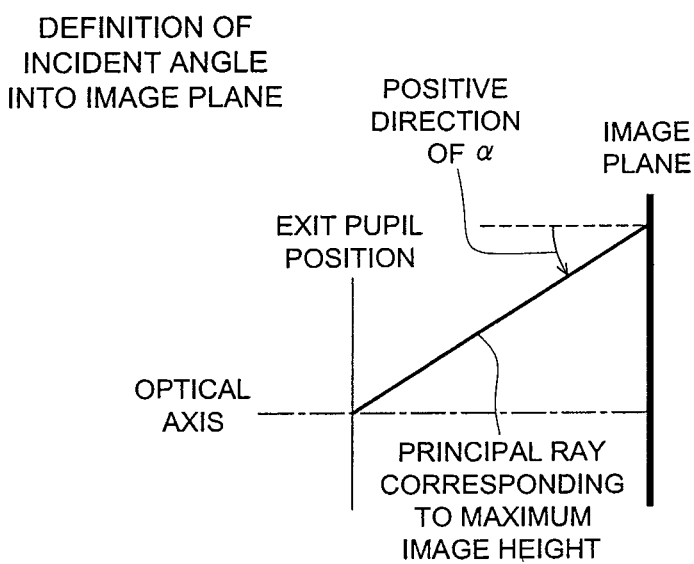
FIG. 2 is a schematic diagram showing a definition of an incident angle into an image plane of a principal ray.

FIG. 1 is a cross-sectional view of a lens, used for describing a single-focus optical system of an embodiment, showing a schematic configuration of the optical system. FIG. 2 is a schematic diagram showing a definition of an incident angle to an image plane of a principal ray.

In FIG. 1, a single-focus optical system 1 an optical system which forms an optical image of an object (a subject) on a light receiving surface of an imaging element 16 for converting an optical image into an electrical signal and which is configured of a first lens group 11, a second lens group 12, and a third lens group 13 in order from the object side to the image side. The imaging element 16 is arranged such that the light receiving surface substantially matches the image plane of the single-focus optical system 1 (image plane=imaging surface). Herein, the single-focus optical system 1 exemplified in FIG. 1 has the same configuration as the single-focus optical system 1A (FIG. 5) of Example 1 to be described later.

In addition, in this single-focus optical system 1, the first lens group 11 and the third lens group 13 are fixed with respect to a predetermined image plane, and by moving the second lens group 12 in the optical axis direction, focusing is performed.

Further, the first lens group 11 contains at least one positive lens and at least one negative lens, and the second lens group 12 contains at least one positive lens. The third lens group 13 contains at least one lens having at least one aspherical surface with positive optical power in the periphery. When the maximum value of the Abbe number difference between the positive lens and the negative lens in the first lens group 11 is defined to be $\Delta v1$, following conditional expression (1) is satisfied.

$$5<|\Delta v1|<70 \quad (1)$$

FIG. 1 shows an example in which the first lens group 11 is fixed in focusing and constituted, in order from the object side to the image side, of a biconvex positive lens 111 as one example of the at least one positive lens and a negative meniscus lens 112 which is convex toward the object side as one example of the at least one negative lens; the second lens group 12 is moved in focusing and constituted, in order from the object side to the image side, of a positive meniscus lens 121 which is convex toward the image side as one example of the at least one positive lens; and the third lens group 13 is fixed in focusing and constituted, in order from the object side to the image side, of a positive meniscus lens 131 which is convex toward the image side and a biconcave negative lens 132.

Both sides of each of the lenses 111, 112, 121, 131, and 132 of the lens groups 11, 12, and 13 are aspherical. The positive meniscus lens 131 and the negative lens 132 in the third lens group 13 each contain at least one aspherical surface with positive optical power in the periphery. In other words, the positive meniscus lens 131 and the negative lens 132 in the third lens group 13 each are a lens having an aspherical shape with an inflection point in a position except the intersection with the optical axis. Each of the lenses 111, 112, 121, 131, and 132 of the lens groups 11, 12, and 13 may be, for example, a glass mold lens or, for example, a lens made of a resin material such as plastic material. Especially in the case of being mounted on a mobile phone, from the viewpoint of weight reduction, the lenses are preferably made of resin. In the example shown in FIG. 1, each of the lenses 111, 112, 121, 131, and 132 is a resin lens.

In addition, in this single-focus optical system 1, an aperture stop 14 of an aperture stop is arranged on the object side of the positive lens 111 of the first lens group 11.

Further, on the image side of this single-focus optical system 1, a filter 15 and an imaging element 16 are arranged. The filter 15 is an optical element of a parallel plate and is schematically shown in the drawing as one of types of optical filters or a cover glass for an imaging element. On the basis of the intended use, the imaging element and the camera configuration, an optical filter such as a low-pass filter or an infrared cut filter can be appropriately arranged. The imaging element 16 is an element which converts the optical image of a subject formed by the single-focus optical system 1 to an image signal of each of the components of R (red), G (green), and B (blue) based on the light intensity of the optical image, and outputs the image signal to a predetermined image processing circuit (not shown). Thus, the optical image of the subject on the object side is leaded by the single-focus optical system 1 along the optical axis AX thereof to the light receiving surface of the imaging element 16 at an appropriate magnification ratio, and is picked up by the imaging element 16.

In the single-focus optical system 1 of such a configuration, the first lens group 11 and the third lens group 13 are fixed, and only the second lens group 12 is driven to focus. With this arrangement, the single-focus optical system 1 of such a configuration, without degradation of characteristics such as spherical aberration, chromatic aberration, and curvature of field, focusing can be performed. Further, in the single-focus optical system 1 of such a configuration, an amount of focusing movement is reduced, and an actuator to generate the driving force of focusing is accordingly miniaturized, and the total length does not vary, whereby a super-compact optical unit is realized. Still further, in the single-focus optical system 1 of such a configuration, dust is prevented from entering the optical unit, cost is reduced by removing some processes, and environmental loads are reduced by decreasing defective products.

And, in the single-focus optical system 1 of such a configuration, the first lens group 11 has at least one positive lens and at least one negative lens (in the example shown in FIG. 1, the positive lens 111 and the negative meniscus lens 112), whereby spherical aberration and axial chromatic aberration are effectively corrected, and then the second lens group 12 has at least one positive lens (in the example shown in FIG. 1, the positive meniscus lens 121), whereby curvature of field is favorably corrected. Further, the third lens group 13 has a positive meniscus lens 131 and a negative lens 132, whereby at least one aspherical surface with positive optical power in the periphery is incorporated, or at least one lens having an aspherical shape with an inflection point in a position except the intersection of the lens surface and the optical axis is incorporated. Thus, the angle of a light beam having a wide angle of view and entering the image plane is controlled, resulting in prevention of color shading and decrease in rim intensity. And, since above conditional expression (1) is satisfied, axial chromatic aberration is favorably corrected and the contrast of the entire screen is enhanced.

Herein, as shown in FIG. 2, the incident angle, of a principal ray, with respect to the image plane refers to the angle (deg. or degree) α which is between a principal ray which has a larger view angle any other principal rays entering the imaging surface and a normal line of the image plane. An incident angle α, of a principle lay, with respect to the image plane, when the exit pupil is located on the object side with respect to the image plane, is defined to be positive.

Herein, from the viewpoint of favorably correcting axial chromatic aberration and further enhancing the contrast of the entire screen, the following conditional expression (1') is more preferably to be satisfied than the above conditional expression (1).

$$20<|\Delta v1|<60 \quad (1')$$

Further, in this single-focus optical system 1, the first-third lens groups 11, 12, and 13 are constituted, in order from the object side to the image side, of the lenses: a positive lens 111 as one example of the first lens with positive optical power, a negative meniscus lens 112 as one example of the second lens with negative optical power, a positive meniscus lens 121 as one example of the third lens with positive optical power, a positive meniscus lens 131 as one example of the fourth lens with positive or negative optical power, and a negative lens 132 as one example of the fifth lens with positive or negative optical power. Herein, the positive meniscus lens 131 as the fourth lens may be replaced with a negative lens and then the negative lens 132 as the fifth lens may be replaced with a positive lens.

In this manner, in a single-focus optical system 1, in order from the object side to the image side, each lens is arranged as in the lens arrangement of a so-called triplet type of a positive-negative-positive arrangement, whereby axial chromatic aberration, spherical aberration, and curvature of field is favorably corrected. In such a manner, in the single-focus optical system 1, since a fourth lens and a fifth lens are further arranged, and peripheral optical performances associated with profile reduction and widening of angle, specifically curvature of field and distortion can be favorably corrected, and incidence angle with respect to the sensor is controlled.

In addition, the first-third lens groups 11, 12, and 13 may be constituted, in order from the object side to the image side, of the lenses: a first lens with positive optical power, a second lens with negative optical power a third lens with positive optical power, and a fourth lens with positive or negative optical power.

Further, in this single-focus optical system 1, the second lens group 12 is constituted of one lens. Thereby, in the single-focus optical system 1, an amount of focusing movement can be reduced and the lens weight load of a drive device can be reduced.

Still further, in this single-focus optical system 1, the lens 131, which is the most object side lens in the third lens group 13, is a positive meniscus lens having a convex surface toward the image side. Thus, in the single-focus optical system 1, the exit pupil position is located on the object side, and the incident angle of a light beam, having a wide angle of view, with respect to the image plane is controlled.

Herein, in these single-focus optical systems 1, when the focal length of the first lens 111 is defined to be f1; the combined focal length of the entire system is defined to be f; and the combined focal length of the second lens group 12 is defined to be fs, each of the following conditional expressions (2) and (3) is preferably satisfied.

$$0.1 < f1/f < 1.1 \quad (2)$$

$$0.1 < fs/f < 2 \quad (3)$$

In this manner, f1/f satisfies the conditional expression (2), and fs/f satisfies the conditional expression (3). When the upper limit of the conditional expression (2) is exceeded, in the single-focus optical system 1, it becomes difficult to keep the total lens length short, which is unfavorable. On the other hand, when the lower limit of the conditional expression (2) is exceeded, the power of the first lens 111 is excessively enhanced, and chromatic aberration and astigmatism is not sufficiently corrected, which is unfavorable. And, when the upper limit of the conditional expression (3) is exceeded, an amount of focusing movement is excessively increased, and the total lens length is increased, which is unfavorable. On the other hand, when the lower limit of conditional expression (3) is exceeded, performance degradation caused by the error of the actuator for driving the second lens group 12 becomes large, and image is degraded due to so-called asymmetric blur, in which an image asymmetrically blurs on the periphery of the screen, which is unfavorable.

Further, to further increase the above effects, the following conditional expressions (2') and (3') are more preferably to be satisfied than the above conditional expressions (2) and (3).

$$0.4 < f1/f < 1 \quad (2')$$

$$0.5 < fs/f < 1.5 \quad (3')$$

Further, in the above single-focus optical systems 1, the most object side lens is a positive lens having a convex object side surface, and the following conditional expression (4) is preferably satisfied. Where the axial distance from the apex of surface of the most image-side lens surface to the image plane is defined to be bf and the axial distance from the apex of surface of the most object side lens surface to the image plane is defined to be TL (each distance is an air equivalent distance if a parallel plate is included).

$$0.01 < bf/TL < 0.24 \quad (4)$$

In a single-focus optical system 1 of such a configuration, when the most object side lens is formed into the above shape, with enhancement of the optical power of the lens, eccentric error sensitivity can be reduced. And, in the single-focus optical system 1 of such a configuration, since the above conditional expression (4) is satisfied, the optical power of the first lens 111 is enhanced, and the total optical length is accordingly reduced.

Further, to increase the above effects, the following conditional expression (4') is more preferably satisfied than the conditional expression (4).

$$0.10 < bf/TL < 0.20 \quad (4')$$

Still further, in a single-focus optical system 1 of such a configuration, following conditional expression (5) is preferably satisfied, where an aperture stop is provided on the object side of the object side surface of the first lens 111 or between the image-side surface of the first lens 111 and the object side surface of the second lens 112; the maximum effective diameter of the first lens 111 is defined to be D1; and maximum image height is defined to be Y'.

$$0.15 < D1/Y' < 0.5 \quad (5)$$

In a single-focus optical system 1 of such a configuration, since an aperture stop is provided at the above position, the angle of a light beam having a wide angle of view and entering the image plane can be controlled and the effective diameter of a lens positioned on the object side, in which high accuracy is required due to enhanced optical power, is reduced, resulting in increased productivity. And, in the single-focus optical system of such a configuration, above conditional expression (5) specifies a preferable range of the arrangement position of the aperture stop. When the upper limit of conditional expression (5) is exceeded, it becomes difficult to arrange a mechanical shutter, a variable stop mechanism, and an ND filter on the object side of the optical unit, which is unfavorable. On the other hand, when the lower limit of conditional expression (5) is exceeded, the light intensity is decreased, which is unfavorable.

Further, to increase the effect of the above respects, the following conditional expression (5') is more preferably satisfied than the conditional expression (5).

$$0.25 < D1/Y' < 0.40 \quad (5')$$

Still further, in the above single-focus optical systems 1, the following conditional expressions (6), (7), and (8) are preferably satisfied, where the axial distance between the first lens 111 and the second lens 112 is defined to be T12; the axial distance between the second lens 112 and the third lens 121 (if this distance varies to focus, use the distance when the lens is focused at infinity) is defined to be T23; and the axial distance between the third lens 121 and the fourth lens 131 (if this distance varies to focus, use the distance when the lens is focused at infinity) is defined to be T34.

$$0.001 < T12/TL < 0.033 \tag{6}$$

$$0.05 < T23/TL < 0.4 \tag{7}$$

$$0.04 < T34/TL < 0.4 \tag{8}$$

In a single-focus optical system 1 of such a configuration, when the upper limit of conditional expression (6) is exceeded, axial chromatic aberration is inadequately corrected, which is unfavorable. On the other hand, when the lower limit is exceeded, it becomes difficult to arrange a light shielding member to block disturbing light resulting in image quality degradation, which is unfavorable. When the upper limit of conditional expression (7) is exceeded, it becomes difficult to correct astigmatism, which is unfavorable. On the other hand, when the lower limit is exceeded, the optical power of the second lens 112 is extremely enhanced and the angle of light beam emitted from the image-side surface of the second lens becomes excessively steep, resulting in decrease in rim intensity, which is unfavorable. And, when the upper limit of conditional expression (8) is exceeded, the total optical length is increased, which is unfavorable. On the other hand, when the lower limit is exceeded, focusing adjustment allowance is inadequately ensured, and accordingly strict tolerance is required for each lens, resulting in decreased productivity, which is unfavorable.

Further, to increase the effect of the above respects, the following conditional expressions (6'), (7), and (8) are more preferably satisfied than the conditional expressions (6), (7), and (8).

$$0.005 < T12/TL < 0.025 \tag{6'}$$

$$0.10 < T23/TL < 0.20 \tag{7'}$$

$$0.04 < T34/TL < 0.10 \tag{8'}$$

Still further, in the above single-focus optical systems 1, the following conditional expression (9) is preferably satisfied, where the axial thickness of the second lens 112 is defined to be T2 and the focal length of the second lens 112 is defined to be f2.

$$-0.15 < T2/f2 < -0.01 \tag{9}$$

In a single-focus optical system 1 of such a configuration, when the upper limit of conditional expression (9) is exceeded, lens strength becomes insufficient, and breakage of face shape change occurs when the lens held, which is unfavorable. On the other hand, when the lower limit is exceeded, Petzval sum is increased and astigmatic difference and axial chromatic aberration are accordingly increased, which is unfavorable.

Further, to increase the above effects, the conditional expression (9') is more preferably satisfied than the conditional expression (9).

$$-0.10 < T2/f2 < -0.02 \tag{9'}$$

Still further, in the above single-focus optical systems 1, it is preferable that the first lens group is constituted of a first lens with positive optical power having a convex object-side surface and a second lens with negative optical power having a strong concave curvature toward the image side; the second lens group is constituted of a third lens with positive optical power having a strong convex curvature toward the image side; and the third lens group is constituted of a fourth lens which has a negative meniscus shape convex toward the object side and has at least one aspherical surface.

Further, in the above single-focus optical systems 1, it is preferable that the first lens group 11 is constituted of a first lens 111 with positive optical power having a convex surface on the object surface side and a second lens 112 having a negative optical power and having a strong concave curvature toward the image side; the second lens group 12 is constituted of a third lens 121 with positive optical power having strong convex curvature toward the image side; and the third lens group 13 is constituted of a fourth lens 131 which has a positive meniscus shape and is convex toward the image side and a fifth lens 132 with negative optical power having at least one aspherical surface.

In a single-focus optical system 1 of such a configuration, since the first lens group 11 has the above configuration, spherical aberration and axial chromatic aberration can be favorably corrected. Further, in the single-focus optical system 1 of such a configuration, since the second lens group 12 has the above configuration, curvature of field can be favorably corrected; an amount of focusing movement is reduced, and the lens weight load on a drive device is reduced. Still further, in the single-focus optical system 1 of such a configuration, since the third lens group 13 has the above configuration, the lens is downsized as a so-called telephoto type lens, and the incident angle, into the image plane, of a light beam having a wide angle of view is controlled.

Further, in the above single-focus optical systems 1, the following conditional expression (10) is preferably satisfied, where a maximum image height is defined to be Y' and the axial distance from the apex of surface of the most object side lens surface to the image plane (each distance is an air equivalent distance if a parallel plate is included) is defined go be TL.

$$0.3 < Y'/TL < 0.9 \tag{10}$$

In a single-focus optical system 1 of such a configuration, when the upper limit of conditional expression (10) is exceeded, an eccentric error sensitivity is remarkably enhanced and productivity is markedly decreased, which is unfavorable. On the other hand, when the lower limit of conditional expression (10) exceeded, a module size becomes larger, which is unfavorable.

Further, to increase the above effects, the following conditional expression (10') is more preferably satisfied than the conditional expression (10).

$$0.52 < Y'/TL < 0.8 \tag{10'}$$

Still further, in the above single-focus optical systems, the following conditional expression (11) is preferably satisfied, where a maximum half view angle (deg.) is defined to be w, $$28 < w < 50 \tag{11}$$

In a single-focus optical system 1 of such a configuration, an amount of focusing movement for imaging at a closest focusing distance is controlled and the optical system is accordingly downsized.

Further, to increase the above effects, the following conditional expression (11') is more preferably satisfied than the conditional expression (11).

$$30 < w < 40 \tag{11'}$$

Still further, in the above single-focus optical systems, the following conditional expressions (12) and (13) are preferably satisfied, where F-number with respect to light from infinity is defined to be Fn; the axial distance from the most object side surface of the third lens group to the image plane is defined to be Tgs; and the axial distance from the apex of surface of the most object side lens surface to the image plane (each distance is an air equivalent distance if a parallel plate is included) is TL.

$$Fn < 3.2 \tag{12}$$

$$0.15 < Tgs/TL < 0.8 \tag{13}$$

In a single-focus optical system 1 of such a configuration, since the conditional expression (12) is satisfied, the ratio of the size of dust adhered on the lens surface to the entire light beam can be drastically reduced. Further, when the upper limit of the conditional expression (13) is exceeded, distortion is inadequately corrected, and the total optical length is increased, which is unfavorable. On the other hand, when the lower limit of conditional expression (13) is exceeded, the possibility that the size of dust adhered on the lens surface taken into an image is markedly increased, resulting in decreased productivity, which is unfavorable.

Further, to increase the effect of the above respect, the conditional expressions (12') and (13') are more preferably satisfied than the conditional expressions (12) and (13).

$$Fn<3.0 \tag{12'}$$

$$0.25<Tgs/TL<0.60 \tag{13'}$$

Still further, in the above single-focus optical systems 1, to drive a movable second lens group 12, a cam or a stepping motor may be used or a piezoelectric actuator may be employed. When a piezoelectric actuator is used, while the increase of drive device volume and power consumption is controlled, each group can be independently driven, an image pickup device can be further downsized.

In the above single-focus optical systems 1, all lens surfaces in contact with air are preferably aspherical. This configuration allows the lens to be downsized and image quality to be enhanced.

Further, in the above single-focus optical systems 1, since a glass lens having an aspherical surface is used, this aspherical glass lens may be a glass mold aspherical lens, a ground aspherical glass lens, or a complex aspherical lens (a lens in which an aspherical surface is formed of resin on an aspherical glass lens). The glass mold aspherical lens is suitable for mass production and is preferable. With regard to the complex aspherical lens, since there are many kinds of glass material able to serve as a substrate, the degree of freedom in design is increased. Especially for an aspherical lens employing a high refractive index material, since it is not easily molded, a complex aspherical lens is preferable. Further, in the case of a one-side-aspherical-surface lens, the advantage of the complex aspherical lens can be utilized to a maximum extent.

Still further, in the above single-focus optical systems 1, when a plastic lens is used, preferably used is a lens molded of a plastic material (resin material) in which particles of a maximum length of 30 nm or less.

In general, a transparent resin material is difficult to use as optical material because when it is mixed with fine particles, light is scattered and then transmittance is decreased. However, when the size of fine particles is smaller than the wavelength of transmitted light beam, light is not substantially scattered. And, refractive index of resin material is decreased with temperature. In contrast, the refractive index of inorganic particles is increased with temperature. Therefore, these temperature dependences cancel each other to cause almost no change in refractive index with temperature. In more particular, when inorganic fine particles of a maximum length of 30 nm or less are dispersed in resin material as a base material, the temperature dependency of refractive index of the resin material is reduced. For example, fine particles of niobium oxide ($Nb_2O_5$) are dispersed in acrylic resin. In the above single-focus optical systems 1, when for a positive lens with relatively large refractive power (for example, in the example shown in FIG. 1, the positive lens 111 of the first lens group 11 or the positive meniscus lens 121 of the second lens group 12) or for all lenses (in the example shown in FIG. 1, all the lenses 111, 112, 121, 131, and 132), plastic material in which such inorganic particles are dispersed is used, variation, of the position of an image point of the entire imaging lens system, depending on temperature is reduced.

A plastic lens in which such inorganic fine particles are dispersed is preferably molded as described below.

The temperature-dependent change in refractive index will now be described. The temperature-dependent change n(T) in refractive index is represented by the expression (Fa) in which refractive index n is differentiated with respect to temperature T based on Lorentz-Lorenz Formula.

$$n(T)=((n^2+2)\times(n^2-1))/6n\times(-3\alpha+(1/[R])\times(\partial[R]/\partial T)) \tag{Fa}$$

where α represents linear expansion coefficient and [R] represents molecular refraction.

In the case of resin material, in general, contribution of the second argument to the temperature dependence of refractive index is smaller than that of the first argument in the expression (Fa), and the second argument is thus almost negligible. For example, in the case of PMMA resin, coefficient α of linear expansion is $7\times10^{-5}$, and it is substituted into the expression (Fa), thereby obtaining the following expression.

$$n(T)=-12\times10^{-5}(/° C.)$$

This expression is nearly equal to an actual measurement value.

In particular, the temperature-dependent change n(T) in refractive index, which is conventionally about $-12\times10^{-5}$ (/° C.), is preferably controlled to be less than $8\times10^{-5}$ (/° C.) in absolute value, more preferably less than $6\times10^{-5}$ (/° C.) in absolute value.

Therefore, for such a resin material, a polyolefin resin material, a polycarbonate resin material, or a polyester resin material is preferable. The temperature-dependent change n(T) in refractive index of polyolefin resin material is about $-11\times10^{-5}$ (/° C.); the temperature-dependent change n(T) in refractive index of polycarbonate resin material is about $-14\times10^{-5}$ (/° C.); and the temperature-dependent change n(T) in refractive index of polyester resin material is about $-13\times10^{-5}$ (/° C.).

<Description of Digital Apparatus Incorporating a Single-Focus Optical System>

In the following, a digital apparatus incorporating the above single-focus optical system 1 will now be described.

Figure 3:
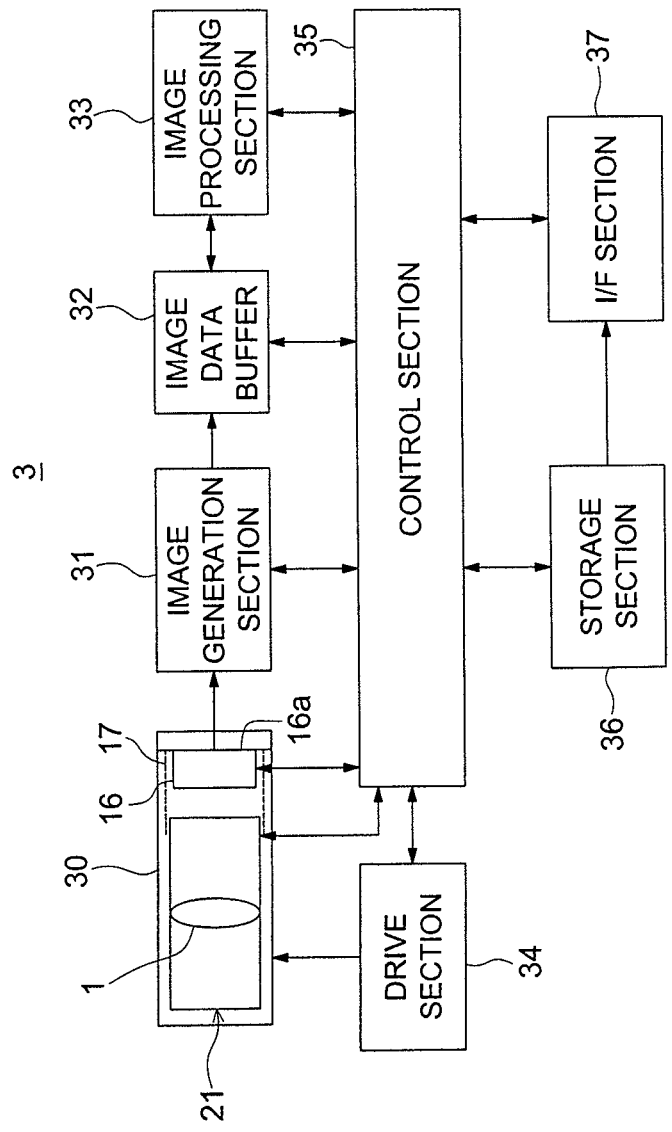
FIG. 3 is a block diagram showing a configuration of a digital apparatus of the embodiment.

FIG. 3 is a block diagram showing a configuration of a digital apparatus of the embodiment Digital apparatus 3 is provided with, for an imaging function, an imaging section 30, an image generation section 31, an image data buffer 32, an image processing section 33, a drive section 34, a control section 35, a storage section 36, and an I/F section 37. As the digital apparatus 3, there can be listed, for example, a digital still camera, a video camera, a surveillance camera (a monitoring camera), a mobile terminal such as a mobile phone or a portable information terminal (PDA), a personal computer, and a mobile computer. Peripheral devices thereof (for example, a mouse, a scanner, and a printer) may be included. The single-focus optical system 1 of the present embodiment is especially preferably mounted on a mobile terminal because the optical system is adequately downsized for mobile terminals such as a mobile phone or a portable information terminal (PDA).

The imaging section 30 is provided with an image pickup device 21 and an imaging element 16. The image pickup device 21 is provided with a single-focus optical system 1 as shown in FIG. 1 functioning as an imaging lens; and a not-shown lens drive device, for focusing by driving a second lens group 12 in the optical axis direction. A light beam from a subject is focused by the single-focus optical system 1 on the light receiving surface of the imaging element 16 to make an optical image of the subject.

The imaging element 16 converts an optical image of the subject having been formed by the single-focus optical system 1 as described above into an electrical signal (an image signal) of each of the color components R, G, and B and outputs the electrical signals to the image generation section 31 as an image signal of each of the colors R, G, and B. In the imaging element 16, the control section 35 controls an imaging operation such as imaging of either a still image or a moving image or reading-out of an output signal of each pixel in the imaging element 16 (horizontal synchronization, vertical synchronization, and transfer).

The image generation section 31 performs amplification and digital conversion on an analog output signal from the imaging element 16 and performs well-known image processings such as determination of an appropriate black level of the entire image, γ correction, white balance adjustment (WB adjustment), contour correction, and correction of color unevenness to generate image data from the image signals. The image data having been generated in the image generation section 31 are output to the image data buffer 32.

The image data buffer 32 temporarily stores the image data and serves as a memory used as an operation area to perform processing, to be described later, for the image data by the image processing section 33, and is constituted, for example, of a RAM (Random Access Memory) which is a volatile memory element.

The image processing section 33 is a circuit to perform a predetermined image processing such as resolution conversion.

Further, the image processing section 33 may be constituted, if necessary, so as to perform correction of aberration having been insufficiently corrected by the single-focus optical system 1, such as a well-known distortion correction processing to correct distortion in an optical image of a subject formed on the light receiving surface of the imaging element 16. In distortion correction, an image distorted by aberration is corrected into a natural image with almost no distortion which is homothetic with a scene viewed with the naked eye. Such a configuration makes it possible to generate a natural image with almost no distortion even if an optical image of a subject having been introduced into the imaging element 16 by the single-focus optical system 1 has been distorted. Further, in a configuration in which such distortion is corrected by image processing through information processing only other aberrations except distortion need to be considered, whereby the degree of freedom to design a single-focus optical system 1 is specifically increased, resulting in ease of designing. Still further, in the configuration in which such distortion is corrected by image processing through information processing the aberration load of a lens close to the image plane is especially reduced, and whereby exit pupil position is easily controlled with the result that the lens has a shape of excellent workability.

Further, the image processing section 33, if necessary, may incorporate a well-known correction processing for decrease in rim intensity to correct decrease in rim intensity in an optical image of a subject formed on the light receiving surface of the imaging element 16. Correction for decrease in rim intensity (shading correction) is performed in such a manner that correction data for correcting decrease in rim intensity is previously stored and a taken image (pixel) is then multiplied by the correction data. Since such decrease in rim intensity is generated mainly by the incident angle dependence of the sensitivity of the imaging element 16, lens vignetting, and the cosine fourth law, the correction data is set at a predetermined value so as to correct illuminance drop generated by these factors. Such a configuration makes it possible to generate an image having sufficient rim intensity even if decrease in rim intensity has been generated in an optical image of a subject having been introduced into the imaging element 16 by the single-focus optical system 1.

Further, the image processing section 33, if necessary, may incorporate a well-known focal depth correction processing to increase focal depth by information processing. For example, such an image processing section 33 is a two-dimensional digital filter and performs spatial frequency filtering to filter a component having a predetermined spatial frequency range, for example. When the single-focus optical system 1 has chromatic aberration in the optical axis direction, it forms focal points at different positions depending on wavelength on the basis of axial chromatic aberration. Thus, an image obtained by the imaging element 16 is a superposed image, in which a plurality of images having different depth with respect to the object plane are superposed together, and contains a focused image at a focused position and defocused images before and after the focused position. Therefore, this superposed image is degraded in the intermediate range of spatial frequency, and the image processing section 33 restores this degradation by the spatial frequency filtering. For example, edge enhancement is performed lightly in the range outside the intermediate range of spatial frequency, and edge enhancement is performed heavily in the intermediate range of spatial frequency. Thereby, from the superposed image, an image having increased focal depth is obtained (for example, refer to Japanese Laid-open Patent Application Publication Nos. 2007-047228, 2009-134024, and 2003-235794.) In a configuration in which such focal depth correction processing is performed, focal depth is increased and whereby variations in components are allowable, resulting in increased productivity. Further, when a drive device such as the above lens drive device is used, the position error and the eccentric error of the drive device can be absorbed.

The drive section 43 operates a not-shown lens drive device, on the basis of a control signal output from the control section 35 to drive the second lens group 12 of the single-focus optical system 1 for desired focusing.

The control section 35 is provided with, for example, a microprocessor and a peripheral circuit thereof and controls the operations of the imaging section 30, the image generation section 31, the image data buffer 32, the image processing section 33, the drive section 34, the storage section 36, and the I/F section 37, on the basis of each function. That is, this control section 35 controls the image pickup device 21 to perform imaging of at least either of a still image and a moving image.

The storage section 36 is a storage circuit to store image data generated by still image shooting or moving image shooting of a subject, and is provided with, for example, a ROM (Read Only Memory) being a nonvolatile memory element, an EEPROM (Electrically Erasable Programmable Read Only Memory) being a rewritable nonvolatile memory element, or a RAM. Namely, the storage section 36 functions as a still image and moving image memory.

The I/F section 37 is an interface to transmit and receive image data to and from external devices, and is, for example, an interface conforming to a standard such as USB or IEEE 1394.

The imaging operation on the digital apparatus 3 of such a configuration will now be described.

In the case of shooting a still image, the control section 35 controls the image pickup device 21 to take a still image and operates the not-shown lens drive device of the image pickup device 21 through the drive section 34 to move the second lens group 12 to focus. Thus, focused optical images are periodically repeatedly formed on the light receiving surface of the imaging element 16, and then converted into an image signal of each of the color components of R, G, and B, and the signal is output to the image generation section 31. This image signal is temporarily stored in the image data buffer 32 and then image-processed by the image processing section 33, and an image based on the image signal is then displayed on a display (not shown). Then, the photographer refers to the display, and whereby the main subject can be adjusted to be positioned in a desired location on the screen. In this state, when a so-called shutter bottom (not shown) is pressed, image data is stored in the storage section 36 serving as a still image memory, whereby a still image is obtained.

Further, in the case of shooting a moving image, the control section 35 controls the image pickup device 21 to take a moving image. Thereafter, in the same manner as in the case of shooting a still image, the photographer refers to the display (not shown) to adjust the subject image having been obtained via the image pickup device 21 to be positioned in a desired location on the screen. When the shutter bottom (not shown) is pressed, a moving image shooting is started. Then, when a moving image is taken, the control section 35 controls the image pickup device 21 to take a moving image, and operates the not-shown lens drive device of the image pickup device 21 through the drive section 34 for focusing. Thus, focused optical images are periodically cyclically formed on the light receiving surface of the imaging element 16 and are converted into an image signal of each of the color components of R, G, and B, and the signal is output to the image generation section 31. This image signal is temporarily stored in the image data buffer 32 and then image-processed by the image processing section 33, whereby an image based on the image signal is displayed on the display (not shown). Then, when the shutter bottom (not shown) is pressed again, the moving image shooting is terminated. A moving image having been taken is introduced into the storage section 36 as the moving image memory and is stored there.

An image pickup device 21 and a digital apparatus 3 of such a configuration are provided with a single-focus optical system 1 which is more downsized and has higher performances than the conventional optical systems and in which other specifications (for example, specifications on F-number and a closest focusing distance) and the productivity are not adversely affected and the measures to deal with adhering dust which is recently problematic in the mass production process is solved. The image pickup device 21 and the digital apparatus 3 using such a single-focus optical system 1 are provided. In particular, since the single-focus optical system 1 is downsized and has higher performances, an imaging element 16 of high resolution can be employed and downsizing is realized. In particular, since the single-focus optical system 1 is applicable to a small size high resolution imaging element it is suitable for mobile terminals, in which pixel resolution enhancement and performance enhancement are in progress. As one example thereof the case where the image pickup device 21 is mounted in a mobile phone will now be described.

Figure 4A:
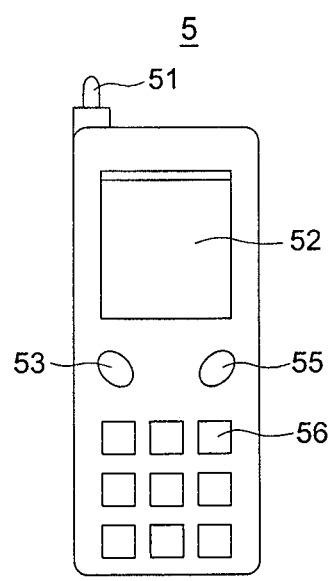
FIGS. 4A and 4B are an external view of a camera-equipped mobile phone and show an embodiment of the digital apparatus.
Figure 4B:
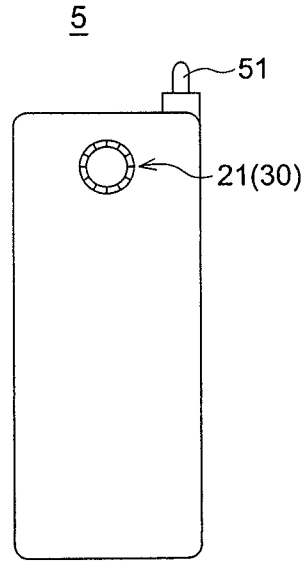

FIGS. 4A and 4B are external views of a camera-equipped mobile phone and show one embodiment of a digital apparatus. FIG. 4A shows the operation side of the mobile phone and FIG. 4B shows the side opposite to the operation side, i.e. the back side.

In FIGS. 4A and 4B, a mobile phone 5 is provided with an antenna 51 at the top portion. As shown in FIG. 4A, the operation side is provided with a rectangular display 52, an imaging button 53 to start an imaging mode and to switch between still image shooting and moving image shooting, a shutter button 55, and a dial button 56.

And, this mobile phone 5 incorporates a circuit to realize a telephone function using a mobile phone network, as well as an imaging section 30, an image generation section 31, an image data buffer 32, an image processing section 33, a drive section 34, a control section 35, and a storage section 36 as described above, in which an image pickup device 21 of the imaging section 30 is provided on the rear side.

When the imaging button 53 is operated, a control signal representing the contents of how it was operated is output to the control section 35, and then the control section 35 executes operations such as initiation and execution of the still image shooting mode, or initiation and execution of the moving image shooting mode, in response to the operation content. Then, when the shutter button 55 is operated, a control signal representing this operation content is output to the control section 35. The control section 35 executes operations such as still image shooting or moving image shooting in response to the operation content Herein, in the above image pickup devices 21, when the pixel size (μm) of the imaging element 16 is defined to be PX and the axial light beam radius (mm) closest to the object side surface of the third lens group 13 is defined to be h3, the following conditional expression (14) is preferably satisfied.

$$1 < PX/h3 < 5 \quad (14)$$

Since the image pickup device 21 of such a configuration satisfies conditional expression (14), even in the case of use of an high resolution imaging element 16 or a small pixel pitch imaging element 16, the size of the taken image of dust having adhered on the lens surface is drastically reduced and a decrease in productivity caused by dusts is prevented.

Further, to increase the above effects, the conditional expression (14') is more preferably satisfied than the above conditional expression (14).

$$2 < PX/h3 < 5 \quad (14')$$

Still further, in the above image pickup devices 21, a structural body 17 is preferably provided in which the space between the third lens group 13 and the imaging surface of the imaging element 16 is sealed. Such a structure body 17 is a cylindrical body made of a certain material, and the lens barrel of a single-focus optical system 1 is arranged at one end portion of the cylindrical body such that the lens barrel is wrapped around, and the base body 16a equipped with an imaging element 16 is arranged in the other end portion of the cylindrical body, as shown by the dashed lines in FIG. 3, for example. Further, for example, since the third lens group 13 of the single-focus optical system 1 of the present embodiment is fixed, such a structure body 17 may be constituted integrally with the lens barrel of the single-focus optical system 1 (or may be part of the lens barrel of the single-focus optical system 1). Since the image pickup device 21 of such a configuration has the structure body 17, dusts are prevented from adhering in the vicinity area of the imaging surface in which light beam is extremely narrow, whereby decrease in productivity is prevented.

<Description of a More Specific Embodiment of a Single-Focus Optical System>

There will be described, with reference to the drawings, specific configurations of the single-focus optical system 1 as shown in FIG. 1, that is, the single-focus optical system 1 provided for an image pickup device 21 mounted in the digital apparatus 3 as shown in FIG. 3.

EXAMPLES

Example 1

Figure 5:
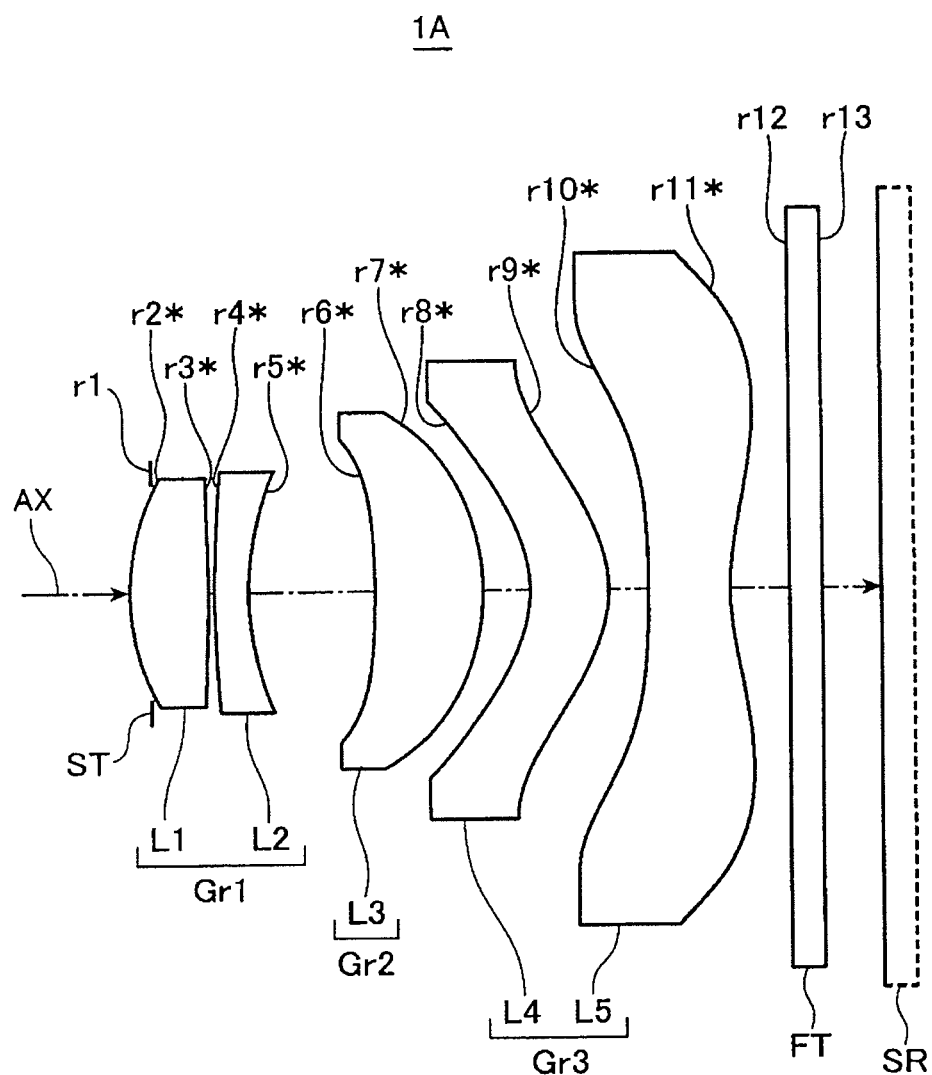
FIG. 5 is a cross-sectional view showing an arrangement of lens groups of a single-focus optical system of Example 1.
Figure 21:
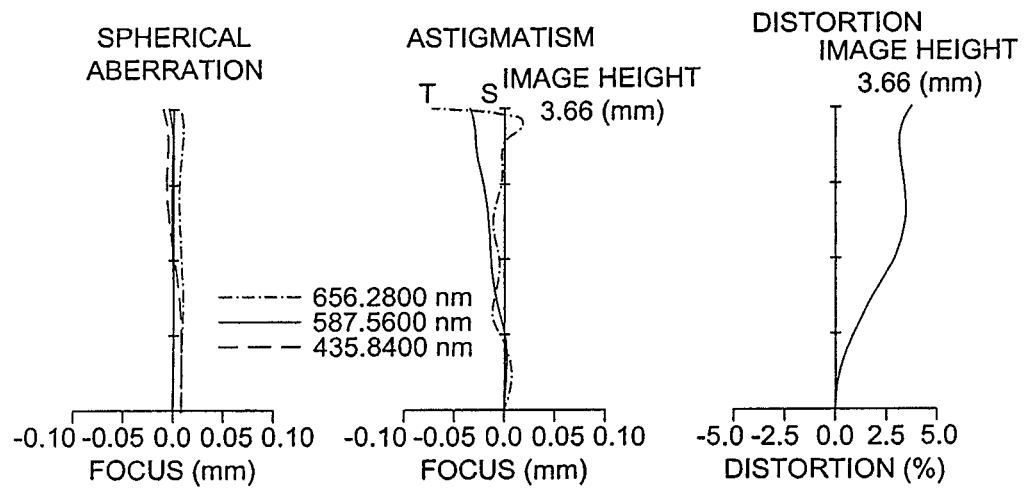
FIG. 21 is an aberration diagram of the single-focus optical system of the embodiment 1.

FIG. 5 is a cross-sectional view showing an arrangement of lens groups in a single-focus optical system of Example 1. FIG. 21 shows aberration diagrams of the single-focus optical system of Example 1. FIG. 21 shows the infinite case. The above description is applied to Example 2-Example 17 to be described later.

In the single-focus optical system 1A of Example 1, each of the lens groups (Gr1, Gr2, and Gr3) is arranged in order from the object side to the image side as shown in FIG. 5, and when focusing (focus adjustment) is performed, the first lens group (Gr1) is fixed with respect to a predetermined imaging surface; the second lens group (Gr2) is moved in the optical axis AX direction; and the third lens group (Gr3) is fixed with respect to the predetermined imaging surface.

Since such an optical system employing an inner-focusing system has a mechanism for moving in an optical axis direction for focus adjustment, the number of mechanical parts is increased and eccentricity tends to occur in which the central position of a lens shifts in the direction perpendicular to the optical axis. That is, there is an issue that the optical system is easy to suffer adverse effects (for example, asymmetric blur) due to the eccentricity generated during production. For this reason, to correct eccentricity during optical system assembling, it is preferable to adjust the optical axis (optical adjustment).

In more details, in the single-focus optical system 1A of Example 1, the lens groups (Gr1, Gr2, and Gr3) are constituted in order from the object side to the image side as described below.

The first lens group (Gr1) is constituted of a biconvex positive lens (a first lens L1) and a negative meniscus lens (a second lens L2) convex toward the object side. An aperture stop ST is arranged on the object side of the first lens L1 in the first lens group (Gr1). Since the aperture stop ST is arranged on the most object side, the exit pupil is distanced and the angle of light beam entering the image plane is thus close to telecentric, which is advantageous. The aperture stop may be, in the similar way, an aperture stop, a mechanical shutter, or a variable stop in Example 2-Example 17 to be described later.

The second lens group (Gr2) is constituted of a positive meniscus lens (a third lens L3) convex toward the image side.

The third lens group (Gr3) is constituted of a positive meniscus lens (a fourth lens L4) convex toward the image side and a biconcave negative lens (a fifth lens L5). And, the fifth lens L5 has at least one aspherical surface which has a positive optical power in the periphery. Alternatively, the fifth lens L5 is a lens having an aspherical shape which has an inflection point at a position other than the position which is the intersection of the aspherical shape and the optical axis Both faces of each of the lenses L1-L5 of the first lens group Gr1 to third lens groups Gr3 are aspherical, and these lenses are made of resin material.

In addition, on the image side of the third lens group Gr3, the light receiving surface of the imaging element SR is arranged with a parallel flat plate FT serving as a filter therebetween. The parallel flat plate FT may be various types of optical filter of a cover glass of the imaging element SR In the optical designing a consideration has been made so that the variation of the curvature of field stayed small even when only the second lens group is moved. Thus, it has become easy to correct aberration in the macro photo range, and the degree of freedom to ensure the performances in macro photo has been increase.

In FIG. 5, number ri (i=1, 2, 3, . . . ) assigned to each lens surface represents the i-th order, of lens surface, counted from the object side (herein, the cemented surface between lenses is counted as one surface), and a surface assigned with number ri with the mark "*" represents an aspherical surface. Herein, the aperture stop ST, both faces of the parallel flat plate FT, and the light receiving surface of the imaging element SR each are counted as one surface. Such count and the meanings of the symbols are similar for Example 2-Example 17 to be described later (FIG. 6-FIG. 21). However, this does not mean that they are exactly the same. For example, in each of FIG. 6-FIG. 21 of Examples 1-17, the same symbol (r1) is assigned to the lens surface arranged the most object side; however, that does not mean that the curvatures thereof are the same for Example 1-Example 17.

In such a configuration, light beam having entered from the object side passes along the optical axis AX, through the aperture stop ST, the first lens group (Gr1), the second lens group (Gr2), the third lens group (Gr3), and the parallel flat plate FT in this order to form an optical image of an object on the light receiving surface of the imaging element SR. Then, in the imaging element SR, the optical image is converted into an electrical signal. This electrical signal is subjected to a predetermined digital processing, if necessary, to be stored in a memory of a digital apparatus such as a digital camera as a digital image signal or to be transmitted to another digital apparatus by cable or wireless communication through an interface.

Construction data of the lenses of the single-focus optical system 1A of Example 1 are listed below.

Numerical Example 1

| | Unit: mm | | | |
|---|---|---|---|---|
| | Surface Data | | | |
| Surface Number | r | d | nd | vd |
| Object Plane | ∞ | ∞ | | |
| 1(Aperture Stop) | ∞ | −0.198 | | |
| 2* | 2.233 | 0.719 | 1.54470 | 56.15 |
| 3* | −10.845 | 0.057 | | |
| 4* | 8.923 | 0.309 | 1.63200 | 23.41 |
| 5* | 2.541 | 1.153 | | |
| 6* | −8.649 | 0.989 | 1.54470 | 56.15 |
| 7* | −2.164 | 0.434 | | |
| 8* | −1.236 | 0.717 | 1.54470 | 56.15 |
| 9* | −1.208 | 0.365 | | |
| 10* | −13.767 | 0.741 | 1.54470 | 56.15 |
| 11* | 2.216 | 0.545 | | |
| 12 | ∞ | 0.300 | 1.51633 | 64.14 |
| 13 | ∞ | 0.539 | | |
| Image Plane | ∞ | | | |

Aspherical Data

Surface 2

K = 2.7712e−001, A4 = 1.0727e−003, A6 = −9.7461e−004,
A8 = 4.9097e−003, A10 = −3.5422e−003, A12 = 1.7884e−005,
A14 = 9.0659e−004
Surface 3

K = 3.0000e+001, A4 = 2.8807e−002, A6 = 4.4642e−003,
A8 = −2.4924e−002, A10 = 3.6660e−002, A12 = −2.7454e−002,
A14 = 9.1980e−003

-continued

Unit: mm

Surface 4

K = 9.1369e+000, A4 = −3.1674e−002, A6 = 4.1982e−002,
A8 = −5.9335e−002, A10 = 5.9406e−002, A12 = −3.2711e−002,
A14 = 7.6099e−003

Surface 5

K = −3.4710e+000, A4 = −2.0407e−002, A6 = 2.8638e−002,
A8 = 1.7930e−003, A10 = −2.9256e−002, A12 = 3.9051e−002,
A14 = −2.1808e−002, A16 = 4.4472e−003

Surface 6

K = −3.0000e+001, A4 = −2.9093e−002, A6 = −2.0359e−002,
A8 = 2.0323e−002, A10 = −1.7842e−002, A12 = 6.3347e−003,
A14 = −7.7790e−004

Surface 7

K = −2.1956e+000, A4 = −2.6890e−002, A6 = 3.6781e−003,
A8 = −1.2738e−002, A10 = 8.5083e−003, A12 = −3.1449e−003,
A14 = 4.4186e−004

Surface 8

K = −2.2049e+000, A4 = −1.9560e−002, A6 = 1.0650e−002,
A8 = −4.7651e−004, A10 = −9.6018e−004, A12 = 1.6999e−004,
A14 = −7.3347e−006

Surface 9

K = −3.1011e+000, A4 = −3.9066e−002, A6 = 2.1035e−002,
A8 = −3.2228e−003, A10 = 1.9546e−004, A12 = −6.9519e−006,
A14 = 1.4390e−006

Surface 10

K = 1.0018e+001, A4 = −3.2152e−002, A6 = 2.7496e−003,
A8 = 3.7554e−004, A10 = −8.9298e−005, A12 = 1.2850e−005,
A14 = −7.8443e−007

Surface 11

K = −1.3055e+001, A4 = −2.0428e−002, A6 = 3.3677e−003,
A8 = −7.8814e−004, A10 = 1.1238e−004, A12 = −9.0963e−006,
A14 = 3.1728e−007

Other Data

| | |
|---|---|
| Focal Length | 5.676 |
| F-NUMBER | 2.800 |
| Angle of View | 31.835 |
| Image Height | 3.658 |
| Overall Lens Length | 6.568 |
| BF | 1.282 |

Lens Data

| Lens | Front Surface | Back Surface | Focal Length |
|---|---|---|---|
| 1 | 2 | 3 | 3.467 |
| 2 | 4 | 5 | −5.729 |
| 3 | 6 | 7 | 5.030 |
| 4 | 8 | 9 | 9.739 |
| 5 | 10 | 11 | −3.448 |

Lens Group Data

| Group | Front Surface | Back Surface |
|---|---|---|
| 1 | 2 | 5 |
| 2 | 6 | 7 |
| 3 | 8 | 11 |

Herein, when the optical system is extended, the third lens L3 is moved to the object side. The extension amount from the infinite object distance to the object distance 10 cm is 0.221 mm. The same definition is applied to the following Examples unless them is any different description.

In the above surface data, each surface number corresponds to number i in symbol ri (=1, 2, 3, . . . ) assigned to each lens surface shown in FIG. 5. A surface having number i with * represents an aspherical surface (a refractive optical surface of an aspherical shape or a surface having a refractive action equivalent to that of an aspherical surface).

Further, "r" represents the curvature radius of each surface (unit mm) and "d" represents the distance on the optical axis of the lens surfaces in the infinite distance focus state (axial surface distance). And, "nd" represents the refractive index of the lenses with respect to the d-line (wavelength: 587.56 nm), and "vd" represents Abbe number. Herein, since surfaces of the aperture stop ST, both surfaces of the parallel flat plate FT, and the light receiving surface of the imaging element SR are flat, the curvature radii thereof are ∞ (infinity).

The above aspherical data represents a quadric surface parameter (constant of the cone K) and aspherical coefficients Ai (i=4, 6, 8, 10, 12, 14, and 16) of an aspherical surface (in the surface data, a surface having number i with *). Herein, the aspherical shape of an optical surface is defined by following expression using a local rectangular coordinate system (x, y, z), in which the apex of surface is defined to be the origin and the direction toward the imaging element from the object is defined to be the positive direction of the z axis:

$$z(h)=ch^2/[1+\sqrt{\{1-(1+K)c^2h^2\}}]+\Sigma Ai \cdot h^i$$

where:

z(h) represents the displacement amount of the z axis direction at a position of height h (with respect to the apex of surface);

h represents the height of the direction perpendicular to the z axis ($h^2=x^2+y^2$);

c represents paraxial curvature (=1/curvature radius);

Ai represents the i-th aspherical coefficient; and

K represents quadric surface parameter (conical coefficient).

And, in the above aspherical data, "en" means "10 to the power of n." For example, "e+001" means "10 to the power of +1" and "e−003" means "10 to the power of −3."

Aberrations of the single-focus optical system 1A of Example 1 in the above lens a arrangement and the configuration are shown in FIG. 21. In FIG. 21, in order from the left side, spherical aberration (sine condition) (LONGITUDINAL SPHERICAL ABERRATION), astigmatism (ASTIGMATISM FIELD CURVE), and distortion (DISTORTION) are shown. In the horizontal axis for the spherical aberration, focal position shift is represented by unit mm, and in the vertical axis, a value normalized by the maximum height of incidence is represented. In the horizontal axis of the astigmatism, focal position shift is represented by unit mm, and in the vertical axis, image height is represented by unit mm. In the horizontal axis of the distortion, actual image height is represented by the ratio (%) with respect to an ideal image height, and in the vertical axis, the image height is represented by unit mm. Further, in the diagram of the astigmatism, the dashed line shows the result with respect to the tangential (meridional) surface and the solid line represents the result with respect to the sagittal (radial) surface.

In the diagram of the spherical aberration, the solid line, the dashed line (- - -), and the one-dot chain line (-•-•-) show aberration of three light beams of the d-line (wavelength: 587.56 nm), the g-line (wavelength: 435.84 nm), and the C-line (wavelength: 656.28 nm) respectively. In the diagrams of the astigmatism and distortion, each result using the d-line (wavelength: 587.56 nm) is shown.

The above-described treatment is similarly applied to the construction data in Examples 2-12 and 14-17 and the aberrations in FIG. 22 to FIG. 36, which are described below.

Example 2

Figure 6:
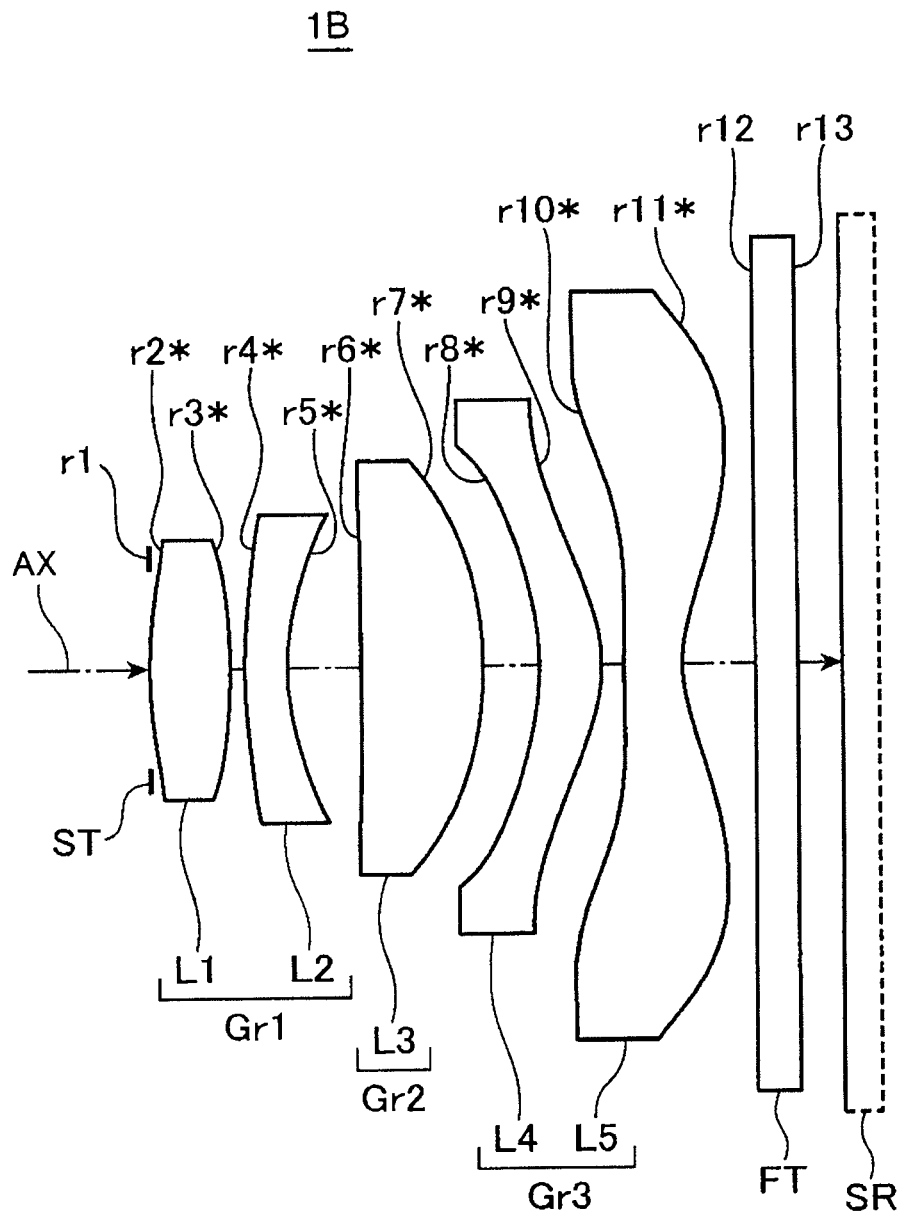
FIG. 6 is a cross-sectional view showing an arrangement of lens groups of a single-focus optical system of Example 2.
Figure 22:
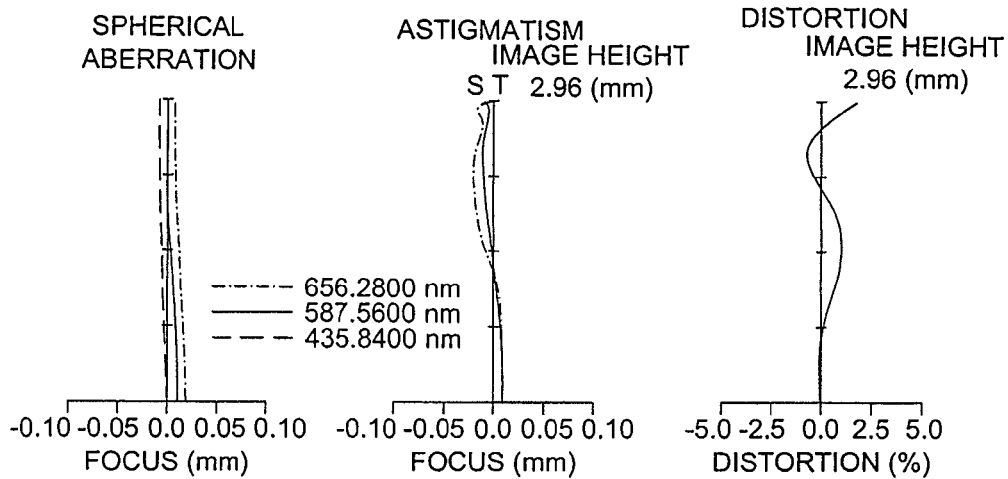
FIG. 22 is an aberration diagram of the single-focus optical system of the embodiment 2.

FIG. 6 is a cross-sectional view showing an arrangement of lens groups in a single-focus optical system of Example 2. FIG. 22 shows aberration diagrams of the single-focus optical system of Example 2.

In the single-focus optical system 1B of Example 2, each of the lens groups (Gr1, Gr2, and Gr3) is arranged in order from the object side to the image side as shown in FIG. 6, and when focusing is performed, the first lens group (Gr1) is fixed with respect to a predetermined imaging surface; the second lens group (Gr2) is moved in the optical axis AX direction; and the third lens group (Gr3) is fixed with respect to the predetermined imaging surface.

In more details, in the single-focus optical system 1B of Example 2, the lens groups (Gr1, Gr2, and Gr3) are constituted in order from the object side to the image side as described below.

The first lens group (Gr1) is constituted of a biconvex positive lens (a first lens L1) and a negative meniscus lens (a second lens L2) convex toward the object side. An aperture stop ST is arranged on the object side of the first lens L1 in the first lens group (Gr1).

The second lens group (Gr2) is constituted of a positive meniscus lens (a third lens L3) convex toward the image side.

The third lens group (Gr3) is constituted of a positive meniscus lens (a fourth lens L4) convex toward the image side and a negative meniscus lens (a fifth lens L5) convex toward the object side. And, the fifth lens L5 has at least one aspherical surface which has a positive optical power in the periphery. Alternatively, the fifth lens L5 is a lens having an aspherical shape which has an inflection point at a position other than the position which is the intersection of the aspherical shape and the optical axis.

Both faces of each of the lenses L1-L5 of the first lens group Gr1 to third lens groups Gr3 are aspherical, and these lenses are made of resin material.

In addition, on the image side of the third lens group Gr3, the light receiving surface of the imaging element SR is arranged with a parallel flat plate FT serving as a filter therebetween. The parallel flat plate FT may be various types of optical filter of a cover glass of the imaging element SR In such a configuration, light beam having entered from the object side passes, along the optical axis AX, through the aperture stop ST, the first lens group (Gr1) the second lens group (Gr2), the third lens group (Gr3), and the parallel flat plate FT in this order to form an optical image of an object on the light receiving surface of the imaging element SR. Then, in the imaging element SR, the optical image is converted into an electrical signal. This electrical signal is subjected to a predetermined digital processing, if necessary, to be stored in a memory of a digital apparatus such as a digital camera as a digital image signal or to be transmitted to another digital apparatus by cable or wireless communication through an interface.

Construction data of the lenses of the single-focus optical system 1B of Example 2 are listed below.

Numerical Example 2

| Unit: mm | | | | |
|---|---|---|---|---|
| Surface Data | | | | |
| Surface Number | r | d | nd | vd |
| Object Plane | ∞ | ∞ | | |
| 1(Aperture Stop) | ∞ | 0.000 | | |
| 2* | 2.746 | 0.566 | 1.54470 | 56.15 |
| 3* | −4.101 | 0.107 | | |
| 4* | 3.103 | 0.300 | 1.63200 | 23.41 |
| 5* | 1.470 | 0.521 | | |
| 6* | −6748.984 | 0.864 | 1.54470 | 56.15 |
| 7* | −2.223 | 0.400 | | |
| 8* | −1.645 | 0.443 | 1.54470 | 56.15 |
| 9* | −0.920 | 0.156 | | |
| 10* | 8.360 | 0.411 | 1.54470 | 56.15 |
| 11* | 0.846 | 0.515 | | |
| 12 | ∞ | 0.300 | 1.51633 | 64.14 |
| 13 | ∞ | 0.317 | | |
| Image Plane | ∞ | | | |

Aspherical Data

Surface 2

K = −2.1117e+000, A4 = −1.8191e−002, A6 = −5.4308e−002, A8 = 3.4677e−002, A10 = −7.3865e−002, A12 = 2.4202e−002, A14 = 5.6543e−003

Surface 3

K = 1.5396e+001, A4 = −1.9406e−002, A6 = 2.3212e−002, A8 = −6.0179e−002, A10 = 1.4252e−001, A12 = −1.9915e−001, A14 = 1.1852e−001

Surface 4

K = −1.5200e+001, A4 = −8.8510e−002, A6 = 7.8604e−002, A8 = −1.7892e−002, A10 = 8.7562e−003, A12 = −2.3182e−003, A14 = −1.8490e−003

Surface 5

K = −4.1860e+000, A4 = −1.9576e−002, A6 = 4.2524e−002, A8 = −2.0641e−002, A10 = 2.2937e−002, A12 = −1.5231e−002, A14 = 2.9694e−003

Surface 6

K = 3.0000e+001, A4 = −6.9152e−003, A6 = −3.1152e−003, A8 = 1.3145e−003, A10 = −2.1262e−003, A12 = 2.0959e−003, A14 = −3.7192e−004

Surface 7

K = −2.8868e+000, A4 = −2.5831e−002, A6 = −1.1871e−002, A8 = 3.4459e−003, A10 = −2.0246e−003, A12 = −2.9501e−004, A14 = 4.6201e−004

Surface 8

K = −7.3834e+000, A4 = −3.4679e−002, A6 = 2.7118e−002, A8 = −1.3450e−002, A10 = −4.6523e−003, A12 = 3.1923e−003, A14 = −5.9057e−004

Surface 9

K = −4.8827e+000, A4 = −1.1909e−002, A6 = 2.7798e−002, A8 = −1.0126e−002, A10 = 1.5346e−003, A12 = 9.8706e−005, A14 = −4.0028e−005

Surface 10

K = −3.0711e+001, A4 = −1.3353e−001, A6 = 3.1976e−002, A8 = 4.5637e−004, A10 = −8.1940e−004, A12 = 6.9868e−005, A14 = −3.5054e−007

Surface 11

K = −5.9970e+000, A4 = −7.0594e−002, A6 = 2.1525e−002, A8 = −4.8949e−003, A10 = 5.1455e−004, A12 = −2.0944e−005, A14 = 4.0703e−007

-continued

Unit: mm

Other Data

| | |
|---|---|
| Focal Length | 3.750 |
| F-NUMBER | 2.800 |
| Angle of View | 37.846 |
| Image Height | 2.960 |
| Overall Lens Length | 4.808 |
| BF | 1.040 |

Lens Data

| Lens | Front Surface | Back Surface | Focal Length |
|---|---|---|---|
| 1 | 2 | 3 | 3.110 |
| 2 | 4 | 5 | −4.757 |
| 3 | 6 | 7 | 4.083 |
| 4 | 8 | 9 | 3.154 |
| 5 | 10 | 11 | −1.762 |

Lens Group Data

| Group | Front Surface | Back Surface |
|---|---|---|
| 1 | 2 | 5 |
| 2 | 6 | 7 |
| 3 | 8 | 11 |

The extension amount is 0.124 mm.

The spherical aberration (sine condition), astigmatism, and destortion 1B of Example 2 in the above lens arrangement and the configuration are shown in FIG. 22.

Example 3

Figure 7:
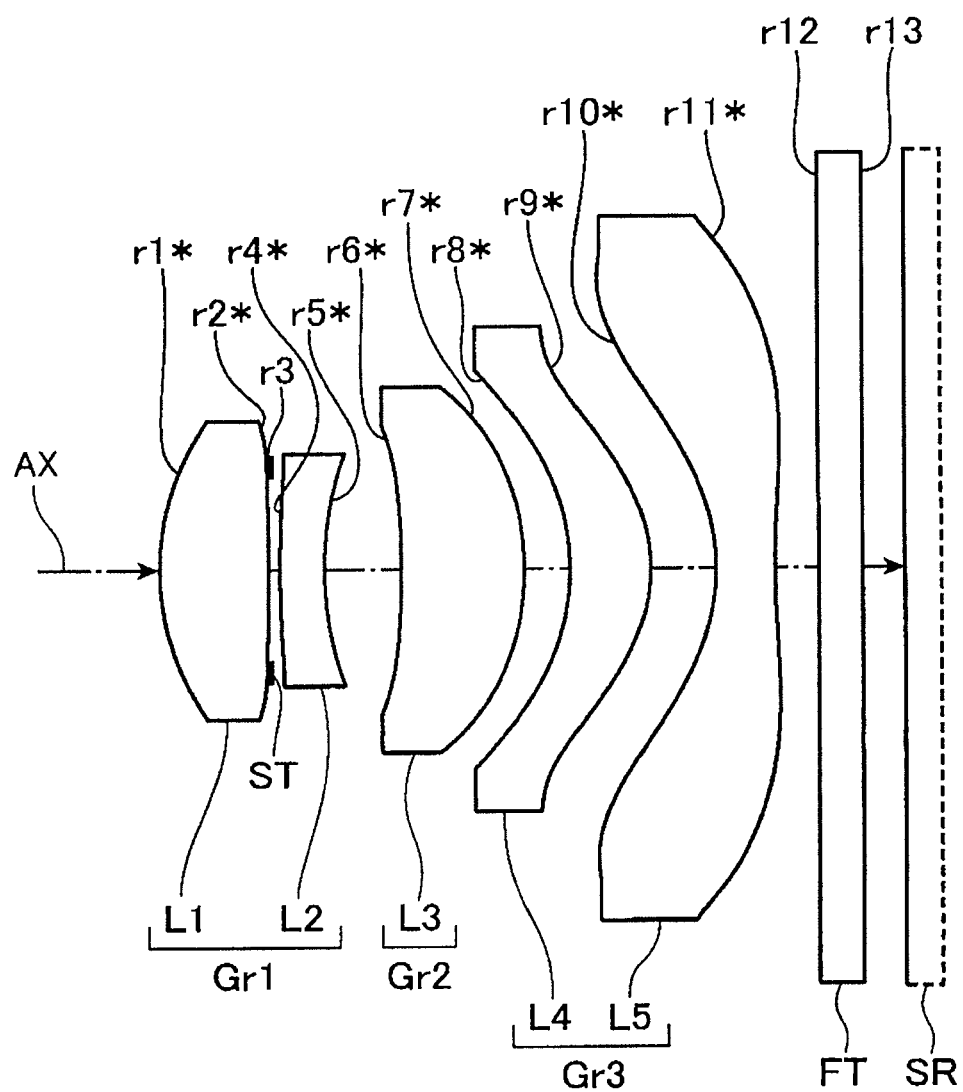
FIG. 7 is a cross-sectional view showing an arrangement of lens groups of a single-focus optical system of Example 3.
Figure 23:
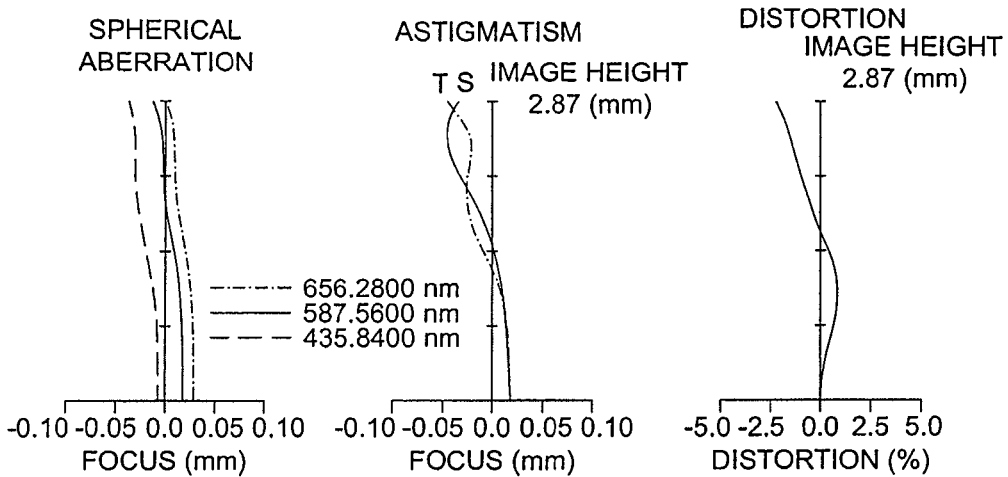
FIG. 23 is an aberration diagram of the single-focus optical system of the embodiment 3.

FIG. 7 is a cross-sectional view showing an arrangement of lens groups in a single-focus optical system of Example 3. FIG. 23 shows aberration diagrams of the single-focus optical system of Example 3.

In the single-focus optical system 1C of Example 3, each of the lens groups (Gr1, Gr2, and Gr3) is arranged in order from the object side to the image side as shown in FIG. 7, and when focusing is performed, the first lens group (Gr1) is fixed with respect to a predetermined imaging surface; the second lens group (Gr2) is moved in the optical axis AX direction; and the third lens group (Gr3) is fixed with respect to the predetermined imaging surface.

In more details, in the single-focus optical system 1C of Example 3, the lens groups (Gr1, Gr2, and Gr3) are constituted in order from the object side to the image side as described below.

The first lens group (Gr1) is constituted of a biconvex positive lens (a first lens L1), an aperture stop ST, and a negative meniscus lens (a second lens L2) convex toward the object side. The aperture stop ST is arranged between the first lens L1 and the second lens L2. It is advantageous in securing peripheral light intensity that the aperture stop ST is arranged between the first lens L1 and the second lens L2.

The second lens group (Gr2) is constituted of a positive meniscus lens (a third lens L3) convex toward the image side.

The third lens group (Gr3) is constituted of a positive meniscus lens (a fourth lens L4) convex toward the image side and a biconcave negative lens (a fifth lens L5). And, the fifth lens L5 has at least one aspherical surface which has a positive optical power in the periphery. Alternatively, the fifth lens L5 is a lens having an aspherical shape which has an inflection point at a position other than the position which is the intersection of the aspherical shape and the optical axis Both faces of each of the lenses L1-L5 of the first lens groups Gr1 to the third lens group Gr3 are aspherical, and these lenses are made of resin material.

In addition, on the image side of the third lens group Gr3, the light receiving surface of the imaging element SR is arranged with a parallel flat plate FT serving as a filter therebetween. The parallel flat plate FT may be various types of optical filter of a cover glass of the imaging element SR.

In such a configuration, light beam having entered from the object side passes, along the optical axis AX, through the first lens group (Gr1) including the aperture stop ST, the second lens group (Gr2), the third lens group (Gr3), and the parallel flat plate FT in this order to form an optical image of an object on the light receiving surface of the imaging element SR. Then, in the imaging element SR, the optical image is converted into an electrical signal. This electrical signal is subjected to a predetermined digital processing, if necessary, to be stored in a memory of a digital apparatus such as a digital camera as a digital image signal or to be transmitted to another digital apparatus by cable or wireless communication through an interface.

Construction data of the lenses of the single-focus optical system 1C of Example 3 are listed below.

Numerical Example 3

Unit: mm

Surface Data

| Surface Number | r | d | nd | νd |
|---|---|---|---|---|
| Object Plane | ∞ | ∞ | | |
| 1* | 1.748 | 0.745 | 1.54470 | 56.15 |
| 2* | −19.560 | 0.021 | | |
| 3(Aperture Stop) | ∞ | 0.060 | | |
| 4* | 8.299 | 0.300 | 1.63200 | 23.41 |
| 5* | 2.338 | 0.526 | | |
| 6* | −6.980 | 0.842 | 1.54470 | 56.15 |
| 7* | −1.881 | 0.316 | | |
| 8* | −1.649 | 0.556 | 1.54470 | 56.15 |
| 9* | −1.137 | 0.445 | | |
| 10* | −1.497 | 0.400 | 1.54470 | 56.15 |
| 11* | 5.410 | 0.300 | | |
| 12 | ∞ | 0.300 | 1.51633 | 64.14 |
| 13 | ∞ | 0.289 | | |
| Image Plane | ∞ | | | |

Aspherical Data

Surface 1

K = 1.5766e−001, A4 = −1.4963e−003, A6 = 4.8359e−003,
A8 = −1.3113e−002, A10 = −4.3792e−003, A12 = 3.1241e−002,
A14 = −2.5907e−002

Surface 2

K = −2.5456e+001, A4 = 4.3701e−002, A6 = −6.4451e−002,
A8 = 2.3148e−002, A10 = 2.3833e−002, A12 = −1.5489e−001,
A14 = 9.9605e−002

Surface 4

K = 1.2894e+001, A4 = 3.1310e−003, A6 = 8.6051e−003,
A8 = −1.9821e−001, A10 = 2.9891e−001, A12 = −2.1295e−001,
A14 = −2.0786e−002

Surface 5

K = −3.3700e+000, A4 = 2.6003e−002, A6 = 6.1884e−002,
A8 = −1.6311e−001, A10 = 2.2170e−001, A12 = −1.1659e−001,
A14 = −6.3095e−003

-continued

Unit: mm

Surface 6

K = 8.2099e−001, A4 = −4.1380e−002, A6 = −4.5417e−002,
A8 = 2.5176e−002, A10 = 3.5102e−002, A12 = −8.0497e−002,
A14 = 4.4465e−002

Surface 7

K = 1.9392e−001, A4 = −2.8552e−003, A6 = −2.4011e−002,
A8 = 1.1594e−002, A10 = −5.7039e−003, A12 = −6.2721e−003,
A14 = 4.4606e−003

Surface 8

K = 3.4240e−001, A4 = −4.3883e−002, A6 = 6.1029e−002,
A8 = −5.7459e−003, A10 = −3.7261e−003, A12 = −1.0637e−003,
A14 = 2.3848e−003

Surface 9

K = −1.6292e+000, A4 = −6.8873e−002, A6 = 4.2844e−002,
A8 = −4.1365e−003, A10 = 2.0662e−003, A12 = −4.1222e−004,
A14 = −6.7005e−005

Surface 10

K = −1.6831e+000, A4 = −5.0598e−002, A6 = 2.9098e−002,
A8 = −1.5805e−003, A10 = −1.0577e−003, A12 = 2.2674e−004,
A14 = −1.4088e−005

Surface 11

K = 3.7594e+000, A4 = −7.7861e−002, A6 = 1.6464e−002,
A8 = −3.0191e−003, A10 = 4.2424e−004, A12 = −4.8571e−005,
A14 = 2.2523e−006

Other Data

| | |
|---|---|
| Focal Length | 4.172 |
| F-NUMBER | 2.806 |
| Angle of View | 34.445 |
| Image Height | 2.872 |
| Overall Lens Length | 5.007 |
| BF | 0.796 |

Lens Data

| Lens | Front Surface | Back Surface | Focal Length |
|---|---|---|---|
| 1 | 1 | 2 | 2.983 |
| 2 | 4 | 5 | −5.252 |
| 3 | 6 | 7 | 4.466 |
| 4 | 8 | 9 | 4.859 |
| 5 | 10 | 11 | −2.110 |

Lens Group Data

| Group | Front Surface | Back Surface |
|---|---|---|
| 1 | 1 | 5 |
| 2 | 6 | 7 |
| 3 | 8 | 11 |

The extension amount is 0.159 mm.

The spherical aberration (sine condition), astigmatism, and destortion 1C of Example 3 in the above lens arrangement and the configuration are shown in FIG. 23.

Example 4

Figure 8:
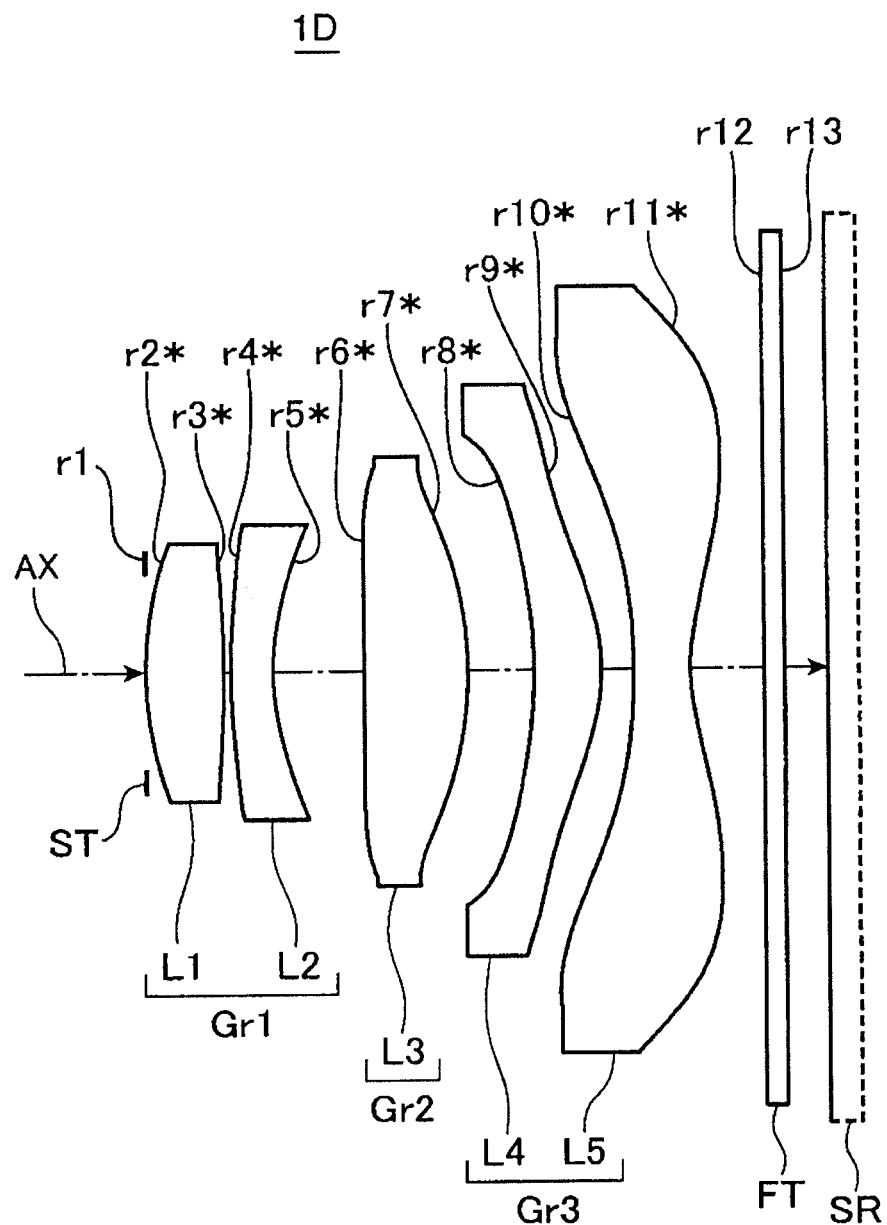
FIG. 8 is a cross-sectional view showing an arrangement of lens groups of a single-focus optical system of Example 4.
Figure 24:
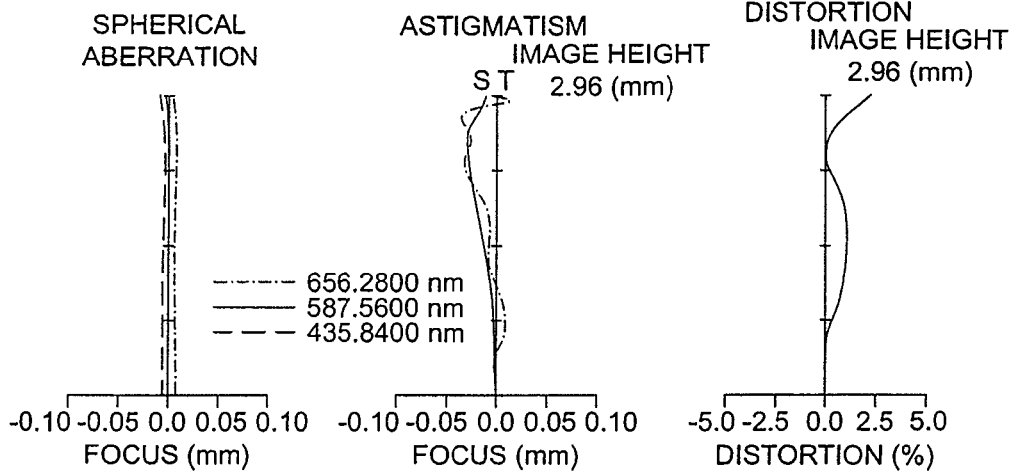
FIG. 24 is an aberration diagram of the single-focus optical system of the embodiment 4.

FIG. 8 is a cross-sectional view showing an arrangement of lens groups in a single-focus optical system of Example 4. FIG. 24 shows aberration diagrams of the single-focus optical system of Example 4.

In the single-focus optical system 1D of Example 4, each of the lens groups (Gr1, Gr2, and Gr3) is arranged in order from the object side to the image side as shown in FIG. 8, and when focusing (focus adjustment) is performed, the first lens group (Gr1) is fixed with respect to a predetermined imaging surface; the second lens group (Gr2) is moved in the optical axis AX direction; and the third lens group (Gr3) is fixed with respect to the predetermined imaging surface.

In more details, in the single-focus optical system 1D of Example 4, the lens groups (Gr1, Gr2, and Gr3) are constituted in order from the object side to the image side as described below.

The first lens group (Gr1) is constituted of a biconvex positive lens (a first lens L1) and a negative meniscus lens (a second lens L2) convex toward the object side. The aperture stop ST is arranged on the object side of the first lens L1.

The second lens group (Gr2) is constituted of a positive meniscus lens (a third lens L3) convex toward the image side.

The third lens group (Gr3) is constituted of a positive meniscus lens (a fourth lens L4) convex toward the image side and a biconcave negative lens (a fifth lens L5). And, the fifth lens L5 has at least one aspherical surface which has a positive optical power in the periphery. Alternatively, the fifth lens L5 is a lens having an aspherical shape which has an inflection point at a position other than the position which is the intersection of the aspherical shape and the optical axis Both faces of each of the lenses L1-L5 of the first lens groups Gr1 to the third lens group Gr3 are aspherical, and these lenses are made of resin material.

In addition, on the image side of the third lens group Gr3, the light receiving surface of the imaging element SR is arranged with a parallel flat plate FT serving as a filter therebetween. The parallel flat plate FT may be various types of optical filter of a cover glass of the imaging element SR In such a configuration, light beam having entered from the object side passes, along the optical axis AX, through the aperture stop, the first lens group (Gr1), the second lens group (Gr2), the third lens group (Gr3), and the parallel flat plate FT in this order to form an optical image of an object on the light receiving surface of the imaging element SR. Then, in the imaging element SR, the optical image is converted into an electrical signal. This electrical signal is subjected to a predetermined digital processing, if necessary, to be stored in a memory of a digital apparatus such as a digital camera as a digital image signal or to be transmitted to another digital apparatus by cable or wireless communication through an interface.

Construction data of the lenses of the single-focus optical system 1D of Example 4 are listed below.

Numerical Example 4

Unit: mm

Surface Data

| Surface Number | r | d | nd | vd |
|---|---|---|---|---|
| Object Plane | ∞ | ∞ | | |
| 1(Aperture Stop) | ∞ | 0.000 | | |
| 2* | 2.203 | 0.550 | 1.54470 | 56.15 |
| 3* | −6.447 | 0.050 | | |
| 4* | 3.388 | 0.300 | 1.63200 | 23.41 |
| 5* | 1.497 | 0.649 | | |
| 6* | −231.634 | 0.728 | 1.54470 | 56.15 |
| 7* | −2.374 | 0.469 | | |
| 8* | −3.121 | 0.483 | 1.54470 | 56.15 |
| 9* | −1.167 | 0.229 | | |
| 10* | −4.421 | 0.400 | 1.54470 | 56.15 |
| 11* | 1.266 | 0.519 | | |
| 12 | ∞ | 0.145 | 1.51633 | 64.14 |
| 13 | ∞ | 0.305 | | |
| Image Plane | ∞ | | | |

-continued

Unit: mm

Aspherical Data

Surface 2

K = 6.9639e−002, A4 = 8.2743e−004, A6 = −1.9487e−002,
A8 = 2.3559e−002, A10 = −4.9826e−003, A12 = 2.4339e−003,
A14 = −8.3051e−003

Surface 3

K = 2.2537e+001, A4 = 2.6900e−002, A6 = 8.7462e−003,
A8 = 1.3710e−002, A10 = 1.9079e−002, A12 = −1.4961e−002,
A14 = 3.0707e−003

Surface 4

K = −1.6249e+001, A4 = −8.6680e−002, A6 = 8.5639e−002,
A8 = −3.0127e−002, A10 = 8.3691e−003, A12 = 1.1855e−002,
A14 = −4.9716e−003

Surface 5

K = −4.9556e+000, A4 = −4.1426e−003, A6 = 3.2237e−002,
A8 = −2.6730e−002, A10 = 2.1868e−002, A12 = −9.3368e−003,
A14 = 3.5305e−003

Surface 6

K = −3.0000e+001, A4 = −7.0365e−003, A6 = 1.8045e−003,
A8 = 1.5331e−002, A10 = −2.4917e−003, A12 = −1.3829e−003,
A14 = 4.6565e−004

Surface 7

K = −2.0568e+000, A4 = −2.5640e−002, A6 = −4.7811e−003,
A8 = 4.1108e−003, A10 = 4.3661e−003, A12 = 1.0528e−004,
A14 = −1.7014e−004

Surface 8

K = 2.6216e+000, A4 = 2.0248e−002, A6 = 1.5794e−002,
A8 = −5.4001e−003, A10 = −4.2137e−003, A12 = 3.3777e−003,
A14 = −8.5260e−004

Surface 9

K = −4.8364e+000, A4 = −1.6483e−002, A6 = 3.7793e−002,
A8 = −1.1137e−002, A10 = 4.8893e−004, A12 = −7.5359e−005,
A14 = 4.5712e−005

Surface 10

K = −4.3417e+000, A4 = −6.8871e−002, A6 = 2.2296e−002,
A8 = −6.0629e−004, A10 = −7.4334e−004, A12 = 1.5202e−004,
A14 = −9.9989e−006

Surface 11

K = −8.6535e+000, A4 = −6.1579e−002, A6 = 1.8370e−002,
A8 = −4.0568e−003, A10 = 3.6250e−004, A12 = −8.8422e−006,
A14 = 1.5622e−007

Other Data

| | |
|---|---|
| Focal Length | 3.781 |
| F-NUMBER | 2.880 |
| Angle of View | 37.482 |
| Image Height | 2.960 |
| Overall Lens Length | 4.776 |
| BF | 0.920 |

Lens Data

| Lens | Front Surface | Back Surface | Focal Length |
|---|---|---|---|
| 1 | 2 | 3 | 3.083 |
| 2 | 4 | 5 | −4.519 |
| 3 | 6 | 7 | 4.398 |
| 4 | 8 | 9 | 3.146 |
| 5 | 10 | 11 | −1.763 |

-continued

Unit: mm

Lens Group Data

| Group | Front Surface | Back Surface |
|---|---|---|
| 1 | 2 | 5 |
| 2 | 6 | 7 |
| 3 | 8 | 11 |

The extension amount is 0.134 mm.

The spherical aberration (sine condition), astigmatism, and destortion 1D of Example 4 in the above lens arrangement and the configuration are shown in FIG. 24.

Example 5

Figure 9:
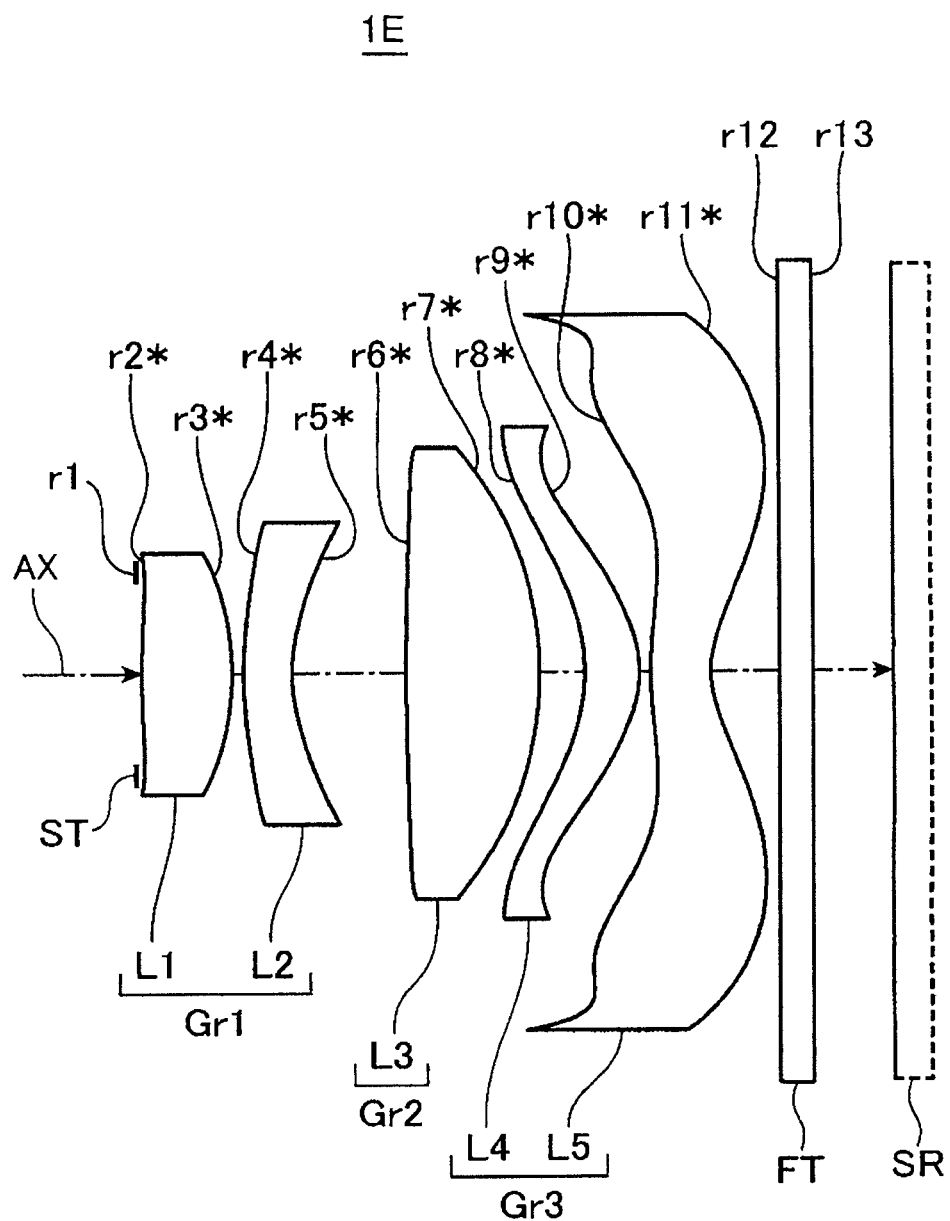
FIG. 9 is a cross-sectional view showing an arrangement of lens groups of a single-focus optical system of Example 5.
Figure 25:
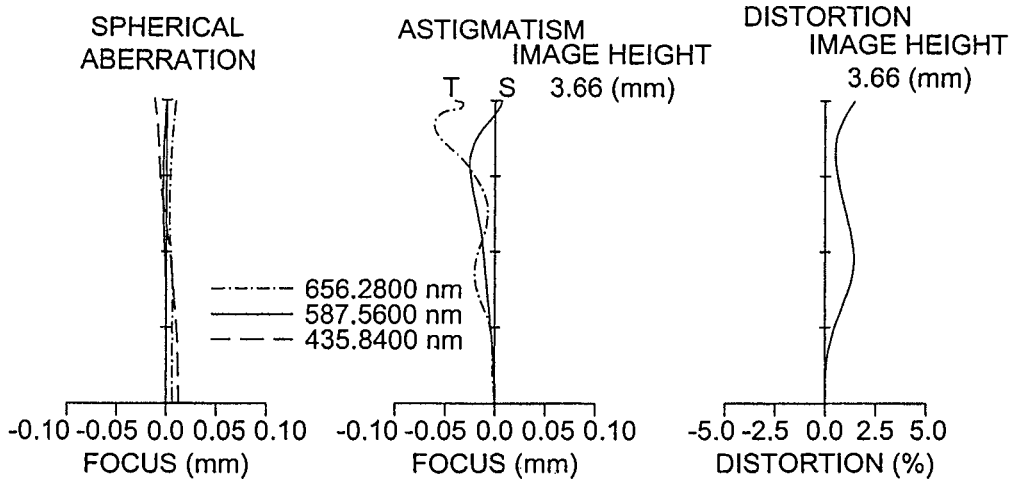
FIG. 25 is an aberration diagram of the single-focus optical system of the embodiment 5.

FIG. 9 is a cross-sectional view showing an arrangement of lens groups in a single-focus optical system of Example 5. FIG. 25 shows aberration diagrams of the single-focus optical system of Example 5.

In the single-focus optical system 1E of Example 5, each of the lens groups (Gr1, Gr2, and Gr3) is arranged in order from the object side to the image side as shown in FIG. 9, and when focusing is performed, the first lens group (Gr1) is fixed with respect to a predetermined imaging surface; the second lens group (Gr2) is moved in the optical axis AX direction; and the third lens group (Gr3) is fixed with respect to the predetermined imaging surface.

In more details, in the single-focus optical system 1E of Example 5, the lens groups (Gr1, Gr2, and Gr3) are constituted in order from the object side to the image side as described below.

The first lens group (Gr1) is constituted of a biconvex positive lens (a first lens L1) and a negative meniscus lens (a second lens L2) convex toward the object side. The aperture stop ST is arranged on the object side of the first lens L1.

The second lens group (Gr2) is constituted of a biconvex positive lens (a third lens L3).

The third lens group (Gr3) is constituted of a positive meniscus lens (a fourth lens L4) convex toward the image side and a negative meniscus lens (a fifth lens L5) convex toward the object side. And, the fifth lens L5 has at least one aspherical surface which has a positive optical power in the periphery. Alternatively, the fifth lens L5 is a lens having an aspherical shape which has an inflection point at a position other than the position which is the intersection of the aspherical shape and the optical axis.

Both faces of each of the lenses L1-L5 of the first lens groups Gr1 to the third lens group Gr3 are aspherical, and these lenses are made of resin material.

In addition, on the image side of the third lens group Gr3, the light receiving surface of the imaging element SR is arranged with a parallel flat plate FT serving as a filter therebetween. The parallel flat plate FT may be various types of optical filter of a cover glass of the imaging element SR.

In such a configuration, light beam having entered from the object side passes, along the optical axis AX, through the aperture stop, the first lens group (Gr1), the second lens group (Gr2), the third lens group (Gr3), and the parallel flat plate FT in this order to from an optical image of an object on the light receiving surface of the imaging element SR. Then, in the imaging element SR, the optical image is converted into an electrical signal. This electrical signal is subjected to a predetermined digital processing, if necessary, to be stored in a memory of a digital apparatus such as a digital camera as a digital image signal or to be transmitted to another digital apparatus by cable or wireless communication through an interface.

Construction data of the lenses of the single-focus optical system 1E of Example 5 are listed below.

Numerical Example 5

Unit: mm

Surface Data

| Surface Number | r | d | nd | vd |
|---|---|---|---|---|
| Object Plane | ∞ | ∞ | | |
| 1(Aperture Stop) | ∞ | 0.050 | | |
| 2* | 7.940 | 0.800 | 1.54470 | 56.15 |
| 3* | −2.469 | 0.101 | | |
| 4* | 3.895 | 0.426 | 1.63200 | 23.41 |
| 5* | 1.632 | 1.001 | | |
| 6* | 26.607 | 1.175 | 1.54470 | 56.15 |
| 7* | −3.200 | 0.400 | | |
| 8* | −1.734 | 0.486 | 1.54470 | 56.15 |
| 9* | −1.029 | 0.100 | | |
| 10* | 3.454 | 0.533 | 1.54470 | 56.15 |
| 11* | 0.917 | 0.600 | | |
| 12 | ∞ | 0.300 | 1.51633 | 64.14 |
| 13 | ∞ | 0.702 | | |
| Image Plane | ∞ | | | |

Aspherical Data

Surface 2

$K = -3.0000e+001, A4 = -2.5530e-002, A6 = -1.0297e-002,$
$A8 = -1.5329e-002, A10 = 1.0320e-002, A12 = -5.1000e-004,$
$A14 = -2.0491e-003$

Surface 3

$K = -2.2044e+000, A4 = 4.0354e-003, A6 = -3.7192e-002,$
$A8 = 1.4675e-002, A10 = 4.7227e-004, A12 = -6.5765e-003,$
$A14 = 3.1637e-003$

Surface 4

$K = -1.0853e+001, A4 = -3.2693e-002, A6 = 2.5188e-002,$
$A8 = -1.0304e-002, A10 = 2.3617e-003, A12 = 1.6228e-003,$
$A14 = -6.7773e-004$

Surface 5

$K = -4.5099e+000, A4 = -7.9349e-003, A6 = 1.6704e-002,$
$A8 = -9.7214e-003, A10 = 2.6187e-003, A12 = 3.9605e-004,$
$A14 = -1.9963e-004$

Surface 6

$K = 9.0364e+000, A4 = 6.8755e-003, A6 = -1.0416e-002,$
$A8 = 3.5310e-003, A10 = 2.5200e-004, A12 = -3.4061e-004,$
$A14 = 4.7853e-005$

Surface 7

$K = 5.9479e-001, A4 = 1.2962e-002, A6 = -4.0194e-003,$
$A8 = -1.1527e-004, A10 = 1.1669e-004, A12 = 2.8478e-005,$
$A14 = -4.9433e-006$

Surface 8

$K = -4.3179e-001, A4 = 3.7096e-002, A6 = 9.8140e-004,$
$A8 = 9.2866e-004, A10 = -3.0222e-005, A12 = -2.8923e-005,$
$A14 = 6.2055e-006$

Surface 9

$K = -3.7450+000, A4 = -5.5748e-002, A6 = 2.0347e-002,$
$A8 = -2.0951e-003, A10 = 2.0454e-004, A12 = -9.4418e-006,$
$A14 = -1.2837e-00$

Surface 10

$K = -5.6635e+000, A4 = -8.0954e-002, A6 = 1.0365e-002,$
$A8 = -3.1383e-006, A10 = -1.3946e-004, A12 = 2.0848e-005,$
$A14 = -1.0865e-006$

-continued

Unit: mm

Surface 11

$K = -4.3287e+000, A4 = -3.9994e-002, A6 = 6.6722e-003,$
$A8 = -9.1607e-004, A10 = 8.5074e-005, A12 = -4.6694e-006,$
$A14 = 1.0462e-007$

Other Data

| | |
|---|---|
| Focal Length | 4.671 |
| F-NUMBER | 2.801 |
| Angle of View | 37.662 |
| Image Height | 3.658 |
| Overall Lens Length | 6.573 |
| BF | 1.501 |

Lens Data

| Lens | Front Surface | Back Surface | Focal Length |
|---|---|---|---|
| 1 | 2 | 3 | 3.554 |
| 2 | 4 | 5 | −4.796 |
| 3 | 6 | 7 | 5.319 |
| 4 | 8 | 9 | 3.741 |
| 5 | 10 | 11 | −2.475 |

Lens Group Data

| Group | Front Surface | Back Surface |
|---|---|---|
| 1 | 2 | 5 |
| 2 | 6 | 7 |
| 3 | 8 | 11 |

The extension amount is 0.224 mm.

The spherical aberration (sine condition), astigmatism, and destortion 1E of Example 5 in the above lens arrangement and the configuration are shown in FIG. 25.

Example 6

Figure 10:
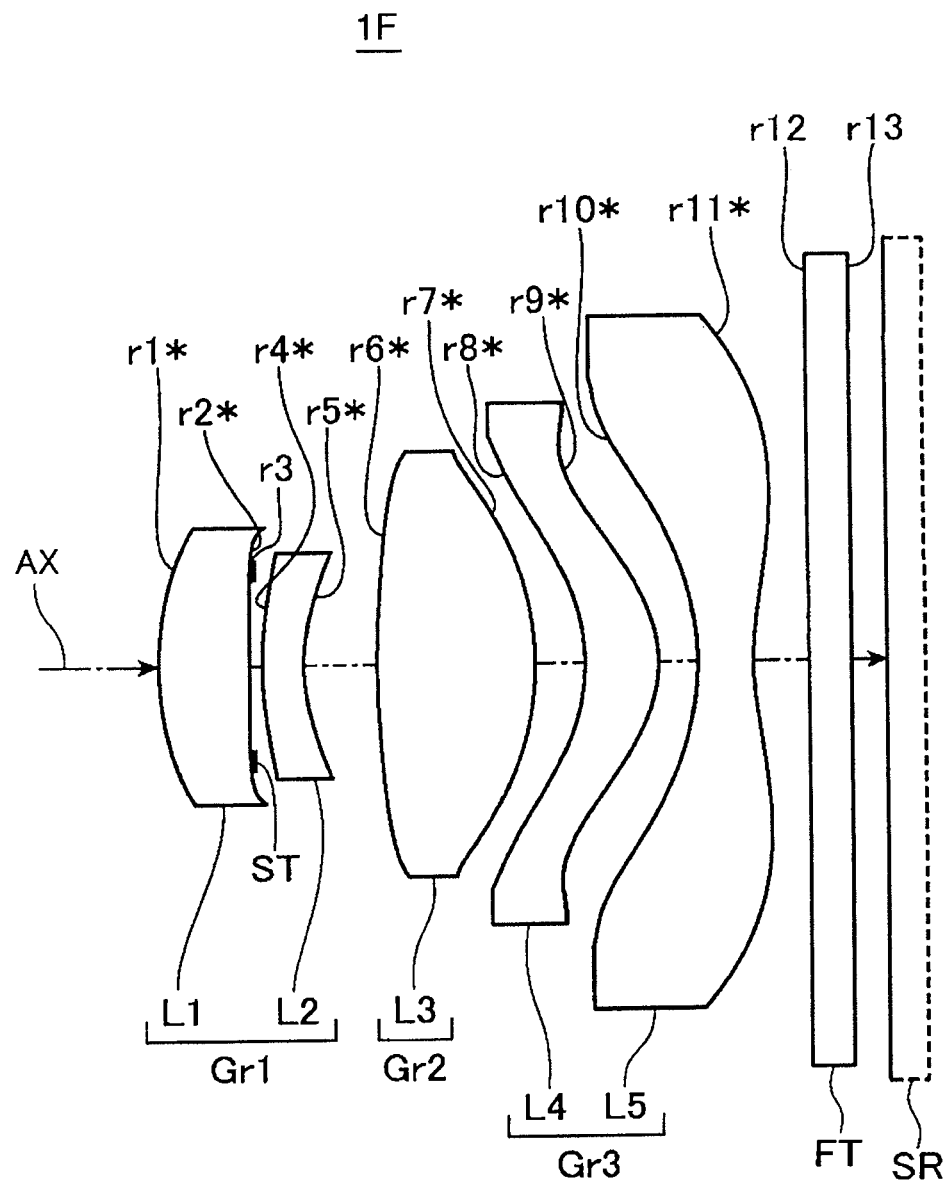
FIG. 10 is across-sectional view showing an arrangement of lens groups of a single-focus optical system of Example 6.
Figure 26:
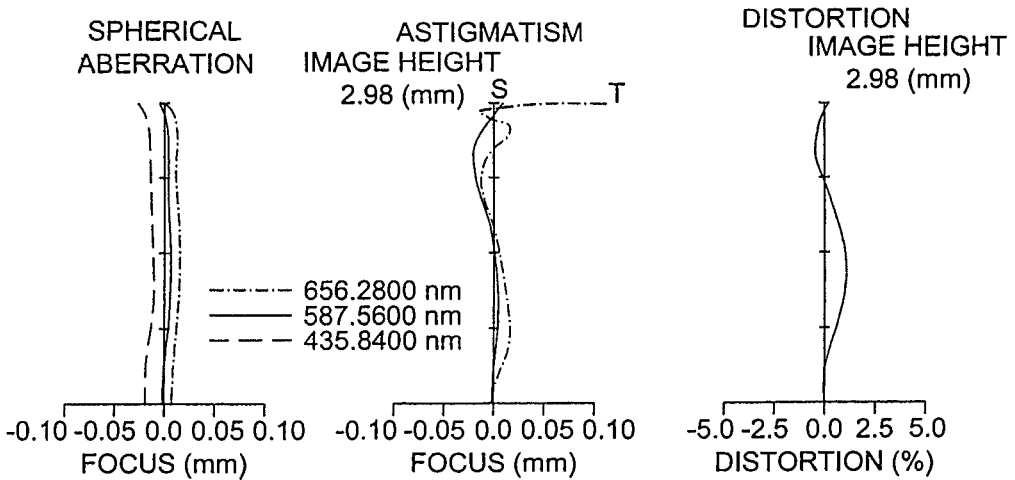
FIG. 26 is an aberration diagram of the single-focus optical system of the embodiment 6.

FIG. 10 is a cross-sectional view showing an arrangement of lens groups in a single-focus optical system of Example 6. FIG. 26 shows aberration diagrams of the single-focus optical system of Example 6.

In the single-focus optical system 1F of Example 6, each of the lens groups (Gr1, Gr2, and Gr3) is arranged in order from the object side to the image side as shown in FIG. 10, and when focusing is performed, the first lens group (Gr1) is fixed with respect to a predetermined imaging surface; the second lens group (Gr2) is moved in the optical axis AX direction; and the third lens group (Gr3) is fixed with respect to the predetermined imaging surface.

In more details, in the single-focus optical system 1F of Example 6, the lens groups (Gr1, Gr2, and Gr3) are constituted in order from the object side to the image side as described below.

The first lens group (Gr1) is constituted of a biconvex positive lens (a first lens L1), an aperture stop ST, and a negative meniscus lens (a second lens L2) convex toward the object side. The aperture stop ST is arranged between the first lens L1 and the second lens L2.

The second lens group (Gr2) is constituted of a biconvex positive lens (a third lens L3).

The third lens group (Gr3) is constituted of a positive meniscus lens (a fourth lens L4) convex toward the image side and a biconcave negative lens (a fifth lens L5). And, the fifth lens L5 has at least one aspherical surface which has a positive optical power in the periphery. Alternatively, the fifth lens L5 is a lens having an aspherical shape which has an inflection point at a position other than the position which is the intersection of the aspherical shape and the optical axis.

Both faces of each of the lenses L1-L5 of the first lens groups Gr1 to the third lens group Gr3 are aspherical, and these lenses are made of resin material.

In addition, on the image side of the third lens group Gr3, the light receiving surface of the imaging element SR is arranged with a parallel flat plate FT serving as a filter therebetween. The parallel flat plate FT may be various types of optical filter of a cover glass of the imaging element SR.

In such a configuration, light beam having entered from the object side passes, along the optical axis AX, through the first lens group (Gr1) including the aperture stop ST, the second lens group (Gr2), the third lens group (Gr3), and the parallel flat plate FT in this order to form an optical image of an object on the light receiving surface of the imaging element SR. Then, in the imaging element SR, the optical image is converted into an electrical signal. This electrical signal is subjected to a predetermined digital processing, if necessary, to be stored in a memory of a digital apparatus such as a digital camera as a digital image signal or to be transmitted to another digital apparatus by cable or wireless communication through an interface.

Construction data of the lenses of the single-focus optical system 1F of Example 6 are listed below.

Numerical Example 6

Unit: mm

Surface Data

| Surface Number | r | d | nd | vd |
|---|---|---|---|---|
| Object Plane | ∞ | ∞ | | |
| 1* | 2.236 | 0.647 | 1.54470 | 56.15 |
| 2* | −42.678 | 0.033 | | |
| 3(Aperture Stop) | ∞ | 0.060 | | |
| 4* | 2.357 | 0.300 | 1.63200 | 23.41 |
| 5* | 1.360 | 0.524 | | |
| 6* | 7.395 | 1.121 | 1.54470 | 56.15 |
| 7* | −1.941 | 0.357 | | |
| 8* | −1.344 | 0.527 | 1.58300 | 29.90 |
| 9* | −0.872 | 0.278 | | |
| 10* | −1.806 | 0.400 | 1.58300 | 29.90 |
| 11* | 2.033 | 0.400 | | |
| 12 | ∞ | 0.300 | 1.51633 | 64.14 |
| 13 | ∞ | 0.251 | | |
| Image Plane | ∞ | | | |

Aspherical Data

Surface 1

K = 4.8416e−001, A4 = 6.2022e−003, A6 = 1.2688e−002,
A8 = −2.0923e−002, A10 = 3.8887e−002, A12 = −2.2333e−002,
A14 = 8.0946e−003
Surface 2

K = 3.0000e+001, A4 = 1.8148e−002, A6 = 4.5831e−002,
A8 = 2.1614e−002, A10 = 4.7850e−002, A12 = −3.1321e−001,
A14 = 3.4145e−001
Surface 4

K = −7.9264e−000, A4 = −7.7259e−002, A6 = 1.4459e−001,
A8 = −2.1988e−001, A10 = 7.8239e−002, A12 = 5.3451e−001,
A14 = −6.6564e−001
Surface 5

K = −4.2977e+000, A4 = 1.7240e−002, A6 = 5.2157e−003,
A8 = −4.3614e−002, A10 = 1.2269e−001, A12 = −1.3591e−001,
A14 = 5.2619e−002

-continued

Unit: mm

Surface 6

K = −2.1871e+001, A4 = −1.4041e−003, A6 = 3.9112e−003,
A8 = 3.2744e−003, A10 = −6.5404e−003, A12 = 4.0016e−003,
A14 = −6.3046e−004
Surface 7

K = −6.4925e−001, A4 = 2.1294e−002, A6 = −3.0928e−002,
A8 = 1.2773e−002, A10 = 2.0293e−003, A12 = −3.9101e−003,
A14 = 1.2154e−003
Surface 8

K = −3.8170e−001, A4 = 7.0768e−004, A6 = 5.1133e−002,
A8 = 2.1960e−003, A10 = −3.6000e−003, A12 = −1.3145e−004,
A14 = 2.9503e−004
Surface 9

K = −2.8083e+000, A4 = −1.2292e−001, A6 = 7.5377e−002,
A8 = −5.1493e−003, A10 = −1.7963e−004, A12 = −6.6572e−004,
A14 = 1.0588e−004
Surface 10

K = −9.1558e+000, A4 = −8.8401e−002, A6 = 1.9664e−002,
A8 = 7.6076e−004, A10 = −5.4302e−004, A12 = 1.9121e−004,
A14 = −3.1131e−005
Surface 11

K = −1.6462e+001, A4 = −5.0043e−002, A6 = 1.1612e−002,
A8 = −2.7922e−003, A10 = 4.8456e−004, A12 = −5.0720e−005,
A14 = 2.3128e−006

Other Data

| | |
|---|---|
| Focal Length | 3.835 |
| F-NUMBER | 2.806 |
| Angle of View | 37.761 |
| Image Height | 2.980 |
| Overall Lens Length | 5.093 |
| BF | 0.846 |

Lens Data

| Lens | Front Surface | Back Surface | Focal Length |
|---|---|---|---|
| 1 | 1 | 2 | 3.921 |
| 2 | 4 | 5 | −5.764 |
| 3 | 6 | 7 | 2.947 |
| 4 | 8 | 9 | 3.020 |
| 5 | 10 | 11 | −1.580 |

Lens Group Data

| Group | Front Surface | Back Surface |
|---|---|---|
| 1 | 1 | 5 |
| 2 | 6 | 7 |
| 3 | 8 | 11 |

The extension amount is 0.093 mm.

The spherical aberration (sine condition), astigmatism, and destortion 1F of Example 6 in the above lens arrangement and the configuration are shown in FIG. 26.

Example 7

Figure 11:
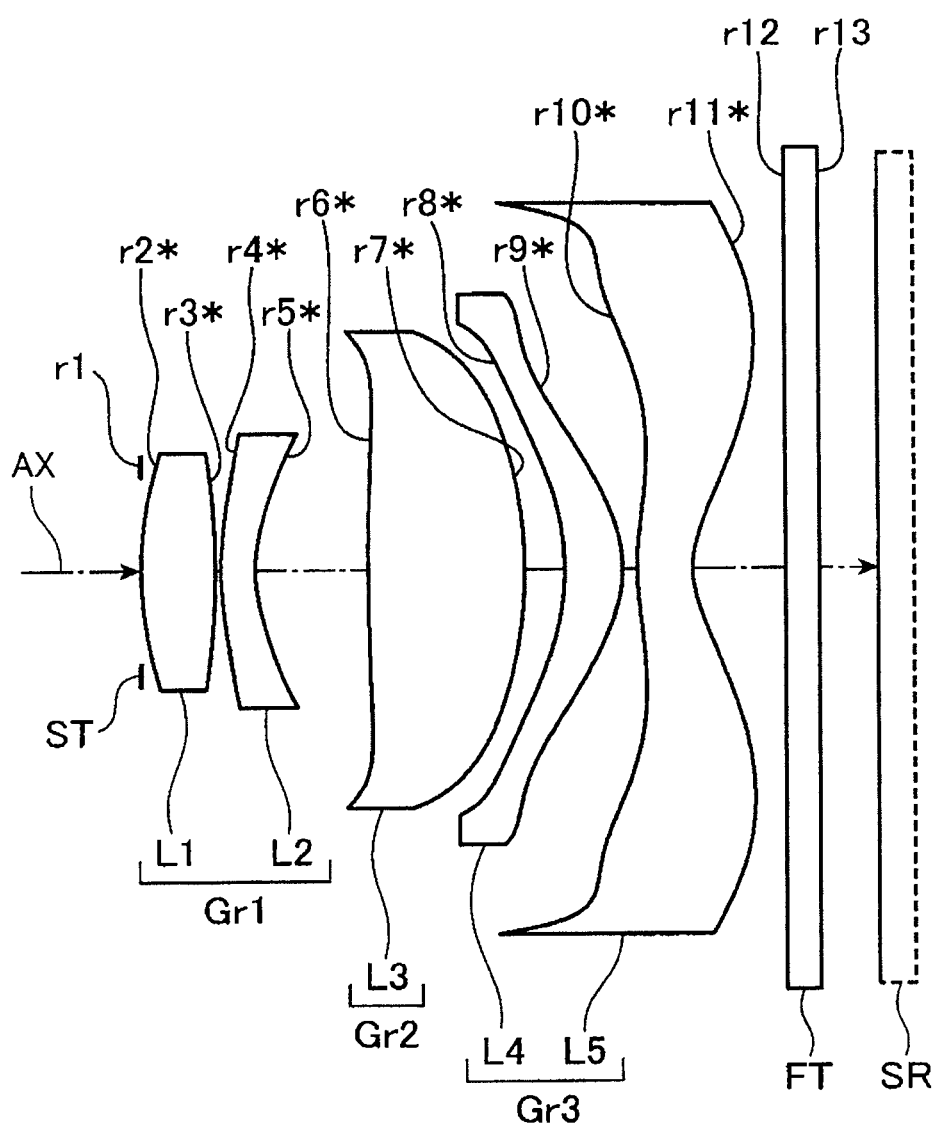
FIG. 11 is across-sectional view showing an arrangement of lens groups of a single-focus optical system of Example 7.
Figure 27:
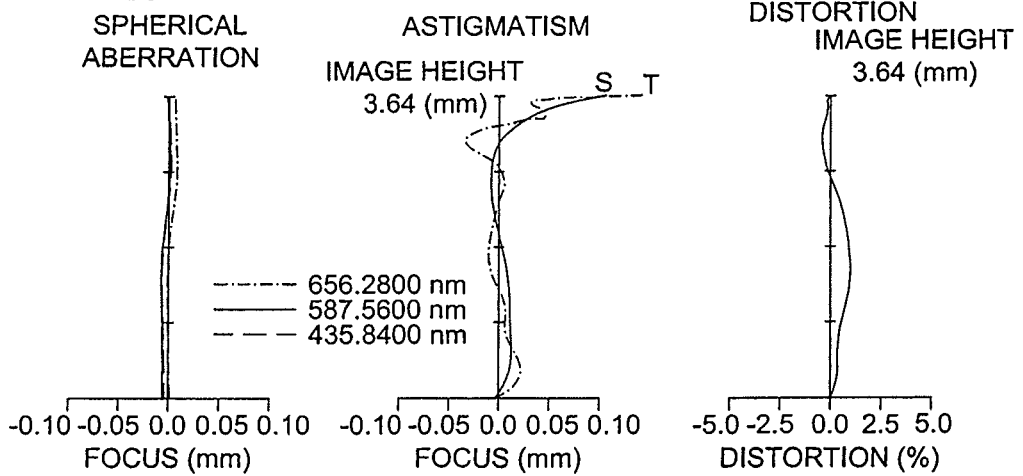
FIG. 27 is an aberration diagram of the single-focus optical system of the embodiment 7.

FIG. 11 is a cross-sectional view showing an arrangement of lens groups in a single-focus optical system of Example 7. FIG. 27 shows aberration diagrams of the single-focus optical system of Example 7.

In the single-focus optical system 1G of Example 7, each of the lens groups (Gr1, Gr2, and Gr3) is arranged in order from the object side to the image side as shown in FIG. 11, and when focusing is performed, the first lens group (Gr1) is fixed with respect to a predetermined imaging surface; the second lens group (Gr2) is moved in the optical axis AX direction; and the third lens group (Gr3) is fixed with respect to the predetermined imaging surface.

In more details, in the single-focus optical system 1G of Example 7, the lens groups (Gr1, Gr2, and Gr3) are constituted in order from the object side to the image side as described below.

The first lens group (Gr1) is constituted of a biconvex positive lens (a first lens L1) and a negative meniscus lens (a second lens L2) convex toward the object side. An aperture stop ST is arranged on the object side of the first lens L1.

The second lens group (Gr2) is constituted of a biconvex positive lens (a third lens L3).

The third lens group (Gr3) is constituted of a positive meniscus lens (a fourth lens L4) convex toward the image side and a negative meniscus lens (a fifth lens L5) convex toward the object side. And, the fifth lens L5 has at least one aspherical surface which has a positive optical power in the periphery. Alternatively, the fifth lens L5 is a lens having an aspherical shape which has an inflection point at a position other than the position which is the intersection of the aspherical shape and the optical axis.

Both faces of each of the lenses L1-L5 of the first lens groups Gr1 to the third lens group Gr3 are aspherical, and these lenses are made of resin material.

In addition, on the image side of the third lens group Gr3, the light receiving surface of the imaging element SR is arranged with a parallel flat plate FT serving as a filter therebetween. The parallel flat plate FT may be various types of optical filter of a cover glass of the imaging element SR In such a configuration, light beam having entered from the object side passes, along the optical axis AX, through the aperture stop ST, the first lens group (Gr1), the second lens group (Gr2), the third lens group (Gr3), and the parallel flat plate FT in this order to form an optical image of an object on the light receiving surface of the imaging element SR. Then, in the imaging element SR, the optical image is converted into an electrical signal. This electrical signal is subjected to a predetermined digital processing, if necessary, to be stored in a memory of a digital apparatus such as a digital camera as a digital image signal or to be transmitted to another piece of digital apparatus by cable or wireless communication through an interface.

Construction data of the lenses of the single-focus optical system 1G of Example 7 are listed below.

Numerical Example 7

Unit: mm

Surface Data

| Surface Number | r | d | nd | vd |
|---|---|---|---|---|
| Object Plane | ∞ | ∞ | | |
| 1(Aperture Stop) | ∞ | 0.000 | | |
| 2* | 3.122 | 0.660 | 1.54470 | 56.15 |
| 3* | −5.826 | 0.050 | | |
| 4* | 2.600 | 0.300 | 1.63200 | 23.41 |
| 5* | 1.377 | 1.002 | | |
| 6* | 19.344 | 1.379 | 1.54470 | 56.15 |
| 7* | −3.781 | 0.350 | | |
| 8* | −2.135 | 0.515 | 1.54470 | 56.15 |
| 9* | −1.111 | 0.128 | | |
| 10* | 2.269 | 0.492 | 1.54470 | 56.15 |
| 11* | 0.797 | 0.821 | | |
| 12 | ∞ | 0.300 | 1.51633 | 64.14 |
| 13 | ∞ | 0.513 | | |
| Image Plane | ∞ | | | |

-continued

Unit: mm

Aspherical Data

Surface 2

$K = 1.5009e{-}001$, $A4 = 4.8048e{-}003$, $A6 = -1.8866e{-}002$, $A8 = 1.3406e{-}002$, $A10 = -4.6876e{-}003$, $A12 = -4.3322e{-}003$, $A14 = 2.4388e{-}003$

Surface 3

$K = -1.4379e{+}001$, $A4 = 1.6130e{-}002$, $A6 = -1.1532e{-}002$, $A8 = -4.1992e{-}003$, $A10 = 1.4224e{-}003$, $A12 = 3.7751e{-}003$, $A14 = -1.7858e{-}003$

Surface 4

$K = -1.3154e{+}001$, $A4 = -4.1475e{-}002$, $A6 = 2.5138e{-}002$, $A8 = -1.0239e{-}002$, $A10 = 4.7967e{-}003$, $A12 = 8.7405e{-}004$, $A14 = -9.1963e{-}004$

Surface 5

$K = -4.3687e{+}000$, $A4 = -9.5399e{-}003$, $A6 = 1.3910e{-}002$, $A8 = -3.3879e{-}003$, $A10 = 3.0587e{-}003$, $A12 = -1.6945e{-}003$, $A14 = 3.1273e{-}004$

Surface 6

$K = 3.0000e{+}001$, $A4 = 5.0968e{-}003$, $A6 = -9.8552e{-}003$, $A8 = 3.9422e{-}003$, $A10 = -3.2850e{-}004$, $A12 = -2.2794e{-}004$, $A14 = 3.5659e{-}005$

Surface 7

$K = -2.8876e{+}000$, $A4 = -3.2625e{-}003$, $A6 = 1.9931e{-}004$, $A8 = -1.9275e{-}003$, $A10 = 1.8137e{-}004$, $A12 = 1.1326e{-}004$, $A14 = -2.6470e{-}005$

Surface 8

$K = -1.2724e{-}001$, $A4 = 1.6597e{-}002$, $A6 = 8.9368e{-}003$, $A8 = -7.9560e{-}004$, $A10 = -6.7493e{-}004$, $A12 = 2.6611e{-}004$, $A14 = -2.9834e{-}005$

Surface 9

$K = -3.2046e{+}000$, $A4 = -3.7439e{-}002$, $A6 = 1.6042e{-}002$, $A8 = -1.8581e{-}003$, $A10 = 1.5499e{-}004$, $A12 = -1.1323e{-}005$, $A14 = -8.9192e{-}007$

Surface 10

$K = 3.0000e{+}001$, $A4 = -4.4858e{-}002$, $A6 = 5.0850e{-}003$, $A8 = 4.8796e{-}005$, $A10 = -9.3179e{-}005$, $A12 = 1.6753e{-}005$, $A14 = -1.0006e{-}006$

Surface 11

$K = -4.3519e{+}000$, $A4 = -3.7374e{-}002$, $A6 = 6.9919e{-}003$, $A8 = -9.5271e{-}004$, $A10 = 6.8485e{-}005$, $A12 = -1.7892e{-}006$, $A14 = -8.9626e{-}009$

Other Data

| Focal Length | 4.674 |
|---|---|
| F-NUMBER | 2.802 |
| Angle of View | 37.887 |
| Image Height | 3.636 |
| Overall Lens Length | 6.403 |
| BF | 1.526 |

Lens Data

| Lens | Front Surface | Back Surface | Focal Length |
|---|---|---|---|
| 1 | 2 | 3 | 3.832 |
| 2 | 4 | 5 | −5.115 |
| 3 | 6 | 7 | 5.931 |
| 4 | 8 | 9 | 3.610 |
| 5 | 10 | 11 | −2.557 |

-continued

Unit: mm

Lens Group Data

| Group | Front Surface | Back Surface |
|---|---|---|
| 1 | 2 | 5 |
| 2 | 6 | 7 |
| 3 | 10 | 11 |

The extension amount is 0.265 mm.

The spherical aberration (sine condition), astigmatism, and destortion 1G of Example 7 in the above lens arrangement and the configuration are shown in FIG. 27.

Example 8

Figure 12:
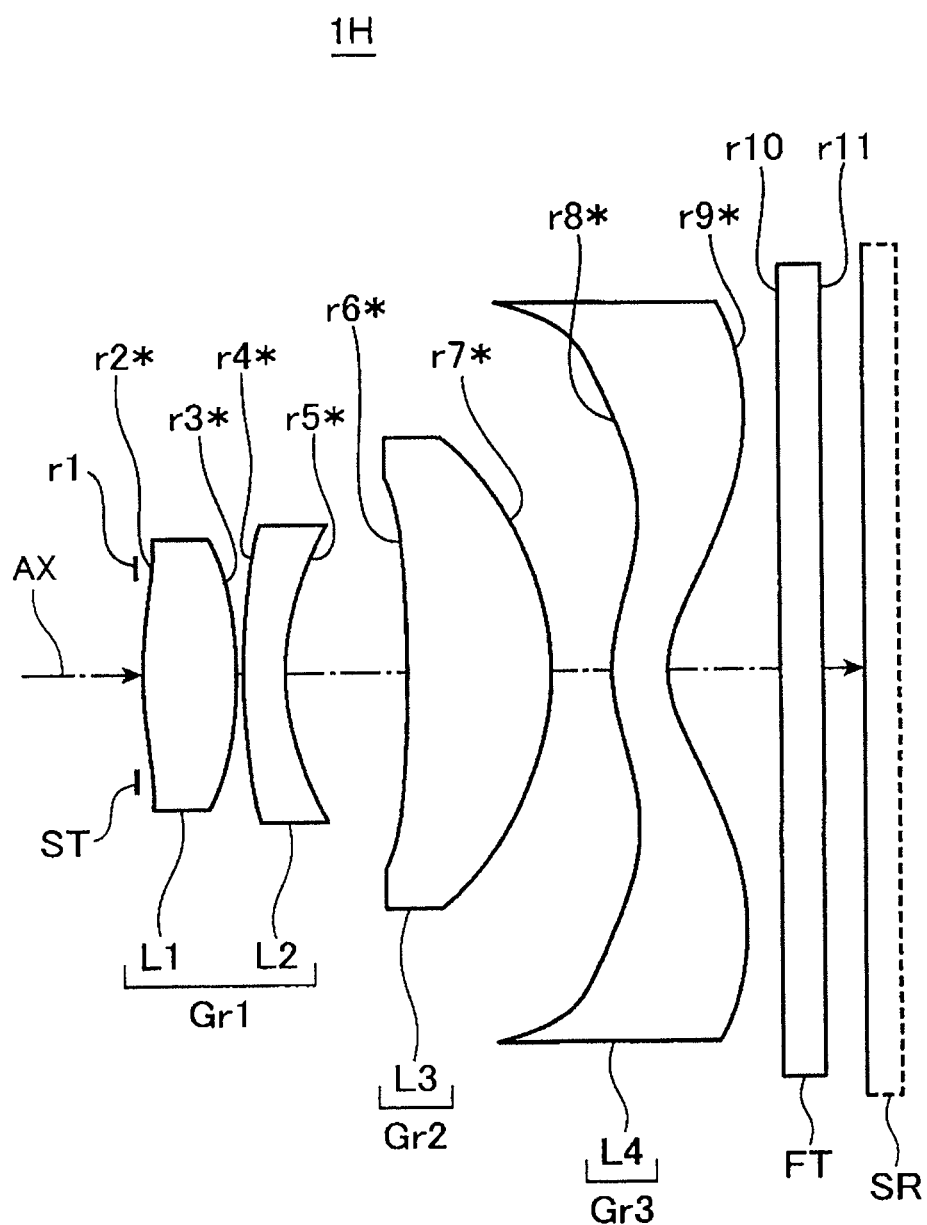
FIG. 12 is across-sectional view showing an arrangement of lens groups of a single-focus optical system of Example 8.
Figure 28:
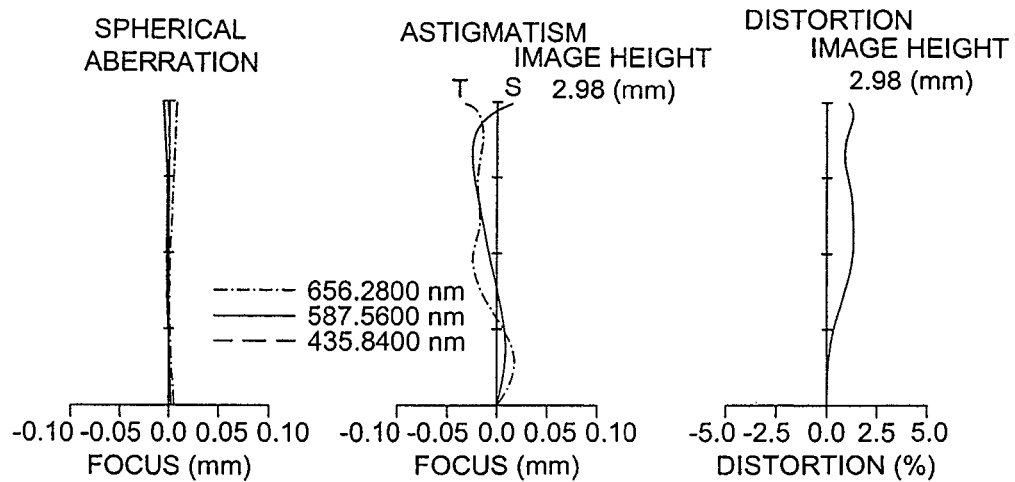
FIG. 28 is an aberration diagram of the single-focus optical system of the embodiment 8.

FIG. 12 is a cross-sectional view showing an arrangement of lens groups in a single-focus optical system of Example 8. FIG. 28 shows aberration diagrams of the single-focus optical system of Example 8.

In the single-focus optical system 1H of Example 8, each of the lens groups (Gr1, Gr2, and Gr3) is arranged in order from the object side to the image side as shown in FIG. 12, and when focusing is performed, the first lens group (Gr1) is fixed with respect to a predetermined imaging surface; the second lens group (Gr2) is moved in the optical axis AX direction; and the third lens group (Gr3) is fixed with respect to the predetermined imaging surface.

In more details, in the single-focus optical system 1H of Example 8, the lens groups (Gr1, Gr2, and Gr3) are constituted in order from the object side to the image side as described below.

The first lens group (Gr1) is constituted of a biconvex positive lens (a first lens L1) and a negative meniscus lens (a second lens L2) convex toward the object side. An aperture stop ST is arranged on the object side of the first lens L1.

The second lens group (Gr2) is constituted of a positive meniscus lens (a third lens L3) convex toward the image side.

The third lens group (Gr3) is constituted of a negative meniscus lens (a fourth lens L4) convex toward the image side. And, the fourth lens L4 has at least one aspherical surface which has a positive optical power in the periphery. Alternatively, the fourth lens L4 is a lens having an aspherical shape which has an inflection point at a position other than the position which is the intersection of the aspherical shape and the optical axis.

Both faces of each of the lenses L1-L4 of the first lens groups Gr1 to the third lens group Gr3 are aspherical, and these lenses are made of resin material.

In addition, on the image side of the third lens group Gr3, the light receiving surface of the imaging element SR is arranged with a parallel flat plate FT serving as a filter therebetween. The parallel flat plate FT may be various types of optical filter of a cover glass of the imaging element SR In such a configuration, light beam having entered from the object side passes, along the optical axis AX, through the aperture stop ST, the first lens group (Gr1), the second lens group (Gr2), the third lens group (Gr3), and the parallel flat plate FT in this order to form an optical image of an object on the light receiving surface of the imaging element SR. Then, in the imaging element SR, the optical image is converted into an electrical signal. This electrical signal is subjected to a predetermined digital processing, if necessary, to be stored in a memory of a digital apparatus such as a digital camera as a digital image signal or to be transmitted to another digital apparatus by cable or wireless communication through an interface.

Construction data of the lenses of the single-focus optical system 1H of Example 8 are listed below.

Numerical Example 8

Unit: mm

Surface Data

| Surface Number | r | d | nd | vd |
|---|---|---|---|---|
| Object Plane | ∞ | ∞ | | |
| 1(Aperture Stop) | ∞ | 0.050 | | |
| 2* | 3.182 | 0.668 | 1.54470 | 56.15 |
| 3* | −2.913 | 0.050 | | |
| 4* | 3.967 | 0.300 | 1.63200 | 23.41 |
| 5* | 1.575 | 0.879 | | |
| 6* | −9.756 | 1.020 | 1.54470 | 56.15 |
| 7* | −1.928 | 0.435 | | |
| 8* | 1.186 | 0.400 | 1.54470 | 56.15 |
| 9* | 0.750 | 0.800 | | |
| 10 | ∞ | 0.300 | 1.51633 | 64.14 |
| 11 | ∞ | 0.298 | | |
| Image Plane | ∞ | | | |

Aspherical Data

Surface 2

K = −4.5758e+000, A4 = −2.8424e−002, A6 = −3.9239e−002,
A8 = −1.2479e−002, A10 = 1.4456e−002, A12 = −2.1717e−002

Surface 3

K = −7.4241e−001, A4 = −2.7292e−002, A6 = −7.6425e−003,
A8 = −1.8638e−002, A10 = 1.0818e−002, A12 = −9.7311e−003

Surface 4

K = −1.4695e+001, A4 = −5.9815e−002, A6 = 7.3392e−002,
A8 = −2.6102e−003, A10 = −1.3526e−002, A12 = 4.2023e−003

Surface 5

K = −5.2113e+000, A4 = 2.6371e−002, A6 = 4.6057e−003,
A8 = 1.1422e−002, A10 = −3.2746e−003, A12 = −5.1200e−004

Surface 6

K = 3.0000e+001, A4 = 3.0411e−002, A6 = −3.8860e−002,
A8 = 1.5273e−002, A10 = −2.4488e−003, A12 = −5.4631e−004

Surface 7

K = −9.9516e−001, A4 = 1.4879e−003, A6 = 1.1480e−002,
A8 = −1.5562e−002, A10 = 6.2762e−003, A12 = −9.6329e−004

Surface 8

K = −4.4069e+000, A4 = −1.3395e−001, A6 = 3.2661e−002,
A8 = −5.1361e−003, A10 = 7.1764e−004, A12 = −5.5404e−005

Surface 9

K = −2.7724e+000, A4 = −9.4378e−002, A6 = 2.9651e−002,
A8 = −6.0688e−003, A10 = 6.8145e−004, A12 = −3.1543e−005

Other Data

| | |
|---|---|
| Focal Length | 3.830 |
| F-NUMBER | 2.801 |
| Angle of View | 37.565 |
| Image Height | 2.980 |
| Overall Lens Length | 5.099 |
| BF | 1.297 |

Lens Data

| Lens | Front Surface | Back Surface | Focal Length |
|---|---|---|---|
| 1 | 2 | 3 | 2.904 |
| 2 | 4 | 5 | −4.344 |

-continued

Unit: mm

| 3 | 6 | 7 | 4.217 |
|---|---|---|-------|
| 4 | 8 | 9 | -5.529 |

Lens Group Data

| Group | Front Surface | Back Surface |
|-------|---------------|--------------|
| 1 | 2 | 5 |
| 2 | 6 | 7 |
| 3 | 8 | 9 |

The extension amount is 0.145 mm.

The spherical aberration (sine condition), astigmatism, and destortion 1H of Example 8 in the above lens arrangement and the configuration are shown in FIG. 28.

Example 9

Figure 13:
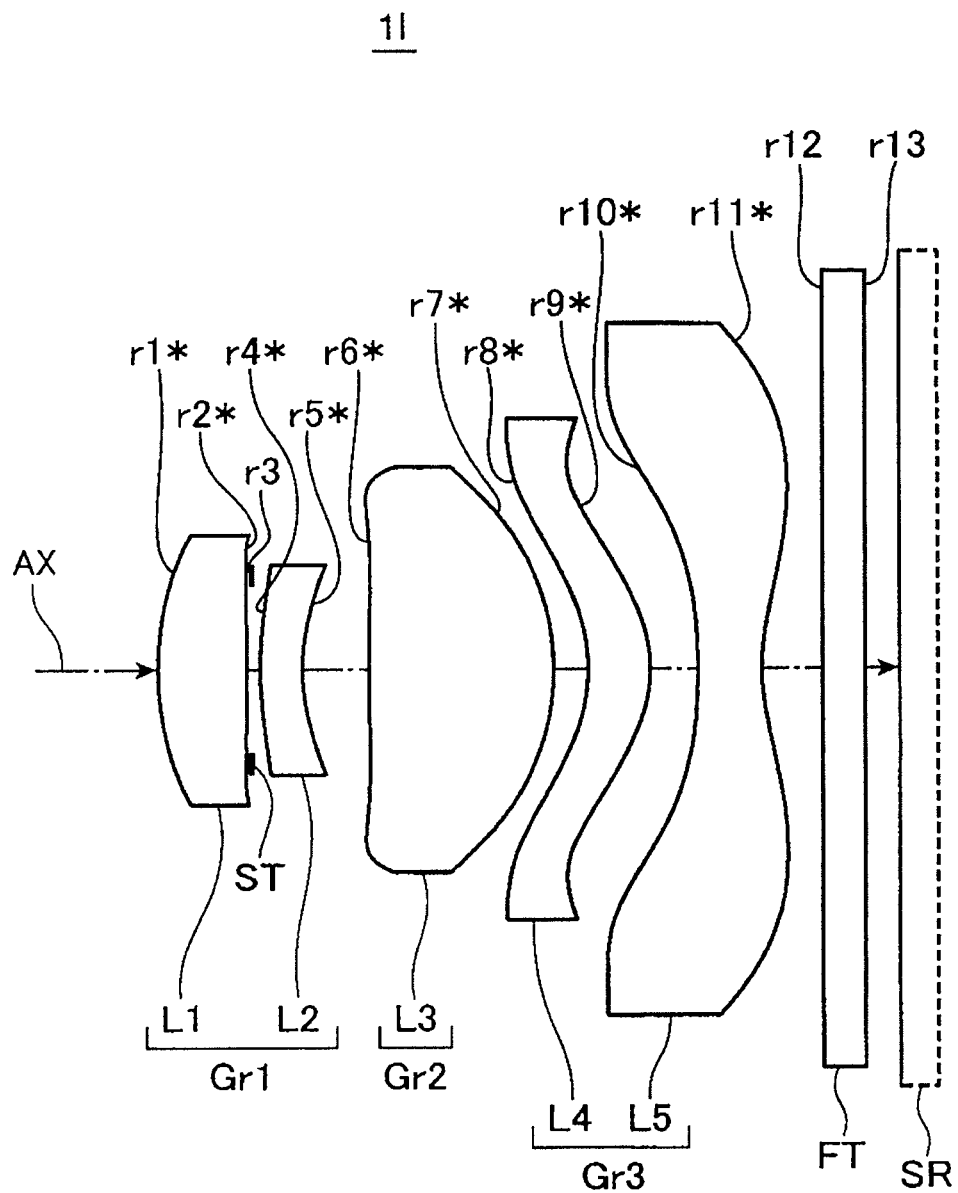
FIG. 13 is across-sectional view showing an arrangement of lens groups of a single-focus optical system of Example 9.
Figure 29:
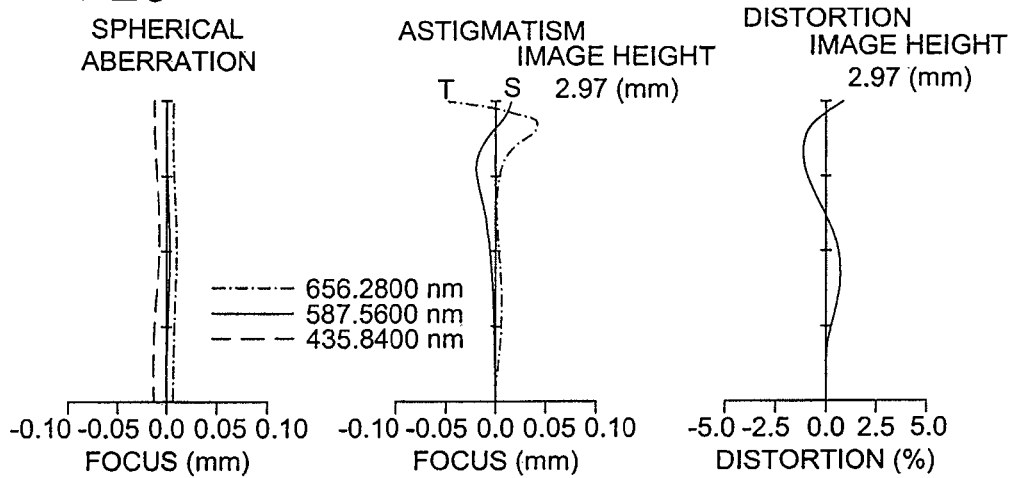
FIG. 29 is an aberration diagram of the single-focus optical system of the embodiment 9.

FIG. 13 is a cross-sectional view showing an arrangement of lens groups in a single-focus optical system of Example 9. FIG. 29 shows aberration diagrams of the single-focus optical system of Example 9.

In the single-focus optical system 1I of Example 9, each of the lens groups (Gr1, Gr2, and Gr3) is arranged in order from the object side to the image side as shown in FIG. 13, and when focusing is performed, the first lens group (Gr1) is fixed with respect to a predetermined imaging surface; the second lens group (Gr2) is moved in the optical axis AX direction; and the third lens group (Gr3) is fixed with respect to the predetermined imaging surface.

In more details, in the single-focus optical system 1I of Example 9, the lens groups (Gr1, Gr2, and Gr3) are constituted in order from the object side to the image side as described below.

The first lens group (Gr1) is constituted of a biconvex positive lens (a first lens L1), an aperture stop ST, and a negative meniscus lens (a second lens L2) convex toward the object side.

The second lens group (Gr2) is constituted of a biconvex positive lens (a third lens L3).

The third lens group (Gr3) is constituted of a positive meniscus lens (a fourth lens L4) convex toward the image side and a vi-concave negative lens (a fifth lens L5). And, the fifth lens L5 has at least one aspherical surface which has a positive optical power in the periphery. Alternatively, the fifth lens L5 is a lens having an aspherical shape which has an inflection point at a position other than the position which is the intersection of the aspherical shape and the optical axis Both faces of each of the lenses L1-L5 of the first lens groups Gr1 to the third lens group Gr3 are aspherical, and these lenses are made of resin material.

In addition, on the image side of the third lens group Gr3, the light receiving surface of the imaging element SR is arranged with a parallel flat plate FT serving as a filter therebetween. The parallel flat plate FT may be various types of optical filter of a cover glass of the imaging element SR.

In such a configuration, light beam having entered from the object side passes, along the optical axis AX, through the first lens group (Gr1) including the aperture stop ST, the second lens group (Gr2), the third lens group (Gr3), and the parallel flat plate FT in this order to form an optical image of an object on the light receiving surface of the imaging element SR. Then, in the imaging element SR, the optical image is converted into an electrical signal. This electrical signal is subjected to a predetermined digital processing if necessary, to be stored in a memory of a digital apparatus such as a digital camera as a digital image signal or to be transmitted to another digital apparatus by cable or wireless communication through an interface.

Construction data of the lenses of the single-focus optical system 1H of Example 9 are listed below.

Numerical Example 9

Unit: mm

Surface Data

| Surface Number | r | d | nd | vd |
|----------------|---|---|-----|-----|
| Object Plane | ∞ | ∞ | | |
| 1* | 2.189 | 0.646 | 1.54470 | 56.15 |
| 2* | -23.552 | 0.033 | | |
| 3(Aperture Stop) | ∞ | 0.060 | | |
| 4* | 2.655 | 0.300 | 1.63200 | 23.41 |
| 5* | 1.458 | 0.474 | | |
| 6* | 16.320 | 1.321 | 1.54470 | 56.15 |
| 7* | -1.696 | 0.243 | | |
| 8* | -1.241 | 0.450 | 1.58300 | 29.90 |
| 9* | -0.958 | 0.341 | | |
| 10* | -3.838 | 0.450 | 1.58300 | 29.90 |
| 11* | 1.554 | 0.432 | | |
| 12 | ∞ | 0.300 | 1.51633 | 64.14 |
| 13 | ∞ | 0.250 | | |
| Image Plane | ∞ | | | |

Aspherical Data

Surface 1

K = 4.2243e−001, A4 = 8.1081e−004, A6 = 2.1309e−002,
A8 = −5.5515e−002, A10 = 9.0911e−002, A12 = −6.8516e−002,
A14 = 2.1011e−002

Surface 2

K = 2.9849e+001, A4 = −2.4641e−002, A6 = 1.7513e−001,
A8 = −3.8263e−001, A10 = 6.4440e−001, A12 = −7.0158e−001,
A14 = 3.4144e−001

Surface 4

K = −1.0500e+001, A4 = −1.0691e−001, A6 = 1.6935e−001,
A8 = −5.8283e−002, A10 = −4.1424e−001, A12 = 7.5877e−001,
A14 = −1.3043e−001

Surface 5

K = −3.8415e+000, A4 = −3.8289e−002, A6 = 7.9779e−002,
A8 = −1.1590e−002, A10 = −1.3847e−001, A12 = 1.8516e−001,
A14 = −7.9310e−002

Surface 6

K = 1.4400e+001, A4 = −3.0706e−002, A6 = −1.6834e−002,
A8 = 2.4967e−002, A10 = −2.5922e−002, A12 = 1.0411e−002,
A14 = 3.6906e−004

Surface 7

K = −5.0930e−001, A4 = 1.6653e−003, A6 = 1.5998e−004,
A8 = −1.4004e−002, A10 = 1.0617e−002, A12 = −4.9143e−003,
A14 = 1.1490e−003

Surface 8

K = −5.3493e−001, A4 = 4.3106e−002, A6 = 4.7613e−002,
A8 = −4.8325e−003, A10 = −3.0808e−003, A12 = 1.4874e−003,
A14 = −1.7700e−004

Surface 9

K = −2.8838e+000, A4 = −8.3656e−002, A6 = 5.9666e−002,
A8 = −5.7822e−003, A10 = 1.3518e−003, A12 = −9.2697e−004,
A14 = 1.1751e−004

Surface 10

K = −3.0000e+001, A4 = −1.0048e−001, A6 = 1.5809e−002,
A8 = 3.1778e−003, A10 = −5.3222e−004, A12 = −3.0451e−005,
A14 = 4.0897e−006

-continued

Unit: mm

Surface 11

K = 1.0043e+001, A4 = −5.6632e−002, A6 = 1.8233e−002,
A8 = −4.9284e−003, A10 = 0.0175e−003, A12 = −1.1825e−004,
A14 = 5.7058e−006

Other Data

| | |
|---|---|
| Focal Length | 3.835 |
| F-NUMBER | 2.805 |
| Angle of View | 37.610 |
| Image Height | 2.980 |
| Overall Lens Length | 5.198 |
| BF | 0.880 |

Lens Data

| Lens | Front Surface | Back Surface | Focal Length |
|---|---|---|---|
| 1 | 1 | 2 | 3.710 |
| 2 | 4 | 5 | −5.663 |
| 3 | 6 | 7 | 2.896 |
| 4 | 8 | 9 | 4.543 |
| 5 | 10 | 11 | −1.841 |

Lens Group Data

| Group | Front Surface | Back Surface |
|---|---|---|
| 1 | 1 | 5 |
| 2 | 6 | 7 |
| 3 | 8 | 11 |

The extension amount is 0.091 mm.

The spherical aberration (sine condition), astigmatism, and destortion 1I of Example 9 in the above lens arrangement and the configuration are shown in FIG. 29.

Example 10

Figure 14:
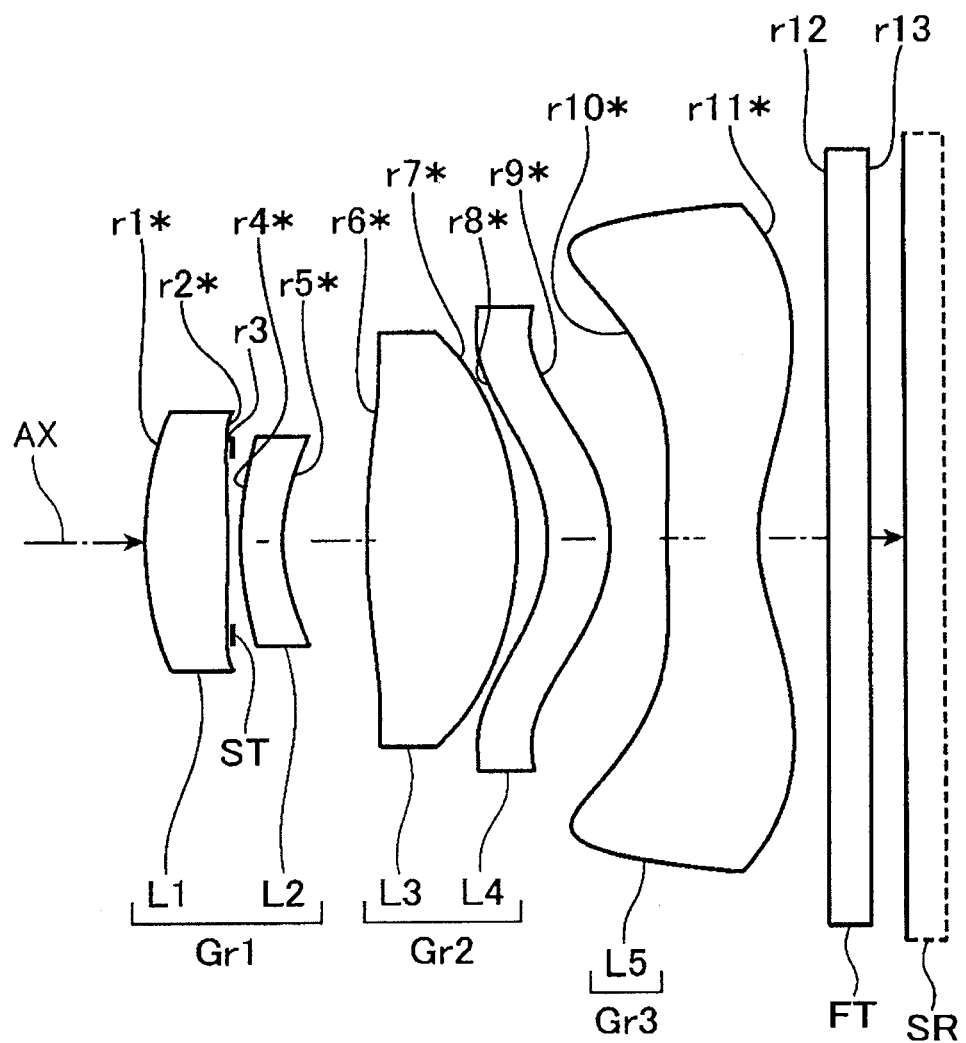
FIG. 14 is across-sectional view showing an arrangement of lens groups of a single-focus optical system of Example 10.
Figure 30:
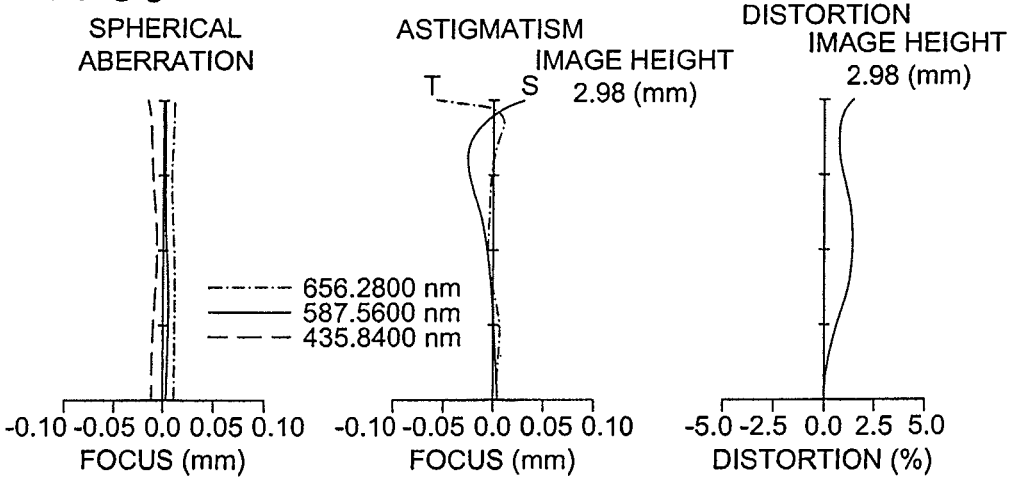
FIG. 30 is an aberration diagram of the single-focus optical system of the embodiment 10.

FIG. 14 is a cross-sectional view showing an arrangement of lens groups in a single-focus optical system of Example 10. FIG. 30 shows aberration diagrams of the single-focus optical system of Example 10.

In the single-focus optical system 1J of Example 10, each of the lens groups (Gr1, Gr2, and Gr3) is arranged in order from the object side to the image side as shown in FIG. 14, and when focusing is performed, the first lens group (Gr1) is fixed with respect to a predetermined imaging surface; the second lens group (Gr2) is moved in the optical axis AX direction; and the third lens group (Gr3) is fixed with respect to the predetermined imaging surface.

In more details, in the single-focus optical system 1J of Example 10, the lens groups (Gr1, Gr2, and Gr3) are constituted in order from the object side to the image side as described below.

The first lens group (Gr1) is constituted of a biconvex positive lens (a first lens L1), an aperture stop ST, and a negative meniscus lens (a second lens L2) convex toward the object side. The aperture stop ST is arranged between the first lens L1 and the second lens L2 of the fast lens group Gr1.

The second lens group (Gr2) is constituted of a biconvex positive lens (a third lens L3) and a positive meniscus lens (a fourth lens L4) convex to the image side.

The third lens group (Gr3) is constituted of a negative meniscus lens (a fifth lens L5) convex toward the object side. And, the fifth lens L5 has at least one aspherical surface which has a positive optical power in the periphery. Alternatively, the fifth lens L5 is a lens having an aspherical shape which has an inflection point at a position other than the position which is the intersection of the aspherical shape and the optical axis.

Both faces of each of the lenses L1-L5 of the first lens groups Gr1 to the third lens group Gr3 are aspherical, and these lenses are made of resin material.

In addition, on the image side of the third lens group Gr3, the light receiving surface of the imaging element SR is arranged with a parallel flat plate FT serving as a filter therebetween. The parallel flat plate FT may be various types of optical filter of a cover glass of the imaging element SR In such a configuration, light beam having entered from the object side passes, along the optical axis AX, through the first lens group (Gr1) including the aperture stop ST, the second lens group (Gr2), the third lens group (Gr3), and the parallel flat plate FT in this order to form an optical image of an object on the light receiving surface of the imaging element SR. Then, in the imaging element SR, the optical image is converted into an electrical signal. This electrical signal is subjected to a predetermined digital processing, if necessary, to be stored in a memory of a digital apparatus such as a digital camera as a digital image signal or to be transmitted to another digital apparatus by cable or wireless communication through an interface.

Construction data of the lenses of the single-focus optical system 1J of Example 10 are listed below.

Numerical Example 10

Unit: mm

Surface Data

| Surface Number | r | d | nd | vd |
|---|---|---|---|---|
| Object Plane | ∞ | ∞ | | |
| 1* | 2.794 | 0.597 | 1.54470 | 56.15 |
| 2* | −15.241 | 0.033 | | |
| 3(Aperture Stop) | ∞ | 0.060 | | |
| 4* | 2.060 | 0.300 | 1.63200 | 23.41 |
| 5* | 1.292 | 0.604 | | |
| 6* | 5.256 | 1.076 | 1.54470 | 56.15 |
| 7* | −2.528 | 0.218 | | |
| 8* | −1.234 | 0.453 | 1.63200 | 23.41 |
| 9* | −1.133 | 0.411 | | |
| 10* | 7.226 | 0.648 | 1.63200 | 23.41 |
| 11* | 1.418 | 0.499 | | |
| 12 | ∞ | 0.300 | 1.51633 | 64.14 |
| 13 | ∞ | 0.250 | | |
| Image Plane | ∞ | | | |

Aspherical Data

Surface 1

K = 6.9209e−001, A4 = 5.2106e−003, A6 = 1.4389e−002,
A8 = −4.7556e−002, A10 = 1.0714e−001, A12 = −9.2454e−002,
A14 = 3.2977e−002

Surface 2

K = 1.2110e+001, A4 = −2.9709e−002, A6 = 2.3913e−001,
A8 = −4.2925e−001, A10 = 6.4063e−001, A12 = −6.4759e−001,
A14 = 3.4145e−001

Surface 4

K = −9.7334e+000, A4 = −7.9196e−002, A6 = 1.8988e−001,
A8 = −7.6588e−002, A10 = −3.7412e−001, A12 = 7.5641e−001,
A14 = −4.3044e−001

Surface 5

K = −3.7509e+000, A4 = −4.3905e−002, A6 = 7.8331e−002,
A8 = 1.5738e−003, A10 = −1.5496e−001, A12 = 2.2392e−001,
A14 = −1.0266e−001

-continued

Unit: mm

Surface 6

K = 1.2084e+001, A4 = −1.8387e−002, A6 = −2.1808e−002,
A8 = 2.7119e−002, A10 = −2.6987e−002, A12 = 9.5160e−003,
A14 = −1.1120e−003
Surface 7

K = −5.0031e−001, A4 = −1.3089e−002, A6 = 1.6455e−002,
A8 = −1.9307e−002, A10 = 1.0697e−002, A12 = −3.9845e−003,
A14 = 6.6084e−004
Surface 8

K = −5.7182e−001, A4 = 4.8335e−002, A6 = 4.7253e−002,
A8 = −3.2998e−003, A10 = −3.1320e−003, A12 = 1.1277e−003,
A14 = −1.2406e−004
Surface 9

K = −2.5945e+000, A4 = −7.6929e−002, A6 = 5.4855e−002,
A8 = −5.1051e−003, A10 = 1.6342e−003, A12 = −1.0678e−003,
A14 = 1.3050e−004
Surface 10

K = −3.0000e+001, A4 = −1.3156e−001, A6 = 3.2407e−002,
A8 = −2.2211e−003, A10 = −9.0932e−004, A12 = 1.6975e−004,
A14 = −6.3405e−007
Surface 11

K = −5.7247e+000, A4 = −7.0789e−002, A6 = 2.2784e−002,
A8 = −5.7758e−003, A10 = 9.2623e−004, A12 = −8.7481e−005,
A14 = 3.6677e−006

Other Data

| Focal Length | 3.826 |
|---|---|
| F-NUMBER | 2.805 |
| Angle of View | 37.552 |
| Image Height | 2.980 |
| Overall Lens Length | 5.351 |
| BF | 0.950 |

Lens Data

| Lens | Front Surface | Back Surface | Focal Length |
|---|---|---|---|
| 1 | 1 | 2 | 4.387 |
| 2 | 4 | 5 | −6.471 |
| 3 | 6 | 7 | 3.294 |
| 4 | 8 | 9 | 8.010 |
| 5 | 10 | 11 | −2.919 |

Lens Group Data

| Group | Front Surface | Back Surface |
|---|---|---|
| 1 | 1 | 5 |
| 2 | 6 | 9 |
| 3 | 8 | 11 |

When the optical system is extended, the third lens L3 and the fourth lens L4 are moved toward the object side, and the extension amount from the infinite object distance to the object distance of 10 cm is 0.093 mm.

The spherical aberration (sine condition), astigmatism, and destortion 1J of Example 10 in the above lens arrangement and the configuration are shown in FIG. 30.

Example 11

Figure 15:
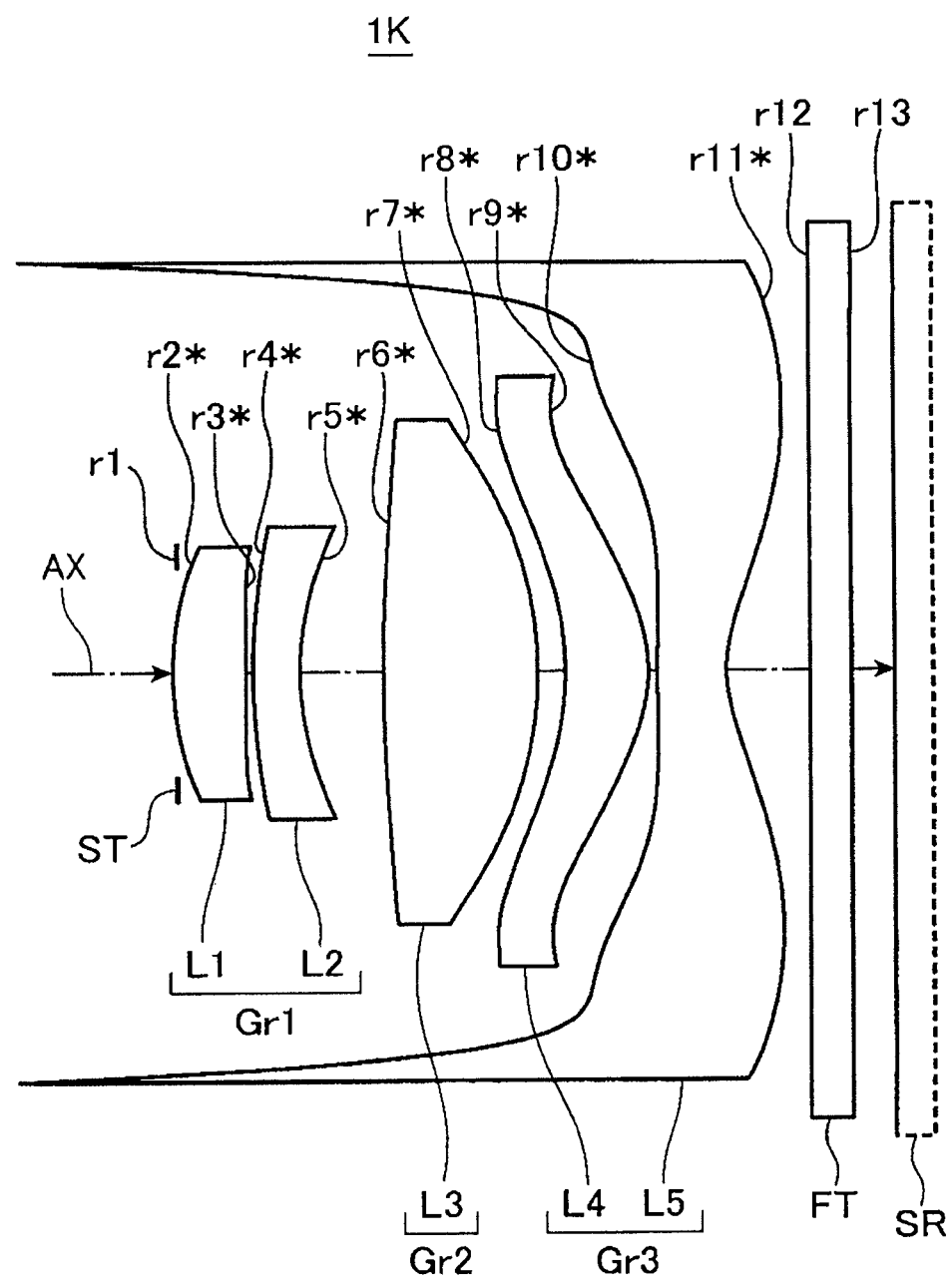
FIG. 15 is across-sectional view showing an arrangement of lens groups of a single-focus optical system of Example 11.
Figure 31:
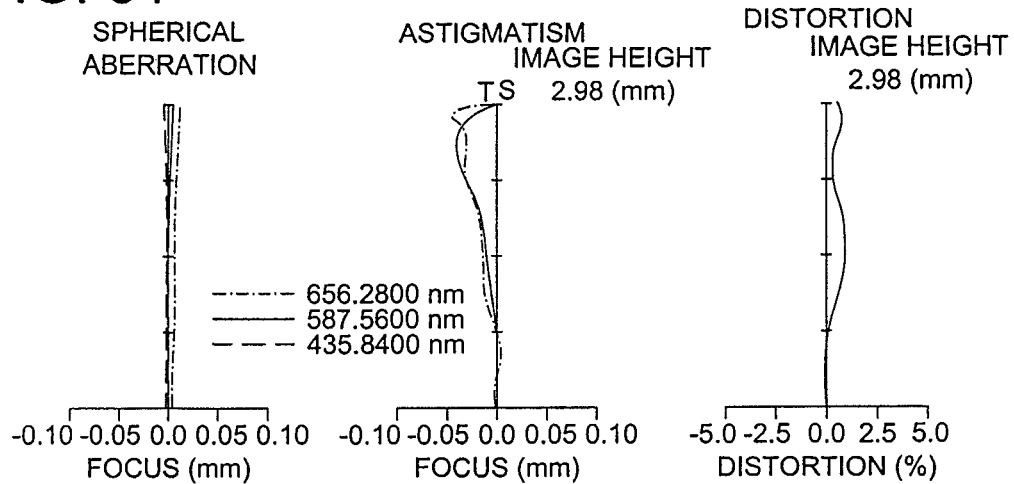
FIG. 31 is an aberration diagram of the single-focus optical system of the embodiment 11.

FIG. 15 is a cross-sectional view showing an arrangement of lens groups in a single-focus optical system of Example 11. FIG. 31 shows aberration diagrams of the single-focus optical system of Example 11.

In the single-focus optical system 1K of Example 11, each of the lens groups (Gr1, Gr2, and Gr3) is arranged in order from the object side to the image side as shown in FIG. 15, and when focusing is performed, the first lens group (Gr1) is fixed with respect to a predetermined imaging surface; the second lens group (Gr2) is moved in the optical axis AX direction; and the third lens group (Gr3) is fixed with respect to the predetermined imaging surface.

In more details, in the single-focus optical system 1K of Example 11, the lens groups (Gr1, Gr2, and Gr3) are constituted in order from the object side to the image side as described below.

The first lens group (Gr1) is constituted of a biconvex positive lens (a first lens L1) and a negative meniscus lens (a second lens L2) convex toward the object side. An aperture stop ST is arranged on the object side of the first lens L1 of the first lens group Gr1.

The second lens group (Gr2) is constituted of a biconvex positive lens (a third lens L3).

The third lens group (Gr3) is constituted of a positive meniscus lens (a fourth lens L4) convex toward the image side and a negative meniscus lens (a fifth lens L5) convex toward the object side. And, the fifth lens L5 has at least one aspherical surface which has a positive optical power in the periphery. Alternatively, the fifth lens L5 is a lens having an aspherical shape which has an inflection point at a position other than the position which is the intersection of the aspherical shape and the optical axis Each of the lenses L1, L2, L4, and L5 of the first lens groups Gr1 and the third lens group Gr3 is made of resin and has aspherical surfaces on the opposite sides. The third lens L3 of the second lens group Gr2 is made of glass and has aspherical surfaces on the opposite sides.

In addition, on the image side of the third lens group Gr3, the light receiving surface of the imaging element SR is arranged with a parallel flat plate FT serving as a filter therebetween. The parallel flat plate FT may be various types of optical filter of a cover glass of the imaging element SR.

In such a configuration, light beam having entered from the object side passes, along the optical axis AX, through the aperture stop ST, the first lens group (Gr1), the second lens group (Gr2), the third lens group (Gr3), and the parallel flat plate FT in this order to from an optical image of an object on the light receiving surface of the imaging element SR. Then, in the imaging element SR, the optical image is converted into an electrical signal. This electrical signal is subjected to a predetermined digital processing, if necessary, to be stored in a memory of a digital apparatus such as a digital camera as a digital image signal or to be transmitted to another digital apparatus by cable or wireless communication through an interface.

Construction data of the lenses of the single-focus optical system 1K of Example 11 are listed below.

Numerical Example 11

Unit: mm

Surface Data

| Surface Number | r | d | nd | vd |
|---|---|---|---|---|
| Object Plane | ∞ | ∞ | | |
| 1(Aperture Stop) | ∞ | −0.030 | | |
| 2* | 1.934 | 0.525 | 1.54470 | 56.15 |
| 3* | −37.008 | 0.050 | | |
| 4* | 3.471 | 0.339 | 1.63200 | 23.41 |
| 5* | 1.560 | 0.600 | | |
| 6* | 9.014 | 1.111 | 1.48749 | 70.24 |
| 7* | −2.214 | 0.200 | | |

-continued

Unit: mm

| | | | | |
|---|---|---|---|---|
| 8* | −1.779 | 0.600 | 1.54470 | 56.15 |
| 9* | −0.844 | 0.067 | | |
| 10* | 10.678 | 0.500 | 1.54470 | 56.15 |
| 11* | 0.762 | 0.600 | | |
| 12 | ∞ | 0.300 | 1.51633 | 64.14 |
| 13 | ∞ | 0.306 | | |
| Image Plane | ∞ | | | |

Aspherical Data

Surface 2

K = 3.6230e−001, A4 = 6.7071e−003, A6 = 5.5178e−002,
A8 = −8.7357e−002, A10 = 5.8796e−002, A12 = 2.0291e−001,
A14 = −2.4518e−001
Surface 3

K = −3.0000e+001, A4 = 6.6250e−002, A6 = 2.7503e−002,
A8 = −2.0705e−002, A10 = 2.0094e−001, A12 = −1.7169e−001,
A14 = 1.0160e−002
Surface 4

K = 2.7059e+000, A4 = −5.8637e−002, A6 = 7.7823e−003,
A8 = 5.8925e−002, A10 = 1.3294e−002, A12 = −8.7425e−002,
A14 = 3.4352e−002
Surface 5

K = −3.2629e+000, A4 = −1.4587e−003, A6 = 2.8697e−002,
A8 = −2.6139e−002, A10 = 4.8164e−002, A12 = −4.9823e−002,
A14 = 1.9406e−002
Surface 6

K = 1.7979e+001, A4 = 3.4082e−005, A6 = −1.9950e−002,
A8 = 1.3353e−002, A10 = −4.0239e−003, A12 = 3.1910e−004,
A14 = 5.6205e−005
Surface 7

K = −2.8581e−001, A4 = 5.7976e−003, A6 = −4.9262e−003,
A8 = 3.0226e−004, A10 = 1.6568e−003, A12 = −1.1105e−003,
A14 = 2.6265e−004
Surface 8

K = −1.4556e−001, A4 = 1.8984e−002, A6 = 2.1329e−002,
A8 = 3.2080e−003, A10 = −2.2272e−003, A12 = −1.4804e−005,
A14 = 1.0671e−004
Surface 9

K = −4.2877e+000, A4 = −9.6319e−002, A6 = 5.4410e−002,
A8 = −9.2792e−003, A10 = 1.4697e−003, A12 = −3.2499e−004,
A14 = 3.0592e−005
Surface 10

K = −3.0000e+001, A4 = −1.1169e−001, A6 = 1.7419e−002,
A8 = 1.7969e−003, A10 = −8.6342e−004, A12 = 2.1733e−004,
A14 = −2.5652e−005
Surface 11

K = −5.1550e+000, A4 = −5.7994e−002, A6 = 1.7237e−002,
A8 = −4.2663e−003, A10 = 6.3222e−004, A12 = −4.4364e−005,
A14 = 9.3895e−007

Other Data

| | |
|---|---|
| Focal Length | 3.833 |
| F-NUMBER | 2.801 |
| Angle of View | 37.714 |
| Image Height | 2.980 |
| Overall Lens Length | 5.064 |
| BF | 1.102 |

Lens Data

| Lens | Front Surface | Back Surface | Focal Length |
|---|---|---|---|
| 1 | 2 | 3 | 3.390 |
| 2 | 4 | 5 | −4.815 |
| 3 | 6 | 7 | 3.768 |
| 4 | 8 | 9 | 2.404 |
| 5 | 10 | 11 | −1.534 |

Lens Group Data

| Group | Front Surface | Back Surface |
|---|---|---|
| 1 | 2 | 5 |
| 2 | 6 | 7 |
| 3 | 8 | 11 |

The extension amount is 0.127 mm.

The spherical aberration (sine condition), astigmatism, and destortion 1K of Example 11 in the above lens arrangement and the configuration are shown in FIG. 31.

Example 12

Figure 16:
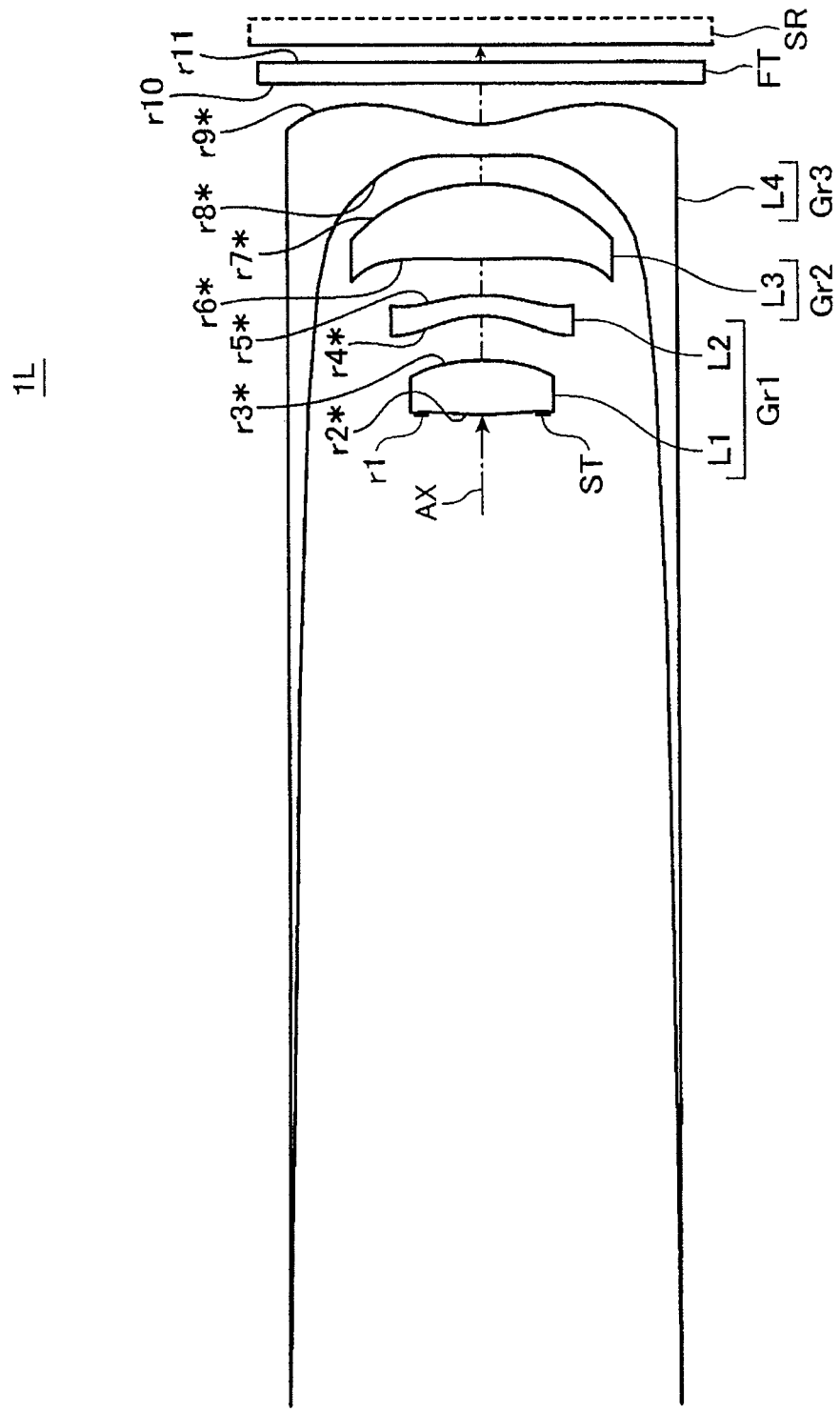
FIG. 16 is across-sectional view showing an arrangement of lens groups of a single-focus optical system of Example 12.
Figure 32:
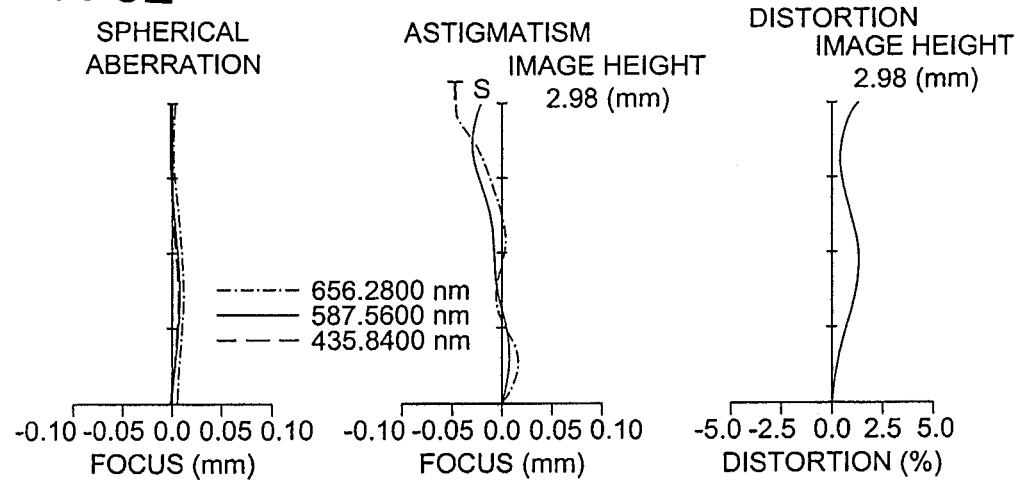
FIG. 32 is an aberration diagram of the single-focus optical system of the embodiment 12.

FIG. 16 is a cross-sectional view showing an arrangement of lens groups in a single-focus optical system of Example 12. FIG. 32 shows aberration diagrams of the single-focus optical system of Example 12.

In the single-focus optical system 1L of Example 12, each of the lens groups (Gr1, Gr2, and Gr3) is arranged in order from the object side to the image side as shown in FIG. 16, and when focusing (focus adjustment) is performed, the first lens group (Gr1) is fixed with respect to a predetermined imaging surface; the second lens group (Gr2) is moved in the optical axis AX direction; and the third lens group (Gr3) is fixed with respect to the predetermined imaging surface.

In more details, in the single-focus optical system 1L of Example 12, the lens groups (Gr1, Gr2, and Gr3) are constituted in order from the object side to the image side as described below.

The first lens group (Gr1) is constituted of a biconvex positive lens (a first lens L1) and a negative meniscus lens (a second lens L2) convex toward the image side. An aperture stop ST is arranged on the object side of the first lens L of the first lens group Gr1.

The second lens group (Gr2) is constituted of a biconvex positive lens (a third lens 3).

The third lens group (Gr3) is constituted of a negative meniscus lens (a fourth lens L4) convex toward the object side. And, the fourth lens L4 has at least one aspherical surface which has a positive optical power in the periphery. Alternatively, the fourth lens L4 is a lens having an aspherical shape which has an inflection point at a position other than the position which is the intersection of the aspherical shape and the optical axis.

Each of the lenses L2-L4 of the first lens groups Gr1 to the third lens group Gr3 is made of resin and has aspherical surfaces on the opposite sides. The first lens L1 of the first lens group Gr1 is made of glass and has aspherical surfaces on the opposite sides.

In addition, on the image side of the third lens group Gr3, the light receiving surface of the imaging element SR is arranged with a parallel flat plate FT serving as a filter therebetween. The parallel flat plate FT may be various types of optical filter of a cover glass of the imaging element SR In such a configuration, light beam having entered from the object side passes, along the optical axis AX, through the aperture stop ST, the first lens group (Gr1), the second lens group (Gr2), the third lens group (Gr3), and the parallel flat plate FT in this order to form an optical image of an object on the light receiving surface of the imaging element SR. Then, in the imaging element SR, the optical image is converted into an electrical signal. This electrical signal is subjected to a predetermined digital processing, if necessary, to be stored in a memory of a digital apparatus such as a digital camera as a digital image signal or to be transmitted to another digital apparatus by cable or wireless communication through an interface.

Construction data of the lenses of the single-focus optical system 1L of Example 12 are listed below.

Numerical Example 12

Unit: mm

Surface Data

| Surface Number | r | d | nd | vd |
|---|---|---|---|---|
| Object Plane | ∞ | ∞ | | |
| 1(Aperture Stop) | ∞ | 0.000 | | |
| 2* | 3.898 | 0.773 | 1.49700 | 81.61 |
| 3* | −2.524 | 0.636 | | |
| 4* | −1.163 | 0.300 | 1.63200 | 23.41 |
| 5* | −1.733 | 0.516 | | |
| 6* | 14.168 | 1.081 | 1.54470 | 56.15 |
| 7* | −2.129 | 0.400 | | |
| 8* | 5.902 | 0.450 | 1.54470 | 56.15 |
| 9* | 1.161 | 0.594 | | |
| 10 | ∞ | 0.300 | 1.51633 | 64.14 |
| 11 | ∞ | 0.250 | | |
| Image Plane | ∞ | | | |

Aspherical Data

Surface 2

K = −5.7280e+000, A4 = −5.8462e−002, A6 = −9.8713e−003,
A8 = −1.4260e−001, A10 = 2.3855e−001, A12 = −2.4086e−001,
A14 = 8.4941e−002
Surface 3

K = 3.8463e+000, A4 = −5.3699e−002, A6 = 2.9418e−002,
A8 = −7.9605e−002, A10 = 1.5850e−001, A12 = −1.4738e−001,
A14 = 5.6192e−002
Surface 4

K = −3.3413e+000, A4 = −1.2915e−001, A6 = 3.9888e−001,
A8 = −3.6717e−001, A10 = 2.1473e−001, A12 = −7.4718e−002,
A14 = 1.2071e−002
Surface 5

K = −1.7023e+001, A4 = −3.2680e−001, A6 = 9.3412e−001,
A8 = −1.4471e+000, A10 = 1.6513e+000, A12 = −1.2860e+000,
A14 = 6.2272e−001, A16 = −1.6332e−001
Surface 6

K = 6.9766e+000, A4 = −5.8809e−002, A6 = 5.4584e−002,
A8 = −5.1044e−002, A10 = 2.2469e−002, A12 = −5.4223e−003,
A14 = 5.3021e−004
Surface 7

K = 0.0000e+000, A4 = 1.0747e−002, A6 = −2.0621e−003,
A8 = −2.8274e−003, A10 = 1.2984e−003, A12 = −4.6925e−004,
A14 = 1.0462e−004
Surface 8

K = −1.9610e+002, A4 = −1.8946e−001, A6 = 5.1005e−002,
A8 = −6.6501e−003, A10 = −1.5519e−003, A12 = 1.0531e−003,
A14 = −1.6313e−004
Surface 9

K = −4.7431e+000, A4 = −8.8521e−002, A6 = 3.2516e−002,
A8 = −8.8001e−003, A10 = 1.4910e−003, A12 = −1.4098e−004,
A14 = 5.4495e−006

Other Data

| Focal Length | 3.962 |
|---|---|
| F-NUMBER | 2.802 |
| Angle of View | 36.580 |

-continued

Unit: mm

| Image Height | 2.980 |
|---|---|
| Overall Lens Length | 5.197 |
| BF | 1.041 |

Lens Data

| Lens | Front Surface | Back Surface | Focal Length |
|---|---|---|---|
| 1 | 2 | 3 | 3.211 |
| 2 | 4 | 5 | −7.033 |
| 3 | 6 | 7 | 3.479 |
| 4 | 8 | 9 | −2.746 |

Lens Group Data

| Group | Front Surface | Back Surface |
|---|---|---|
| 1 | 2 | 5 |
| 2 | 6 | 7 |
| 3 | 8 | 9 |

The extension amount is 0.116 mm.

The spherical aberration (sine condition), astigmatism, and destortion 1L of Example 12 in the above lens arrangement and the configuration are shown in FIG. 32.

Example 14

Figure 17:
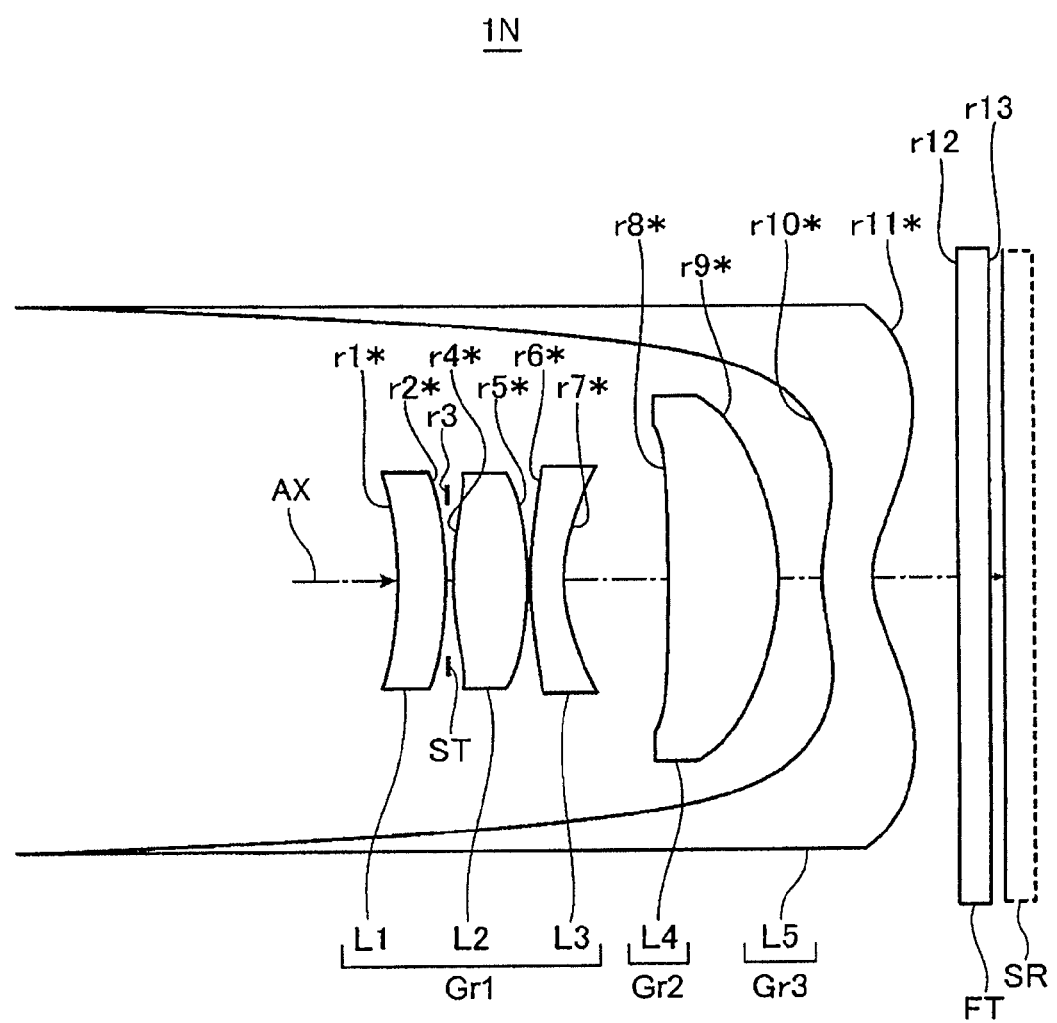
FIG. 17 is a cross-sectional view showing an arrangement of lens groups of a single-focus optical system of Example 14.
Figure 33:
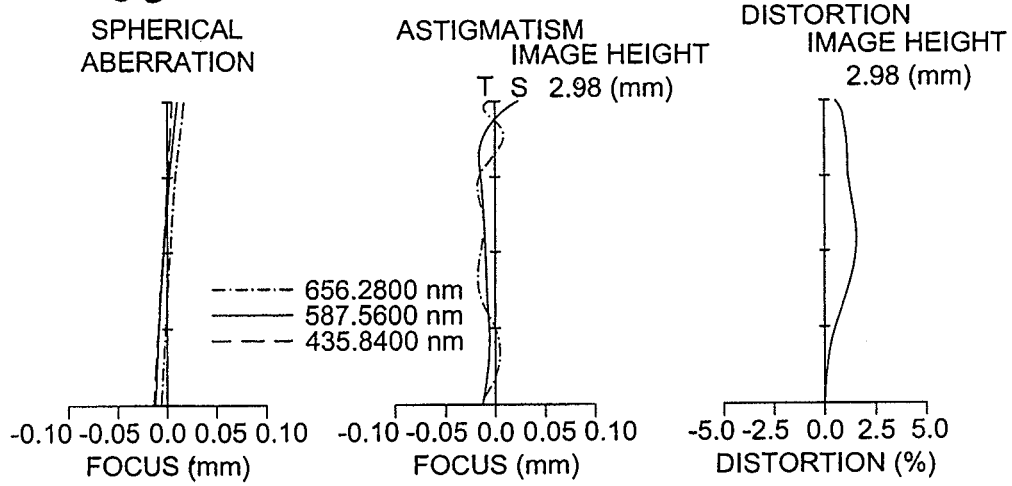
FIG. 33 is an aberration diagram of the single-focus optical system of the embodiment 14.

FIG. 17 is a cross-sectional view showing an arrangement of lens groups in a single-focus optical system of Example 14. FIG. 33 shows aberration diagrams of the single-focus optical system of Example 14.

In the single-focus optical system 1N of Example 14, each of the lens groups (Gr1, Gr2, and Gr3) is arranged in order from the object side to the image side as shown in FIG. 17, and when focusing (focus adjustment) is performed, the first lens group (Gr1) is fixed with respect to a predetermined imaging surface; the second lens group (Gr2) is moved in the optical axis AX direction; and the third lens group (Gr3) is fixed with respect to the predetermined imaging surface.

In more details, in the single-focus optical system 1N of Example 14, the lens groups (Gr1, Gr2, and Gr3) are constituted in order form the object side to the image side as described below.

The first lens group (Gr1) is constituted of a negative meniscus lens (a first lens L1) convex toward the image side, an aperture stop ST, a biconvex positive lens (a second lens L2), and a negative meniscus lens (a third lens L3) convex toward the objet side. The aperture stop ST is arranged between the first lens L1 and the second lens L2 of the first lens group Gr1.

The second lens group (Gr2) is constituted of a positive meniscus lens (a fourth lens L4) convex toward the image side.

The third lens group (Gr3) is constituted of a negative meniscus lens (a fifth lens L5) convex toward the object side. And, the fifth lens L5 has at least one aspherical surface which has a positive optical power in the periphery. Alternatively, the fifth lens L5 is a lens having an aspherical shape which has an inflection point at a position other than the position which is the intersection of the aspherical shape and the optical axis.

Each of the lenses L1-L5 of the first lens groups Gr1 to the third lens group Gr3 is made of resin and has aspherical surfaces on the opposite sides.

In addition, on the image side of the third lens group Gr3, the light receiving surface of the imaging element SR is arranged with a parallel flat plate FT serving as a filter therebetween. The parallel flat plate FT may be various types of optical filter of a cover glass of the imaging element SR In such a configuration, light beam having entered from the object side passes, along the optical axis AX, through the first lens group (Gr1) including the aperture stop ST, the second lens group (Gr2), the third lens group (Gr3), and the parallel flat plate FT in this order to form an optical image of an object on the light receiving surface of the imaging element SR. Then, in the imaging element SR, the optical image is converted into an electrical signal. This electrical signal is subjected to a predetermined digital processing, if necessary, to be stored in a memory of a digital apparatus such as a digital camera as a digital image signal or to be transmitted to another digital apparatus by cable or wireless communication through an interface.

Construction data of the lenses of the single-focus optical system 1N of Example 14 are listed below.

Numerical Example 14

Unit: mm

Surface Data

| Surface Number | r | d | nd | vd |
|---|---|---|---|---|
| Object Plane | ∞ | ∞ | | |
| 1* | −3.797 | 0.443 | 1.54470 | 56.15 |
| 2* | −3.989 | 0.020 | | |
| 3(Aperture Stop) | ∞ | 0.050 | | |
| 4* | −2.872 | 0.701 | 1.54470 | 56.15 |
| 5* | −3.019 | 0.026 | | |
| 6* | 2.882 | 0.311 | 1.63200 | 23.41 |
| 7* | 1.362 | 0.973 | | |
| 8* | −16.884 | 1.025 | 1.54470 | 56.15 |
| 9* | −2.405 | 0.400 | | |
| 10* | 1.596 | 0.470 | 1.54470 | 56.15 |
| 11* | 0.919 | 0.800 | | |
| 12 | ∞ | 0.300 | 1.51633 | 64.14 |
| 13 | ∞ | 0.131 | | |
| Image Plane | ∞ | | | |

Aspherical Data

Surface 1

K = 7.3178e+000, A4 = −4.7409e−003, A6 = 1.5385e−002, A8 = −9.9628e−004, A10 = −3.0797e−003, A12 = 7.1083e−00
Surface 2

K = 1.2085e+001, A4 = −2.1050e−003, A6 = 1.5638e−002, A8 = 1.4539e−002, A10 = −2.3186e−002, A12 = 1.3516e−002
Surface 4

K = −1.0926e+000, A4 = −1.5399e−002, A6 = −3.1999e−002, A8 = −1.7794e−002, A10 = 2.2390e−002, A12 = −4.5109e−002
Surface 5

K = −4.9954e+000, A4 = −1.3397e−002, A6 = −1.4172e−002, A8 = −2.0569e−002, A10 = −6.6126e−004, A12 = −1.2919e−002
Surface 6

K = −2.0522e+001, A4 = −6.1444e−002, A6 = 6.5893e−002, A8 = −8.9407e−003, A10 = −9.9288e−003, A12 = −7.4072e−004
Surface 7

K = −5.2519e+000, A4 = 9.3015e−003, A6 = 1.0637e−002, A8 = 2.0832e−002, A10 = −8.3505e−003, A12 = −3.2633e−003
Surface 8

K = 2.6215e+001, A4 = 2.4587e−002, A6 = −3.0346e−002, A8 = 1.3113e−002, A10 = −4.4120e−002, A12 = −1.1373e−005
Surface 9

K = −5.1644e−001, A4 = −9.4879e−003, A6 = 2.1548e−002, A8 = −1.6987e−002, A10 = 5.7880e−003, A12 = −1.0267e−003

-continued

Unit: mm

Surface 10

K = −8.0921e+000, A4 = −1.5143e−001, A6 = 3.2615e−002, A8 = −4.3949e−003, A10 = 5.6881e−004, A12 = −1.5814e−004
Surface 11

K = −3.6457e+000, A4 = −8.8326e−002, A6 = 2.6203e−002, A8 = −5.5321e−003, A10 = 6.5007e−004, A12 = −3.3967e−005

Other Data

| Focal Length | 3.832 |
|---|---|
| F-NUMBER | 2.801 |
| Angle of View | 37.668 |
| Image Height | 2.980 |
| Overall Lens Length | 5.536 |
| BF | 1.117 |

Lens Data

| Lens | Front Surface | Back Surface | Focal Length |
|---|---|---|---|
| 1 | 1 | 2 | −784.193 |
| 2 | 4 | 5 | 2.820 |
| 3 | 6 | 7 | −4.438 |
| 4 | 8 | 9 | 5.024 |
| 5 | 10 | 11 | −5.266 |

Lens Group Data

| Group | Front Surface | Back Surface |
|---|---|---|
| 1 | 1 | 7 |
| 2 | 8 | 9 |
| 3 | 10 | 11 |

When the optical system is extended, the fourth lens L4 is moved toward the object side, and the extension amount from the infinite object distance to the object distance of 10 cm is 0.168 mm.

The spherical aberration (sine condition), astigmatism, and destortion 1N of Example 14 in the above lens arrangement and the configuration are shown in FIG. 33.

Example 15

Figure 18:
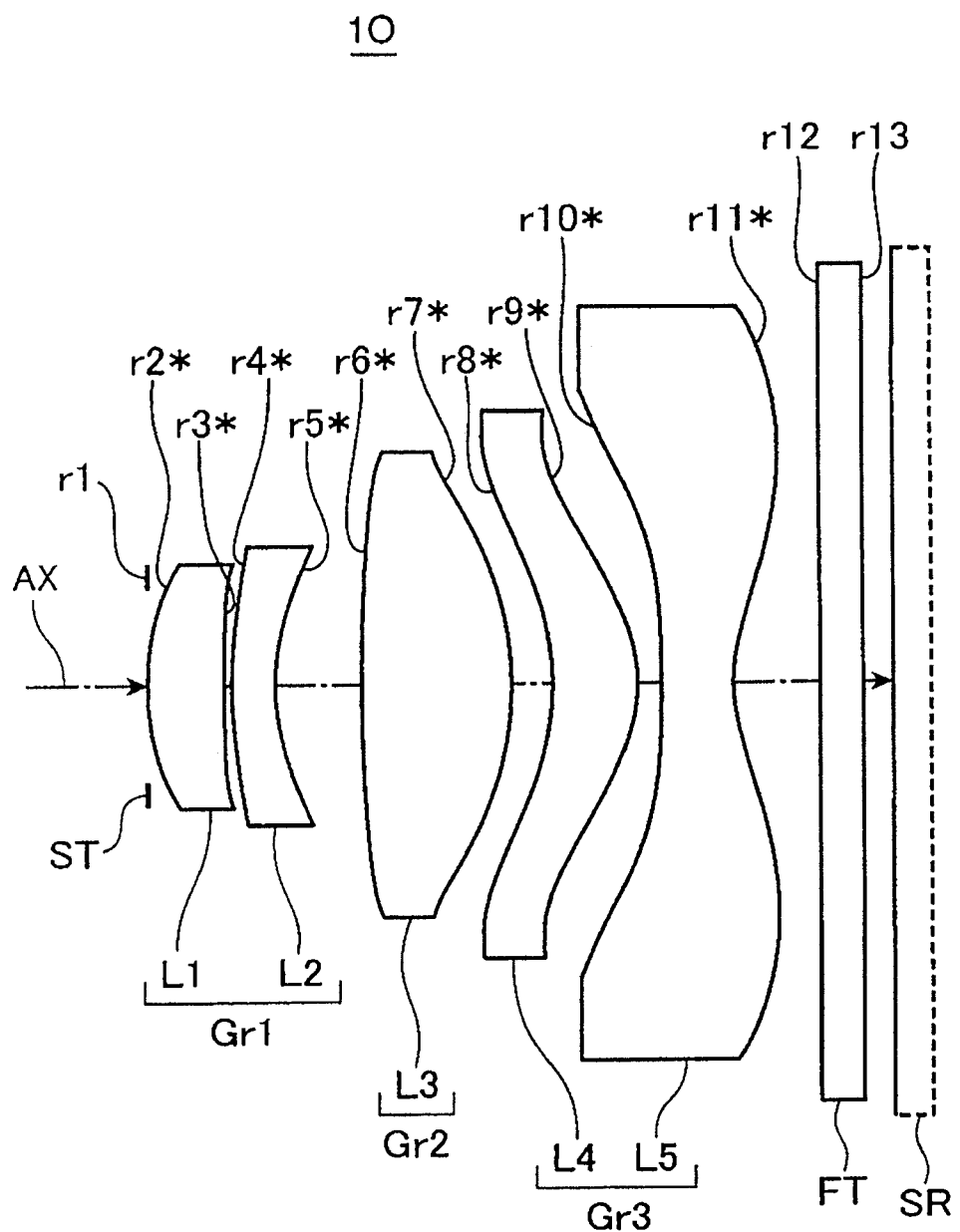
FIG. 18 is a cross-sectional view showing an arrangement of lens groups of a single-focus optical system of Example 15.
Figure 34:
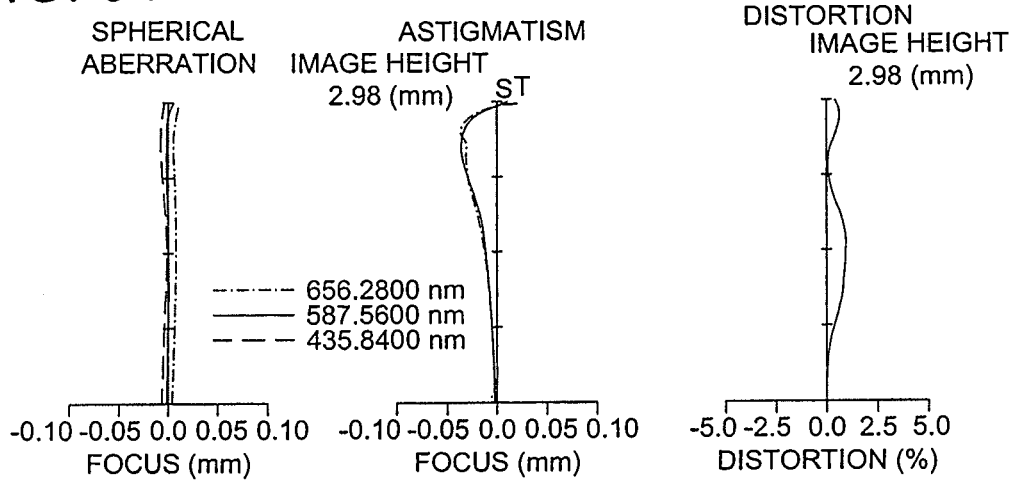
FIG. 34 is an aberration diagram of the single-focus optical system of the embodiment 15.

FIG. 18 is a cross-sectional view showing an arrangement of lens groups in a single-focus optical system of Example 15. FIG. 34 shows aberration diagrams of the single-focus optical system of Example 15.

In the single-focus optical system 1O of Example 15, each of the lens groups (Gr1, Gr2, and Gr3) is arranged in order from the object side to the image side as shown in FIG. 18, and when focusing (focus adjustment) is performed, the first lens group (Gr1) is fixed with respect to a predetermined imaging surface; the second lens group (Gr2) is moved in the optical axis AX direction and the third lens group (Gr3) is fixed with respect to the predetermined imaging surface.

In more details, in the single-focus optical system 1O of Example 15, the lens groups (Gr1, Gr2, and Gr3) are constituted in order from the object side to the image side as described below.

The first lens group (Gr1) is constituted of a positive meniscus lens (a first lens L1) convex toward the object side and a negative meniscus lens (a second lens L2) convex toward the objet side. An aperture stop ST is arranged on the object side of the first lens L of the first lens group Gr1.

The second lens group (Gr2) is constituted of a biconvex positive lens (a third lens L3).

The third lens group (Gr3) is constituted of a positive meniscus lens (a fourth lens L4) convex toward the image side and a biconcave negative lens (a fifth lens L5). And, the fifth lens L5 has at least one aspherical surface which has a positive optical power in the periphery. Alternatively, the fifth lens L5 is a lens having an aspherical shape which has an inflection point at a position other than the position which is the intersection of the aspherical shape and the optical axis.

Each of the lenses L1-L5 of the first lens groups Gr1 to the third lens group Gr3 is made of resin and has aspherical surfaces on the opposite sides.

In addition, on the image side of the third lens group Gr3, the light receiving surface of the imaging element SR is arranged with a parallel flat plate FT serving as a filter therebetween. The parallel flat plate FT may be various types of optical filter of a cover glass of the imaging element SR In such a configuration, light beam having entered from the object side passes, along the optical axis AX, through the aperture stop ST, the first lens group (Gr1), the second lens group (Gr2), the third lens group (Gr3, and the parallel flat plate FT in this order to form an optical image of an object on the light receiving surface of the imaging element SR. Then, in the imaging element SR, the optical image is converted into an electrical signal. This electrical signal is subjected to a predetermined digital processing, if necessary, to be stored in a memory of a digital apparatus such as a digital camera as a digital image signal or to be transmitted to another digital apparatus by cable or wireless communication through an interface.

Construction data of the lenses of the single-focus optical system 1O of Example 15 are listed below.

Numerical Example 15

Unit: mm

Surface Data

| Surface Number | r | d | nd | vd |
|---|---|---|---|---|
| Object Plane | ∞ | ∞ | | |
| 1(Aperture Stop) | ∞ | 0.000 | | |
| 2* | 1.864 | 0.540 | 1.54470 | 56.15 |
| 3* | 83.306 | 0.050 | | |
| 4* | 2.997 | 0.300 | 1.63200 | 23.41 |
| 5* | 1.481 | 0.604 | | |
| 6* | 12.220 | 1.043 | 1.54470 | 56.15 |
| 7* | −2.232 | 0.286 | | |
| 8* | −1.841 | 0.600 | 1.58300 | 29.90 |
| 9* | −0.988 | 0.167 | | |
| 10* | −12.155 | 0.500 | 1.58300 | 29.90 |
| 11* | 1.087 | 0.600 | | |
| 12 | ∞ | 0.300 | 1.51633 | 64.14 |
| 13 | ∞ | 0.209 | | |
| Image Plane | ∞ | | | |

Aspherical Data

Surface 2

K = 4.7074e−001, A4 = 1.3827e−002, A6 = 2.7706e−002,
A8 = 8.7401e−003, A10 = 4.1316e−003, A12 = 9.1486e−003,
A14 = −1.3236e−002

Surface 3

K = 3.0000e+001, A4 = 5.4904e−002, A6 = 4.1399e−002,
A8 = 3.1375e−002, A10 = 1.1703e−001, A12 = −2.1565e−001,
A14 = 1.3145e−001

-continued

Unit: mm

Surface 4

K = −3.1078e+000, A4 = −8.6803e−002, A6 = 5.0654e−002,
A8 = 4.3380e−003, A10 = 1.3106e−002, A12 = −3.0471e−002,
A14 = 9.3149e−003

Surface 5

K = −3.3921e+000, A4 = −8.6012e−003, A6 = 2.1701e−002,
A8 = −2.2325e−002, A10 = 3.9548e−002, A12 = −3.5315e−002,
A14 = 1.3109e−002

Surface 6

K = 3.0000e+001, A4 = −8.8040e−004, A6 = −1.0750e−002,
A8 = 1.0262e−002, A10 = −3.5264e−003, A12 = 5.5161e−004,
A14 = 8.1402e−006

Surface 7

K = −2.4882e−001, A4 = 5.8941e−003, A6 = −9.1961e−003,
A8 = 3.1482e−003, A10 = 1.9460e−003, A12 = −1.0809e−003,
A14 = 2.3742e−004

Surface 8

K = −9.3573e−002, A4 = 8.4262e−003, A6 = 2.4177e−002,
A8 = 3.2111e−003, A10 = −2.3055e−003, A12 = −3.4532e−005,
A14 = 1.0951e−004

Surface 9

K = −3.8208e+000, A4 = −8.3132e−002, A6 = 5.2797e−002,
A8 = −9.4049e−003, A10 = 1.2828e−003, A12 = −3.3834e−004,
A14 = 4.2950e−005

Surface 10

K = 1.6256e+001, A4 = −7.6116e−002, A6 = 1.4095e−002,
A8 = 1.0847e−003, A10 = −8.1630e−004, A12 = 2.3551e−004,
A14 = −2.8127e−005

Surface 11

K = −6.5072e+000, A4 = −5.4925e−002, A6 = 1.6671e−002,
A8 = −4.2152e−003, A10 = 6.3281e−004, A12 = −4.4359e−005,
A14 = 8.6658e−007

Other Data

| Focal Length | 3.834 |
|---|---|
| F-NUMBER | 2.803 |
| Angle of View | 37.751 |
| Image Height | 2.980 |
| Overall Lens Length | 5.097 |
| BF | 1.005 |

Lens Data

| Lens | Front Surface | Back Surface | Focal Length |
|---|---|---|---|
| 1 | 2 | 3 | 3.492 |
| 2 | 4 | 5 | −5.016 |
| 3 | 6 | 7 | 3.555 |
| 4 | 8 | 9 | 2.903 |
| 5 | 10 | 11 | −1.688 |

Lens Group Data

| Group | Front Surface | Back Surface |
|---|---|---|
| 1 | 2 | 5 |
| 2 | 6 | 7 |
| 3 | 8 | 11 |

The extension amount is 0.168 mm.

The spherical aberration (sine condition), astigmatism, and destortion 1O of Example 15 in the above lens arrangement and the configuration are shown in FIG. 34.

Example 16

Figure 19:
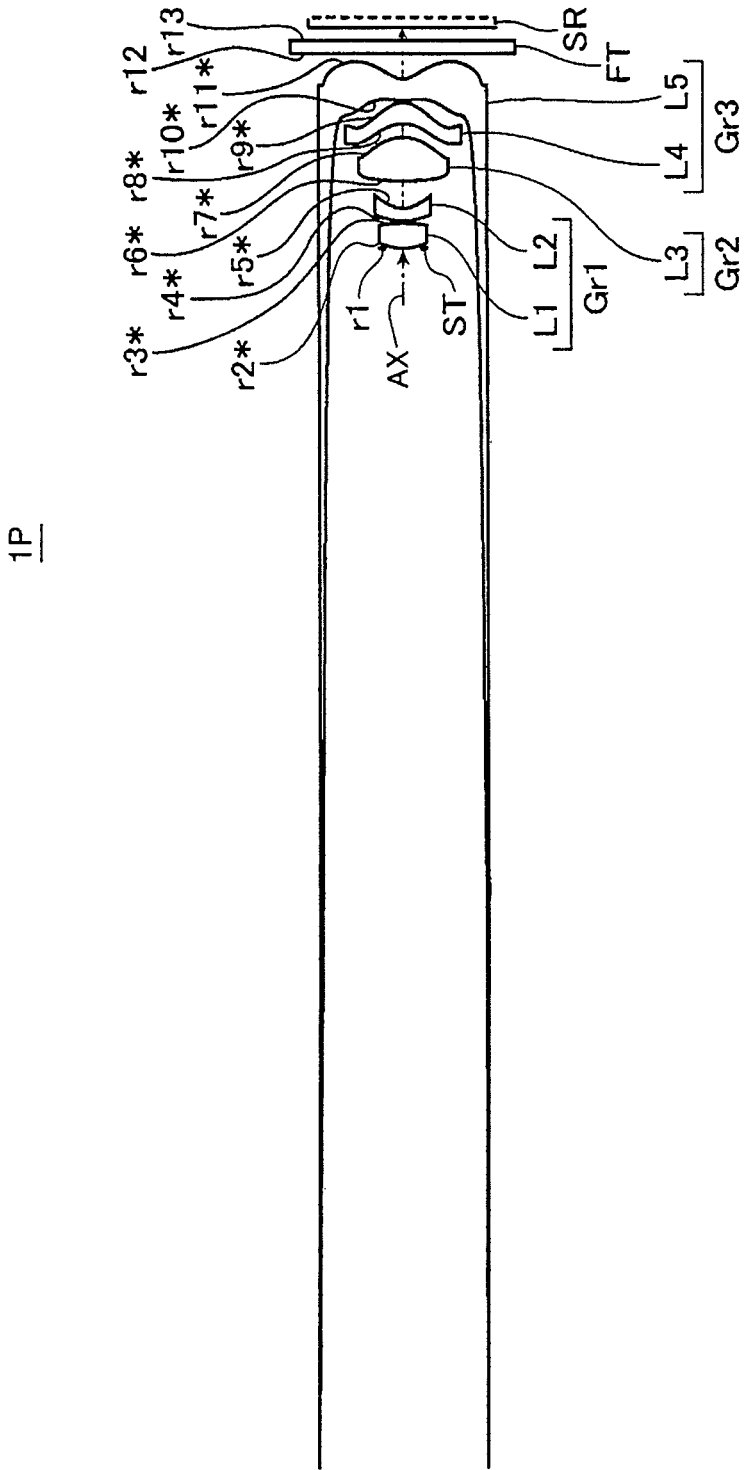
FIG. 19 is a cross-sectional view showing an arrangement of lens groups of a single-focus optical system of Example 16.
Figure 35:
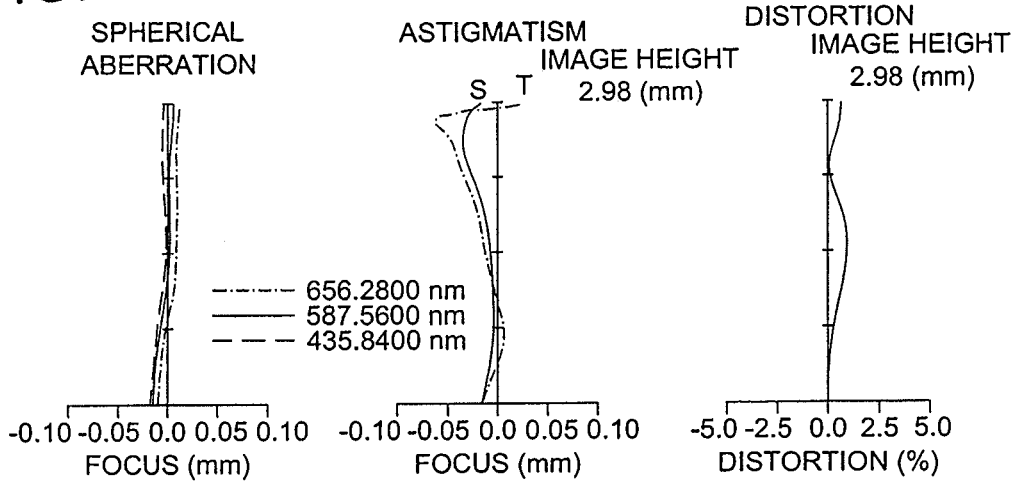
FIG. 35 is an aberration diagram of the single-focus optical system of the embodiment 16.

FIG. 19 is a cross-sectional view showing an arrangement of lens groups in a single-focus optical system of Example 16. FIG. 35 shows aberration diagrams of the single-focus optical system of Example 16

Figure 20:
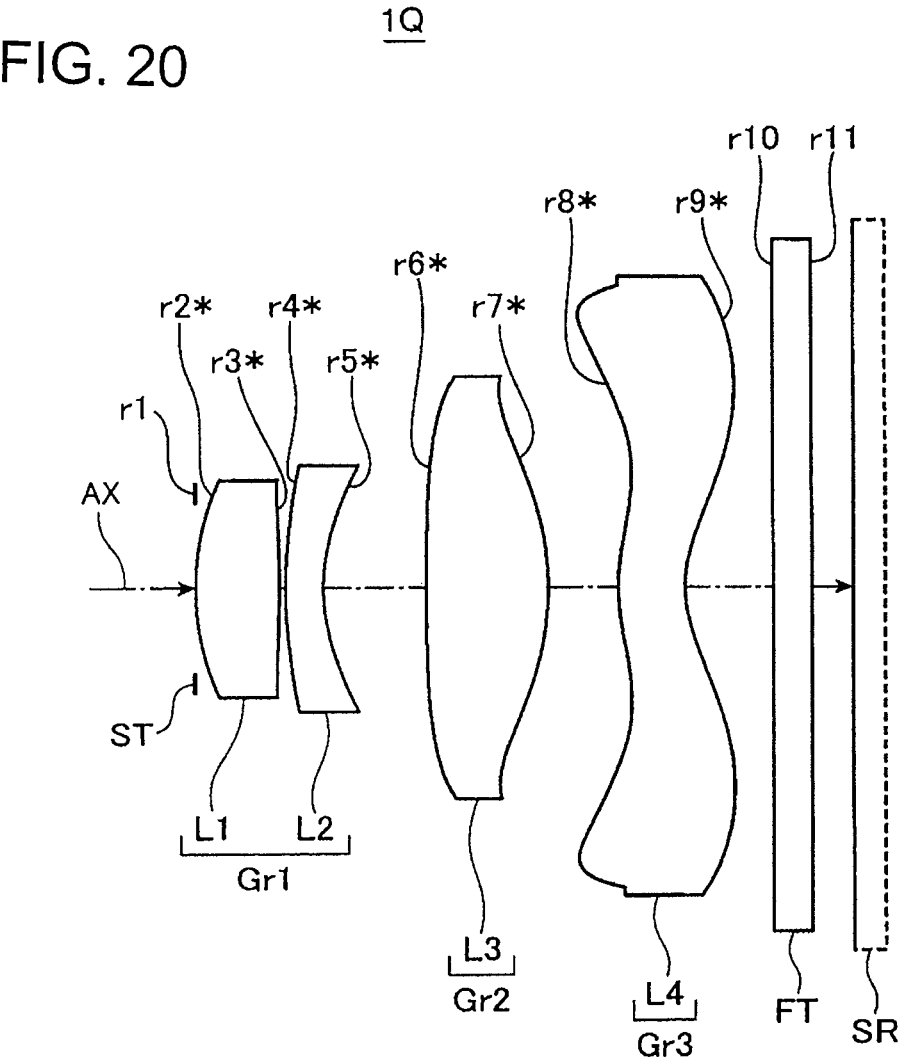
FIG. 20 is a cross-sectional view showing an arrangement of lens groups of a single-focus optical system of Example 17.

In the single-focus optical system 1P of Example 16, each of the lens groups (Gr1, Gr2, and Gr3) is arranged in order from the object side to the image side as shown in FIG. 20, and when focusing (focus adjustment) is performed, the first lens group (Gr1) is fixed with respect to a predetermined imaging surface; the second lens group (Gr2) is moved in the optical axis AX direction; and the third lens group (Gr3) is fixed with respect to the predetermined imaging surface.

In more details, in the single-focus optical system 1P of Example 16, the lens groups (Gr1, Gr2, and Gr3) are constituted in order from the object side to the image side as described below.

The first lens group (Gr1) is constituted of a biconvex positive lens (a first lens L1) and a negative meniscus lens (a second lens L2) convex toward the objet side. An aperture stop ST is arranged on the object side of the first lens L1 of the first lens group Gr1.

The second lens group (Gr2) is constituted of a biconvex positive lens (a third lens L3).

The third lens group (Gr3) is constituted of a positive meniscus lens (a fourth lens L4) convex toward the image side and a negative meniscus lens (a fifth lens L5) convex toward the object side. And, the fifth lens L5 has at least one aspherical surface which has a positive optical power in the periphery. Alternatively, the fifth lens L5 is a lens having an aspherical shape which has an inflection point at a position other than the position which is the intersection of the aspherical shape and the optical axis.

Each of the lenses L1, L2, L4, L5 of the first lens groups Gr1 and the third lens group Gr3 is made of resin and has aspherical surfaces on the opposite sides. The third lens L3 of the second lens group Gr2 is made of glass and has aspherical surfaces on the opposite sides.

In addition, on the image side of the third lens group Gr3, the light receiving surface of the imaging element SR is arranged with a parallel flat plate FT serving as a filter therebetween. The parallel flat plate FT may be various types of optical filter of a cover glass of the imaging element SR In such a configuration, light beam having entered from the object side passes, along the optical axis AX, through the aperture stop ST, the first lens group (Gr1), the second lens group (Gr2), the third lens group (Gr3), and the parallel flat plate FT in this order to form an optical image of an object on the light receiving surface of the imaging element SR. Then, in the imaging element SR, the optical image is converted into an electrical signal. This electrical signal is subjected to a predetermined digital processing, if necessary, to be stored in a memory of a digital apparatus such as a digital camera as a digital image signal or to be transmitted to another digital apparatus by cable or wireless communication through an interface.

Construction data of the lenses of the single-focus optical system 1P of Example 16 are listed below.

Numerical Example 16

Unit: mm

Surface Data

| Surface Number | r | d | nd | vd |
|---|---|---|---|---|
| Object Plane | ∞ | ∞ | | |
| 1(Aperture Stop) | ∞ | 0.000 | | |
| 2* | 2.564 | 0.602 | 1.54470 | 56.15 |
| 3* | −5.743 | 0.050 | | |
| 4* | 2.629 | 0.300 | 1.63200 | 23.41 |
| 5* | 1.361 | 0.646 | | |
| 6* | 13.428 | 1.022 | 1.48749 | 70.24 |
| 7* | −2.149 | 0.321 | | |
| 8* | −1.822 | 0.500 | 1.54470 | 56.15 |
| 9* | −0.970 | 0.050 | | |
| 10* | 4.628 | 0.500 | 1.54470 | 56.15 |
| 11* | 0.782 | 0.600 | | |
| 12 | ∞ | 0.300 | 1.51633 | 64.14 |
| 13 | ∞ | 0.308 | | |
| Image Plane | ∞ | | | |

Aspherical Data

Surface 2

K = −9.6080e−001, A4 = −9.5983e−003, A6 = 3.0883e−002,
A8 = −7.2346e−002, A10 = 2.1025e−002, A12 = 9.7897e−002,
A14 = −9.4586e−002

Surface 3

K = 2.8353e+001, A4 = 6.7644e−002, A6 = −4.5061e−002,
A8 = 3.5817e−002, A10 = 1.0007e−001, A12 = −2.2152e−001,
A14 = 1.3391e−001

Surface 4

K = −1.1480e+000, A4 = −7.1235e−002, A6 = 4.9735e−002,
A8 = −2.8340e−003, A10 = 4.1054e−003, A12 = −1.8562e−002,
A14 = 9.5533e−003

Surface 5

K = −3.6224e+000, A4 = 2.5104e−003, A6 = 3.5539e−002,
A8 = −2.8851e−002, A10 = 3.3679e−002, A12 = −2.5969e−002,
A14 = 7.9555e−003

Surface 6

K = 1.3124e+001, A4 = 3.5815e−003, A6 = −1.1575e−002,
A8 = 1.0775e−002, A10 = −3.2982e−003, A12 = 5.0090e−004,
A14 = 5.2062e−005

Surface 7

K = −8.9080e−002, A4 = −1.0322e−003, A6 = 3.5342e−003,
A8 = 2.1631e−003, A10 = 1.1860e−003, A12 = −1.1543e−003,
A14 = 3.6606e−004

Surface 8

K = −7.4417e−002, A4 = 1.0774e−002, A6 = 2.4251e−002,
A8 = 3.6871e−003, A10 = −2.3051e−003, A12 = −3.3478e−005,
A14 = 1.1078e−004

Surface 9

K = −5.2109e+000, A4 = −9.3123e−002, A6 = 5.2849e−002,
A8 = −8.8602e−003, A10 = 1.5215e−003, A12 = −3.2500e−004,
A14 = 2.3073e−005

Surface 10

K = −2.6162e+001, A4 = −1.2474e−001, A6 = 2.4088e−002,
A8 = 1.5485e−003, A10 = −1.0023e−003, A12 = 1.9940e−004,
A14 = −2.0374e−005

Surface 11

K = −4.8524e+000, A4 = −6.2489e−002, A6 = 1.8591e−002,
A8 = −4.4430e−003, A10 = 6.3562e−004, A12 = −4.2279e−005,
A14 = 7.4025e−007

Other Data

| Focal Length | 3.833 |
|---|---|
| F-NUMBER | 2.801 |

-continued

| Unit: mm | |
|---|---|
| Angle of View | 37.616 |
| Image Height | 2.980 |
| Overall Lens Length | 5.082 |
| BF | 1.091 |

Lens Data

| Lens | Front Surface | Back Surface | Focal Length |
|---|---|---|---|
| 1 | 2 | 3 | 3.339 |
| 2 | 4 | 5 | −4.915 |
| 3 | 6 | 7 | 3.883 |
| 4 | 8 | 9 | 3.152 |
| 5 | 10 | 11 | −1.810 |

Lens Group Data

| Group | Front Surface | Back Surface |
|---|---|---|
| 1 | 2 | 5 |
| 2 | 6 | 7 |
| 3 | 8 | 11 |

The extension amount is 0.125 mm.

The spherical aberration (sine condition), astigmatism, and destortion 1P of Example 16 in the above lens arrangement and the configuration are shown in FIG. 35.

Example 17

Figure 36:
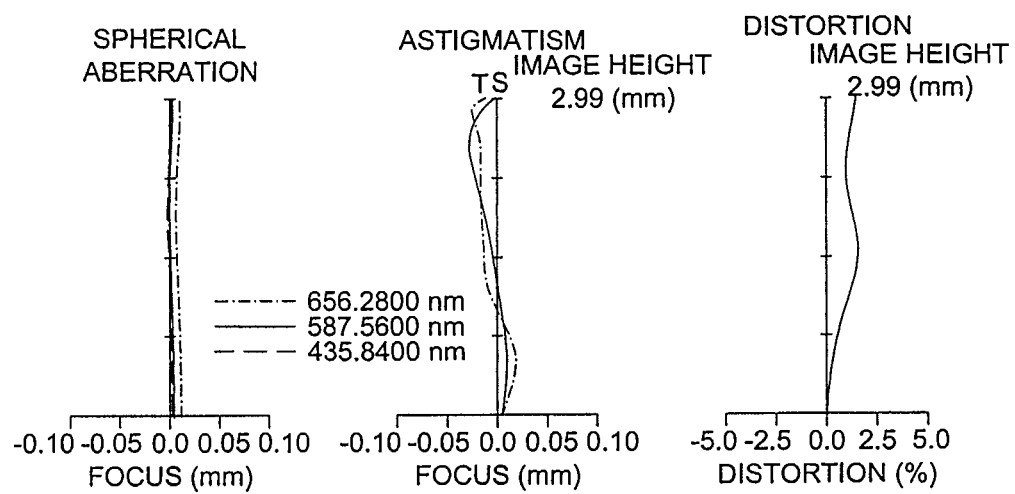
FIG. 36 is an aberration diagram of the single-focus optical system of the embodiment 17.

FIG. 20 is a cross-sectional view showing an arrangement of lens groups in a single-focus optical system of Example 17. FIG. 36 shows aberration diagrams of the single-focus optical system of Example 16

In the single-focus optical system 1Q of Example 17, each of the lens groups (Gr1, Gr2, and Gr3) is arranged in order from the object side to the image side as shown in FIG. 19, and when focusing (focus adjustment) is performed, the first lens group (Gr1) is fixed with respect to a predetermined imaging surface; the second lens group (Gr2) is moved in the optical axis AX direction; and the third lens group (Gr3) is fixed with respect to the predetermined imaging surface.

In more details, in the single-focus optical system 1Q of Example 17, the lens groups (Gr1, Gr2, and Gr3) are constituted in order from the object side to the image side as described below.

The first lens group (Gr1) is constituted of a biconvex positive lens (a first lens L1) and a negative meniscus lens (a second lens L2) convex toward the objet side. An aperture stop ST is arranged on the object side of the first lens L1 of the first lens group Gr1.

The second lens group (Gr2) is constituted of a biconvex positive lens (a third lens L3).

The third lens group (Gr3) is constituted of a negative meniscus lens (a fourth lens L4) convex toward the object side. And, the fourth lens L4 has at least one aspherical surface which has a positive optical power in the periphery. Alternatively, the fourth lens L4 is a lens having an aspherical shape which has an inflection point at a position other than the position which is the intersection of the aspherical shape and the optical axis.

Each of the lenses L1-L5 of the first lens groups Gr1 to the third lens group Gr3 is made of resin and has aspherical surfaces on the opposite sides.

In addition, on the image side of the third lens group Gr3, the light receiving surface of the imaging element SR is arranged with a parallel flat plate FT serving as a filter therebetween. The parallel flat plate FT may be various types of optical filter of a cover glass of the imaging element SR In such a configuration, light beam having entered from the object side passes, along the optical axis AX, through the aperture stop ST, the first lens group (Gr1), the second lens group (Gr2), the third lens group (Gr3), and the parallel flat plate FT in this order to form an optical image of an object on the light receiving surface of the imaging element SR. Then, in the imaging element SR, the optical image is converted into an electrical signal. This electrical signal is subjected to a predetermined digital processing, if necessary, to be stored in a memory of a digital apparatus such as a digital camera as a digital image signal or to be transmitted to another digital apparatus by cable or wireless communication through an interface.

Construction data of the lenses of the single-focus optical system 1Q of Example 17 are listed below.

Numerical Example 17

| Unit: mm | | | | |
|---|---|---|---|---|
| Surface Data | | | | |
| Surface Number | r | d | nd | vd |
| Object Plane | ∞ | ∞ | | |
| 1(Aperture Stop) | ∞ | 0.004 | | |
| 2* | 2.166 | 0.667 | 1.54470 | 56.15 |
| 3* | −9.662 | 0.050 | | |
| 4* | 3.369 | 0.300 | 1.63200 | 23.41 |
| 5* | 1.504 | 0.813 | | |
| 6* | 88.347 | 0.956 | 1.54470 | 56.15 |
| 7* | −2.435 | 0.559 | | |
| 8* | 1.709 | 0.528 | 1.54470 | 56.15 |
| 9* | 0.997 | 0.700 | | |
| 10 | ∞ | 0.300 | 1.51633 | 64.14 |
| 11 | ∞ | 0.324 | | |
| Image Plane | ∞ | | | |

Aspherical Data

Surface 2

K = 3.0304e−001, A4 = 1.0051e−003, A6 = −8.8779e−004,
A8 = −2.3670e−003, A10 = 5.6888e−003
Surface 3

K = 2.8128e+001, A4 = 3.9928e−002, A6 = −4.0265e−002,
A8 = 1.0559e−001, A10 = −5.8458e−002
Surface 4

K = −1.9261e+001, A4 = −3.3015e−002, A6 = −2.3680e−002,
A8 = 8.6145e−002, A10 = −4.1031e−003, A12 = −3.3236e−002
Surface 5

K = −3.6779e+000, A4 = −1.3736e−002, A6 = 2.6633e−002,
A8 = −2.5386e−002, A10 = 5.1478e−002, A12 = −2.7594e−002
Surface 6

K = 2.3252e+001, A4 = 2.8991e−002, A6 = −1.6340e−002,
A8 = 1.2472e−002, A10 = −4.3172e−003, A12 = 5.9190e−004
Surface 7

K = −8.2051e+000, A4 = −8.0791e−002, A6 = 6.4742e−002,
A8 = −3.6155e−002, A10 = 1.5863e−002, A12 = −3.2747e−003,
A14 = 7.7253e−005, A16 = 4.4690e−005
Surface 8

K = −7.3049e+000, A4 = −1.3561e−001, A6 = 2.9873e−002,
A8 = −2.5393e−003, A10 = 5.2932e−004, A12 = −1.9210e−004,
A14 = 2.0635e−005
Surface 9

K = −3.4495e+000, A4 = −8.8150e−002, A6 = 2.9371e−002,
A8 = −7.4753e−003, A10 = 1.2352e−003, A12 = −1.1410e−004,
A14 = 4.3445e−006

-continued

Unit: mm

Other Data

| | |
|---|---|
| Focal Length | 4.041 |
| F-NUMBER | 2.881 |
| Angle of View | 36.124 |
| Image Height | 2.990 |
| Overall Lens Length | 5.103 |
| BF | 1.226 |

Lens Data

| Lens | Front Surface | Back Surface | Focal Length |
|---|---|---|---|
| 1 | 2 | 3 | 3.314 |
| 2 | 4 | 5 | −4.587 |
| 3 | 6 | 7 | 4.367 |
| 4 | 8 | 9 | −5.943 |

-continued

Unit: mm

Lens Group Data

| Group | Front Surface | Back Surface |
|---|---|---|
| 1 | 2 | 5 |
| 2 | 6 | 7 |
| 3 | 8 | 9 |

The extension amount is 0.149 mm.

The spherical aberration (sine condition), astigmatism, and destortion 1Q of Example 17 in the above lens arrangement and the configuration are shown in FIG. 36.

Numerical values obtained by applying the conditional expressions (1)-(14) to the above listed single-focus optical systems 1A-1Q of Examples 1-17 are shown in Table 1 and Table 2. With regard to the conditional expression (14), values the cases of 1.4 μm and 1.1 μm are each shown.

TABLE 1

| | | | Example 1 | Example 2 | Example 3 | Example 4 | Example 5 | Example 6 | Example 7 | Example 8 | Example 9 |
|---|---|---|---|---|---|---|---|---|---|---|---|
| | Conditional expression (1) | Δν1 | 32.7 | 32.7 | 32.7 | 32.7 | 32.7 | 32.7 | 32.7 | 32.7 | 32.7 |
| | Conditional expression (2) | f1/f | 0.61 | 0.83 | 0.72 | 0.82 | 0.76 | 1.02 | 0.82 | 0.76 | 0.97 |
| | Conditional expression (3) | fs/f | 0.886 | 1.089 | 1.070 | 1.163 | 1.139 | 0.768 | 1.269 | 1.101 | 0.755 |
| | Conditional expression (4) | bf/TL | 0.189 | 0.216 | 0.159 | 0.193 | 0.228 | 0.166 | 0.238 | 0.254 | 0169 |
| | Conditional expression (5) | D1/Y' | 0.290 | 0.290 | 0.357 | 0.286 | 0.298 | 0.329 | 0.286 | 0.319 | 0.324 |
| | Conditional expression (6) | T12/TL | 0.0084 | 0.0222 | 0.0161 | 0.0105 | 0.0154 | 0.0183 | 0.0078 | 0.0098 | 0.0179 |
| | Conditional expression (7) | T23/TL | 0.170 | 0.108 | 0.105 | 0.136 | 0.152 | 0.103 | 0.156 | 0.172 | 0.091 |
| | Conditional expression (8) | T34/TL | 0.064 | 0.083 | 0.063 | 0.098 | 0.061 | 0.070 | 0.055 | 0.085 | 0.047 |
| | Conditional expression (9) | T2/f2 | −0.054 | −0.063 | −0.057 | −0.066 | −0.089 | −0.052 | −0.059 | −0.069 | −0.053 |
| | Conditional expression (10) | Y'/TL | 0.541 | 0.616 | 0.574 | 0.620 | 0.557 | 0.585 | 0.568 | 0.584 | 0.573 |
| | Conditional expression (11) | w | 31.8 | 37.8 | 34.3 | 37.5 | 37.6 | 37.7 | 37.9 | 37.5 | 37.6 |
| 1.4 μm | Conditional expression (14) | PX/h3 | 2.92 | 3.99 | 3.85 | 4.14 | 3.11 | 4.21 | 3.04 | 4.48 | 3.93 |
| 1.1 μm | Conditional expression (14) | PX/h3 | 2.29 | 3.14 | 3.02 | 3.26 | 2.44 | 3.30 | 2.38 | 3.52 | 3.09 |
| | Conditional expression (12) | Fn | 2.80 | 2.80 | 2.81 | 2.88 | 2.80 | 2.81 | 2.80 | 2.80 | 2.80 |
| | Conditional expression (13) | Tgs/TL | 0.459 | 0.426 | 0.439 | 0.425 | 0.399 | 0.403 | 0.416 | 0.333 | 0.408 |

TABLE 2

| | | | Example 10 | Example 11 | Example 12 | Example 13 | Example 14 | Example 15 | Example 16 | Example 17 |
|---|---|---|---|---|---|---|---|---|---|---|
| | Conditional expression (1) | Δν1 | 32.7 | 32.7 | 58.2 | 37.8 | 32.7 | 32.7 | 32.7 | 32.7 |
| | Conditional expression (2) | f1/f | 1.15 | 0.88 | 0.81 | 0.77 | −204.66 | 0.91 | 0.87 | 1.85 |
| | Conditional expression (3) | fs/f | 0.718 | 0.983 | 0.878 | −1.858 | 1.311 | 0.927 | 1.013 | 1.081 |
| | Conditional expression (4) | bf/TL | 0.178 | 0.216 | 0.200 | 0.274 | 0.202 | 0.197 | 0.215 | 0.240 |
| | Conditional expression (5) | D1/Y' | 0.321 | 0.273 | 0.305 | 0.297 | 0.332 | 0.284 | 0.287 | 0.295 |
| | Conditional expression (6) | T12/TL | 0.0174 | 0.0098 | 0.1224 | 0.0173 | 0.0126 | 0.0098 | 0.0098 | 0.0098 |
| | Conditional expression (7) | T23/TL | 0.113 | 0.118 | 0.099 | 0.106 | 0.005 | 0.119 | 0.127 | 0.159 |

TABLE 2-continued

| | | | Example 10 | Example 11 | Example 12 | Example 13 | Example 14 | Example 15 | Example 16 | Example 17 |
|---|---|---|---|---|---|---|---|---|---|---|
| | Conditional expression (8) | T34/TL | 0.041 | 0.039 | 0.077 | 0.054 | 0.176 | 0.056 | 0.063 | 0.110 |
| | Conditional expression (9) | T2/f2 | −0.046 | −0.070 | −0.043 | −0.027 | 0.248 | −0.060 | −0.061 | −0.065 |
| | Conditional expression (10) | Y'/TL | 0.557 | 0.585 | 0.573 | 0.585 | 0.538 | 0.585 | 0.586 | 0.586 |
| | Conditional expression (11) | w | 37.5 | 37.7 | 36.5 | 37.7 | 37.7 | 37.7 | 37.6 | 36.0 |
| 1.4 μm | Conditional expression (14) | PX/h3 | 5.16 | 3.77 | 5.32 | 3.06 | 4.87 | 3.81 | 3.93 | 4.57 |
| 1.1 μm | Conditional expression (14) | PX/h3 | 4.06 | 2.96 | 4.18 | 2.40 | 3.83 | 3.00 | 3.09 | 3.59 |
| | Conditional expression (12) | Fn | 2.81 | 2.80 | 2.80 | 2.88 | 2.80 | 2.80 | 2.80 | 2.88 |
| | Conditional expression (13) | Tgs/TL | 0.299 | 0.445 | 0.287 | 0.592 | 0.287 | 0.446 | 0.421 | 0.344 |

As described above, since the single-focus optical systems 1A-1Q of Examples 1-17 satisfy the requirements according to the present invention, they are downsizing and have higher performances than the conventional optical system. In addition, without any other specification of productivity being adversely affected, measures to deal with adhering dust, which is recently problematic in the mass production, are solved. And, when any of the single-focus optical systems 1A-1Q in Examples 1-17 is mounted in an image pickup device 21 and the digital apparatus 3, especially in a mobile terminal 5, size reduction can be sufficiently realized, and further an high resolution imaging element 16 can be employed.

For example, in an high resolution imaging element 16 of a class (grade) of 8M pixels, 12M pixels, or 20M pixels, when the size of such an imaging element 16 is constant, the pixel pitch becomes smaller (pixel area becomes smaller). Therefore, a single-focus optical system 1 is needed to have a resolution in conformity with this pixel pitch. When the single-focus optical system 1 is evaluated by MTF, for example, on the basis of such a resolution, aberrations need to be controlled in certain ranges, for example, based on the specifications. In the single-focus optical systems 1A-1Q of above Examples 1-17, as shown in each aberration figure, the aberrations are controlled in predetermined ranges.

Further, recently, as a method to mount image pickup devices at low cost and in large numbers, a technique has been proposed, in which a circuit board to which solder is previously applied and on which electronic components such as an IC chip and optical elements are placed is subjected to reflow process (heating process) so that the solder is melted, and the electronic components and the optical elements are simultaneously mounted on the.

To perform mounting using such a reflow process, optical elements need to be heated at about 200-260° C. together with electronic components. However, at such a high temperature, a lens employing a thermoplastic resin is thermally deformed or discolored, whereby its optical performance is decreased. To address this issue, when mounting is performed by using reflow process, a glass mold lens featuring excellent heat resistance may be used to realize both size reduction and optical performance under high temperature environments. However, the cost of such a glass mold lens is higher than that of a lens employing a thermoplastic resin. Therefore, as a lens material, an energy curable resin may be employed. Compared with a lens employing a thermoplastic resin such as a polycarbonate-based or polyolefin-based resin, the optical performances of such an energy curable resin do not deteriorate much even when exposed to high temperature, whereby the energy cure resin is effective for a reflow process and easier production and lower cost than in the glass mold lens are realized, and cost reduction and mass productivity of an image pickup device incorporating an optical system are both obtained. Here, the energy curable resin is considered to be heat curable resin and UV curable resin. The lens in the single-focus optical system 1 according to the present embodiment may be a lens formed of such an energy curable resin. As one example of the heat curable resin, there is cited a resin in which 1% by mass of PERBUTYLO (produced by NOF Corp.) is added as a polymerization initiator to NK ESTER DCP (tricyclodecane dimethanol dimethacrylate) (produced by Shin-Nakamura Chemical Co, Ltd.) to be cured at 150° C. for 10 min.

Further, in the present examples, the incident angle of a principal ray of light beam entering the imaging surface of a solid-state imaging element is not always designed to be sufficiently small in the imaging surface periphery, depending on the specifications required for a single-focus optical system 1. However, with recent techniques, the arrangement of a color filter for a solid-state imaging element or an on-chip micro-lens array has been further improved, whereby shading has been reduced. In particular, since the pitch of the arrangement of a color filter and an on-chip micro-lens array is designed to be slightly smaller than the pixel pitch of the imaging surface of an imaging element, the color filter and the on-chip micro-lens array are sifted to the imaging lens optical axis side with respect to each pixel to a larger extent in the periphery of the imaging surface, whereby an oblique incident light beam is efficiently introduced into the light receiving section of each pixel. Thus, shading generated in the solid-state imaging element is reduced.

Further, recently, a technique to produce a solid-state imaging element by using a production method different from conventional methods has been developed. In this technique referred to as a rear-surface irradiation type, the light receiving area is arranged on the imaging-lens side of the wiring layer, whereby the amount of light substantially reaching the light receiving area is increased, and consequently, sensitivity for low-intensity is effectively improved and the decrease in rim intensity caused by the oblique light is effectively reduced.

The present examples can improve an issue of decrease in rim intensity by using these peripheral techniques To describe the present invention, in the above description, with reference to the drawings, the present invention has been appropriately and sufficiently described using the embodiments. However, it should be recognized that those skilled in the art can easily change and/or modify the embodiments. Accordingly, the embodiment changed or modified by those skilled in the art should be construed to be included in the scope of the attached claims unless the changed or modified embodiment departs from the scope of the claims.

DESCRIPTION OF THE SYMBOLS

AX: optical axis
1 and 1A-1Q: single-focus optical system
3: digital apparatus
5: mobile phone
11 and Gr1: first lens group
12 and Gr2: second lens group
13 and Gr3: third lens group
L1: first lens
L2: second lens
L3: third lens
L4: fourth lens
L5: fifth lens
14 and ST: aperture stop
16 and SR imaging element
21: image pickup device

The invention claimed is:

1. A single-focus optical system comprising, in order from an object side to an image side:
   a first lens group fixed with respect to an image plane, the first lens group including:
      at least one positive lens; and
      at least one negative lens;
   a second lens group configured to be moved to focus, the second lens group including:
      at least one positive lens;
   a third lens group fixed with respect to the image plane, the third lens group including:
      at least one lens having at least one aspherical surface having a positive optical power on a periphery thereof,
      wherein the most object-side lens is a positive lens having a convex object-side surface; and
   wherein the following relationships are satisfied:

$5 < \Delta v1 < 70$ $0.01 < bf/TL < 0.24$ $0.04 < T34/TL < 0.4$ where:
      $\Delta v1$ is a maximum value of a difference between an Abbe number of the positive lens of the first lens group and an Abbe number of the negative lens of the first lens group;
      bf is an axial distance from a surface apex of the most image-side lens surface to the image plane, wherein when a parallel plate is placed therebetween, an air equivalent thickness of the parallel plate is counted in;
      TL is an axial distance from a surface apex of the most object-side lens surface to the image plane, wherein when a parallel plate is placed therebetween, an air equivalent thickness of the parallel plate is counted in; and
      T34 is an axial distance between the third lens and the fourth lens, wherein when T34 is variable for focusing, T34 for focusing at infinity is adopted.

2. A single-focus optical system comprising, in order from an object side to an image side:
   a first lens group fixed with respect to an image plane, the first lens group including:
      at least one positive lens; and
      at least one negative lens;
   a second lens group configured to be moved to focus, the second lens group including:
      at least one positive lens;
   a third lens group fixed with respect to the image plane, the third lens group including:
      at least one lens which has an aspherical surface having an inflection point at a position other than an intersection point of the aspherical surface and an optical axis and which has a positive optical power on a periphery thereof and a negative optical power in a vicinity of the optical axis,
   wherein the most object-side lens is a positive lens having a convex object-side surface; and
   wherein the following relationships are satisfied:

$5 < \Delta v1 < 70$ $0.01 < bf/TL < 0.24$ $0.04 < T34/TL < 0.4$ where:
      $\Delta v1$ is a maximum value of a difference between an Abbe number of the positive lens of the first lens group and an Abbe number of the negative lens of the first lens group;
      bf is an axial distance from a surface apex of the most image-side lens surface to the image plane, wherein when a parallel plate is placed therebetween, an air equivalent thickness of the parallel plate is counted in; and
      TL is an axial distance from a surface apex of the most object-side lens surface to the image plane, wherein when a parallel plate is placed therebetween, an air equivalent thickness of the parallel plate is counted in; and
      T34 is an axial distance between the third lens and the fourth lens, wherein when T34 is variable for focusing, T34 for focusing at infinity is adopted.

3. The single-focus optical system of claim 1, wherein the lenses are, from the object side to the image side, a first lens having a positive optical power, a second lens having a negative optical power, a third lens having a positive optical power, and a fourth lens having a positive or negative optical power.

4. The single-focus optical system of claim 1, wherein the lenses are, from the object side to the image side, a first lens having a positive optical power, a second lens having a negative optical power, a third lens having a positive optical power, a fourth lens having a positive or negative optical power, and a fifth lens having a positive or negative optical power.

5. The single-focus optical element of claim 3, wherein the fourth lens has a negative optical power.

6. The single-focus optical element of claim 4, wherein the fifth lens has a negative optical power.

7. The single-focus optical system of claim 1, wherein the following relationships are satisfied:

$0.1 < f1/f < 1.1$ $0.1 < fs/f < 2$ where:
      f1 is a focal length of the most object-side lens;
      f is a combined focal length of a whole optical system; and
      fs is a combined focal length of the second lens group.

8. The single-focus optical system of claim 1, wherein the lenses are named, from the object side to the image side, an i-th lens (i=1, 2, 3, . . . ), the optical system comprises an aperture stop on an object side of an object-side surface of the first lens or between an image-side surface of the first lens and an object-side surface of the second lens, and the following relationship is satisfied:

$$0.15 < D1/Y' < 0.5$$

where:
D1 is a maximum effective diameter of the first lens; and
Y' is a maximum image height.

9. A single-focus optical system comprising, in order from an object side to an image side:
a first lens group fixed with respect to an image plane, the first lens group including:
at least one positive lens; and
at least one negative lens;
a second lens group configured to be moved to focus, the second lens group including:
at least one positive lens;
a third lens group fixed with respect to the image plane, the third lens group including:
at least one lens having at least one aspherical surface having a positive optical power on a periphery thereof,
wherein the lenses are, from the object side to the image side, a first lens having a positive optical power, a second lens having a negative optical power, a third lens having a positive optical power, a fourth lens having a positive or negative optical power, and a fifth lens having a positive or negative optical power; and
wherein the following relationships are satisfied:

$$5 < \Delta v1 < 70$$

$$0.001 < T12/TL < 0.033$$

$$0.05 < T23/TL < 0.4$$

$$0.04 < T34/TL < 0.4$$

where:
$\Delta v1$ is a maximum value of a difference between an Abbe number of the positive lens of the first lens group and an Abbe number of the negative lens of the first lens group is an axial distance between the first lens and the second lens;
T12 is an axial distance between the first lens and the second lens;
T23 is an axial distance between the second lens and the third lens, wherein when T23 is variable for focusing, T23 for focusing at infinity is adopted;
T34 is an axial distance between the third lens and the fourth lens, wherein when T34 is variable for focusing, T34 for focusing at infinity is adopted; and
TL is an axial distance from a surface apex of the most object-side lens surface to the image plane, wherein when a parallel plate is placed therebetween, an air equivalent thickness of the parallel plate is counted in.

10. The single-focus optical system of claim 3, wherein the following relationship is satisfied:

$$-0.15 < T2/f2 < -0.01$$

where:
T2 is an axial thickness of the second lens; and
f2 is a focal length of the second lens.

11. The single-focus optical system of claim 1, wherein the most object-side lens of the third lens group is a positive meniscus lens having a convex surface toward the image plane.

12. The single-focus optical system of claim 1, wherein the at least one positive lens of the first lens group has a convex object-side surface; the at least one negative lens of the first lens group has a concave image-side surface, and a radius of curvature of the image side surface thereof is smaller in absolute value than a radius of curvature of a object-side surface thereof; the at least one positive lens of the second lens group has a convex image-side surface, and a radius of curvature of the image-side surface thereof is smaller in absolute value than a radius of curvature of an object-side surface thereof; and the at least one lens of the third lens group is a negative meniscus lens convex toward the object side.

13. The single-focus optical system of claim 1, wherein the third lens group includes, on the object side of the at least one lens of the third lens group, a positive meniscus lens convex toward the object side; the at least one positive lens of the first lens group has a convex object-side surface; the at least one negative lens of the first lens group has a concave image-side surface, and a radius of curvature of the image side surface thereof is smaller in absolute value than a radius of curvature of a object-side surface thereof; the at least one positive lens of the second lens group has a convex image-side surface, and a radius of curvature of the image-side surface thereof is smaller in absolute value than a radius of curvature of an object-side surface thereof; and the at least one lens of the third lens group has a negative optical power.

14. The single-focus optical system of claim 1, wherein the following relationship is satisfied:

$$0.3 < Y'/TL < 0.9$$

where:
Y' is a maximum image height; and
TL is an axial distance from a surface apex of the most object-side surface to the image plane, wherein when a parallel plate is placed therebetween, an air equivalent thickness of the parallel plate is counted in.

15. A single-focus optical system comprising, in order from an object side to an image side:
a first lens group fixed with respect to an image plane, the first lens group including:
at least one positive lens; and
at least one negative lens;
a second lens group configured to be moved to focus, the second lens group including:
at least one positive lens;
a third lens group fixed with respect to the image plane, the third lens group including:
at least one lens having at least one aspherical surface having a positive optical power on a periphery thereof,
wherein the following relationships are satisfied:

$$5 < \Delta v1 < 70$$

$$Fn < 3.2$$

$$0.15 < Tgs/TL < 0.8$$

where:
$\Delta v1$ is a maximum value of a difference between an Abbe number of the positive lens of the first lens group and an Abbe number of the negative lens of the first lens group;
Fn is an F number with respect to light from infinity;

Tgs is an axial distance from a surface apex of an object-side surface of the at least one lens of the third lens group to the image plane, wherein when a parallel plate is placed therebetween, an air equivalent thickness of the parallel plate is counted in; and TL is an axial distance from a surface apex of an object-side surface of the at least one positive lens of the first lens group to the image plane, wherein when a parallel plate is placed therebetween, an air equivalent thickness of the parallel plate is counted in.

16. An image pickup device comprising, an imaging element configured to convert an optical image formed on a light receiving surface thereof into an electrical signal; and a single-focus optical system provided so as to form an optical image of an object on the light receiving surface of the imaging element, the single-focus optical system including:
- a first lens group fixed with respect to an image plane, the first lens group including:
  - at least one positive lens; and
  - at least one negative lens;
- a second lens group configured to be moved to focus, the second lens group including:
  - at least one positive lens;
- a third lens group fixed with respect to the image plane, the third lens group including:
  - at least one lens having at least one aspherical surface having a positive optical power on a periphery thereof, wherein the following relationship is satisfied:

$5 < \Delta v1 < 70$ where:
- $\Delta v1$ is a maximum value of a difference between an Abbe number of the positive lens of the first lens group and an Abbe number of the negative lens of the first lens group wherein the following relationship is satisfied:

$1 < PX/h3 < 5$ where:
- PX is a pixel size (μm) of the imaging element; and
- h3 is a radius (mm) of an axial light beam on the most object-side surface of the third lens group.

17. The image pickup device of claim 2, comprising:

a structure body configured to seal a space between the third lens group and the light receiving surface of the imaging element.

18. A Digital apparatus, comprising:

the image pickup device of claim 16; and a control section configured to cause the image pickup apparatus to take at least one of a still image and a moving image of an object.

* * * * *